(12) United States Patent
Aizawa et al.

(10) Patent No.: US 6,692,855 B1
(45) Date of Patent: Feb. 17, 2004

(54) SOLID ELECTROLYTE TYPE FUEL CELL AND METHOD OF PRODUCING THE SAME

(75) Inventors: Masanobu Aizawa, Kita-kyushu (JP); Akira Ueno, Kita-kyushu (JP); Koji Omoshiki, Kita-kyushu (JP); Haruo Nishiyama, Kita-kyushu (JP); Ken-ichi Hiwatashi, Kita-kyushu (JP)

(73) Assignee: Toto Ltd., Fukuoka (JP)

( * ) Notice: Subject to any disclaimer, the term of this patent is extended or adjusted under 35 U.S.C. 154(b) by 0 days.

(21) Appl. No.: 09/673,934

(22) PCT Filed: Apr. 19, 1999

(86) PCT No.: PCT/JP99/02048
§ 371 (c)(1),
(2), (4) Date: Oct. 20, 2000

(87) PCT Pub. No.: WO99/54946
PCT Pub. Date: Oct. 28, 1999

(30) Foreign Application Priority Data

| | | |
|---|---|---|
| Apr. 21, 1998 | (JP) | 10/126738 |
| May 20, 1998 | (JP) | 10/155292 |
| May 11, 1998 | (JP) | 10/145040 |
| May 12, 1998 | (JP) | 10/146579 |
| May 28, 1998 | (JP) | 10/164316 |
| May 29, 1998 | (JP) | 10/165945 |
| May 29, 1998 | (JP) | 10/165946 |
| Jun. 3, 1998 | (JP) | 10/170684 |
| Jun. 12, 1998 | (JP) | 10/181413 |
| Jun. 16, 1998 | (JP) | 10/185675 |
| Jun. 29, 1998 | (JP) | 10/196609 |
| Jul. 10, 1998 | (JP) | 10/211821 |
| Jul. 13, 1998 | (JP) | 10/213541 |
| Jul. 17, 1998 | (JP) | 10/219711 |
| Aug. 3, 1998 | (JP) | 10/231189 |
| Aug. 7, 1998 | (JP) | 10/236482 |
| Aug. 15, 1998 | (JP) | 10/233636 |
| Feb. 17, 1999 | (JP) | 11/39133 |
| Mar. 3, 1999 | (JP) | 11/55503 |
| Mar. 24, 1999 | (JP) | 11/80457 |
| Apr. 6, 1999 | (JP) | 11/99356 |
| Apr. 8, 1999 | (JP) | 11/101441 |
| Apr. 8, 1999 | (JP) | 11/101442 |

(51) Int. Cl.$^7$ ............................................. H01M 8/12
(52) U.S. Cl. ............................ 429/30; 429/31; 429/32; 429/33
(58) Field of Search ............................. 429/30, 31, 32, 429/33

(56) References Cited

U.S. PATENT DOCUMENTS

| | | | | |
|---|---|---|---|---|
| 5,342,705 A | * | 8/1994 | Minh et al. ................... | 429/32 |
| 5,922,486 A | * | 7/1999 | Chiao ........................... | 429/32 |
| 6,139,985 A | * | 10/2000 | Borglum et al. ............... | 429/41 |

FOREIGN PATENT DOCUMENTS

| | | |
|---|---|---|
| JP | 61-91880 | 5/1986 |
| JP | 61-153280 | 7/1986 |
| JP | 61198570 | 9/1986 |
| JP | 1093065 | 4/1989 |
| JP | 1-59705 | 12/1989 |

(List continued on next page.)

*Primary Examiner*—Carol Chaney
(74) *Attorney, Agent, or Firm*—Jones Day

(57) ABSTRACT

A solid electrolyte fuel cell comprising an air electrode, a solid electrolyte film, a fuel electrode, and an interconnector, wherein a ceramics layer which is tight in a certain degree and has a gas permeation flux $Q1 \leq 50$ (m·hr$^{-1}$·atm$^{-1}$) is provided on the air electrode, and an interconnector film which is a tight ceramics film is provided thereon whereby the gas permeation flux $Q2$ of the interconnector film becomes 0.01 (m·hr$^{-1}$·atm$^{-1}$) or less so that a gas-permeability preferable as an interconnector film of the solid electrolyte type fuel cell can be ensured.

7 Claims, 28 Drawing Sheets

FOREIGN PATENT DOCUMENTS

| | | |
|---|---|---|
| JP | 2220361 | 9/1990 |
| JP | 2288159 | 11/1990 |
| JP | 2302372 | 12/1990 |
| JP | 3059953 | 3/1991 |
| JP | 4121966 | 4/1992 |
| JP | 4282566 | 10/1992 |
| JP | 6260176 | 9/1994 |
| JP | 6302329 | 10/1994 |
| JP | 7267745 | 10/1995 |
| JP | 7316819 | 12/1995 |
| JP | 8306361 | 11/1996 |
| JP | 9069365 | 3/1997 |
| JP | 9073906 | 3/1997 |
| JP | 9092294 | 4/1997 |
| JP | 10021929 | 1/1998 |

* cited by examiner

SOLID ELECTROLYTE TYPE FUEL CELL AND METHOD OF PRODUCING THE SAME

This application claims the benefit of International Application No. PCT/JP99/02048, which has the international filing date of Apr. 19, 1999, and which was not published under PCT Article 21(2) in English.

1. Technical Field

The present invention relates to a solid electrolyte type fuel cell (hereinafter sometimes referred to as SOFC) having high power generating performance and durability.

2. Background Art

A solid electrolyte type fuel cell comprises an air electrode, a solid electrolyte film, a fuel electrode and an interconnector. In the following, the respective prior art techniques are explained.

First, with regard to an air electrode, prior art is explained by referring to an air electrode or an air electrode supporting tube of a solid electrolyte type fuel cell of a cylindrical cell type as an example. Solid electrolyte type fuel cells are disclosed in Japanese Patent publication number Kokoku Hei:1-59705, etc. The solid electrolyte type fuel cell has a cylindrical cell constituted by a porous supporting tube-an air electrode-a solid electrolyte-a fuel cell-an interconnector. When oxygen (air) is flown to the air electrode side and a fuel gas ($H_2$, CO, etc.) is flown to the fuel electrode side, $O^{2-}$ is moved in the cell to cause a chemical burning whereby potential difference between the air electrode and the fuel electrode occurs to cause power generation. There is a system in which the air electrode also has a function of a supporting tube (an air electrode supporting tube).

As a material for an air electrode of a solid electrolyte type fuel cell, a perovskite type oxide ceramics has been proposed such as $LaMnO_3$ in Japanese Patent publication number Kokoku Hei:1-59705, and $La_{1-x}Sr_xMnO_3$ in Japanese Patent publication number Kokai Hei:2-288159. Also, in Proc. of the 3rd Int. Symp. on SOFC, 1993, $La_{0.09}Sr_{0.10}MnO_3$ has been introduced as an air electrode.

A size of an air electrode supporting tube is generally an outer diameter of 10 to 20 mm, a thickness of 1 to 2 mm and a length of 1 to 2 m. For producing such a long ceramics formed product, an extrusion forming method has generally been used.

For producing such a long ceramics sintered body, a bend to the lateral direction becomes a problem. As a method of decreasing a bend of a long sintered body, a hanging sintering is carried out. The hanging sintering is to carry out the sintering in the state that a material to be sintered is hanged to the longitudinal direction. A tensile stress by weight of the material to be sintered itself is affected to the sintered material so that a correcting force is applied to the sintered body whereby a sintered body with a little bend can be obtained.

In Japanese Patent publication number Kokoku Hei:6-10113, with regard to a production process of a long sintered body, there is disclosed a technique in which a ceramics long body is subjected to lateral sintering at a temperature not less than a shrinkage starting temperature of said ceramics material, and then, subjecting to hanging sintering at a temperature not less than the lateral sintering temperature. According to said publication, it is described that a rod of $ZrO_2$ with a length of 1.1 m and a diameter of 20 mm is sintere data lateral sintering temperature between 1300 to 1450° C. and a hanging sintering temperature of 1450° C. so that a good result can be obtained.

In $La_{0.09}Sr_{0.10}MnO_3$ which is representative as an air electrode composition, there are cases where gas permeability is insufficient so that high power generating performance cannot be obtained. On the contrary, when gas permeability is heightened to improve power generating performance, strength is lowered so that a cell is broken during power generation or a cell is broken during preparation thereof As a preparation method of a perovskite type oxide, a method of repeating pulverization—pressurizing—heat treatment is disclosed in Japanese Patent publication number Kokai Hei:7-6769. As a pulverizing method of ceramics powder, an impact type pulverizer, a stream type pulverizer, aba mill, etc. has been used, and the impact type pulverizer has been used in many cases in the point of easiness in operation.

In the case of the present method, a metal material containing Fe as a main component has been used as a material for a pulverization blade or a pulverization room. Thus, when the above-mentioned pulverization is repeated by using, for example, stainless as a material of the pulverization blade or the pulverization room, 0.5 to 1.0 w % or so of Fe component is migrated in the synthesized lanthanum manganite powder. Experiments were carried out with regard to a Fe content in the lanthanum manganite and power generating performance of a cell, and as a result, it was found that the Fe component in the lanthanum manganite markedly affects to the power generating performance of the cell and the Fe component with 0.5 wt % or more markedly lowers the power generating performance of the cell.

In a material other than the long sintered body comprising a material or having a size specifically mentioned as an object in the above-mentioned Japanese Patent publication number Kokai Hei:6-10113, if a temperature of a lateral sintering before a hanging sintering is lowered, sintering at the lateral sintering does not proceed sufficiently so that high temperature strength is insufficient whereby there is a fear of dropping the sintered body by breaking the sintered body due to itself weight in many cases in a subsequent hanging sintering. For example, a shrinkage starting temperature of the lanthanum manganite is 1000° C. When a sintered body subjected to lateral sintering within the range of 1000 to 1350° C. is to be subjected to hanging sintering at a temperature exceeding 1350° C., there is an extremely high risk of dropping the material. In a solid electrolyte type fuel cell, it is preferred that a roundness of an air electrode supporting tube is 97% or more to decrease contact resistance when the cell is stacked. When the lateral sintering temperature is raised, the roundness is lowered so that it is difficult to use as an air electrode supporting tube for a solid electrolyte type fuel cell.

Prior art of a solid electrolytic film is explained. In SOFC, solid electrolyte thin films having permeability of oxygen ions ($O_{2-}$) and impermeability of gas are required. These solid electrolyte thin films ($ZrO_2$ base, $CeO_2$ base, and such) are required to be thin and tight to achieve these characteristics.

In addition, they are required to be economically formed into large sized thin films. For the cell of SOFC for power generation, in general, a solid electrolytic film having a thickness of 30 to 2000 µm is formed on a porous substrate having a thickness of 0.3 to 5.0 mm. Further, over the solid electrolyte thin film, a fuel electrode (made of Ni base cermets, and such materials) is formed.

For SOFC cell, in order to obtain solid electrolyte thin films which are thin and tight, and at the same time, low in production cost and excellent in mass productivity as a goal, the following have been proposed in the past.

Production Method by CVD.EVD (Chemical Electrical vapor deposition) (Japanese Patent Publication Number Kokai Sho: 61-91880):

This production method is characterized in that the first electrode is adhered onto a porous support member, an intermediate layer substance with electrical conductivity and oxygen permeability is adhered onto the first electrode to protect the first electrode from a high temperature vapor of metal halides, and the intermediate layer substance is contacted with a high temperature vapor of metal halide to form a solid electrolyte composed of metal oxides on the whole surface of the intermediate layer.

Production Method by Plasma Spray Coatings (Japanese Patent Publication Number Kokai Sho: 61-198570):

This production method is characterized in that solid electrolyte starting materials comprising zirconium oxides and metal oxides of rare earth elements and the like are formed into a solid solution. Then, the starting material in the form of a solid solution are crushed, and the grain size of the obtained solid electrolyte powder is regulated, and then the powder is coated as an electrolyte film on a fuel cell substrate by plasma spray coating. According to an example described in the published specification, a solid electrolyte thin film having a thickness of 200 $\mu$m and terminal voltage of 790 mV is obtained by using plasma spray powder having a grain size of 2 $\mu$m or less.

Production Method by Slurry Coating (Japanese Patent Publication Number Kokai Hei:1-93065)

This production process is characterized in that either one of the air electrode layer or the fuel electrode layer is formed into a cylindrical shape. A powder slurry of each material for forming the electrolyte and the other electrode layer is coated on the surface of the cylinder one by one and dried, and then the cylinder is sintered. According to an example of the published specification, an YSZ thin film having a thickness of 150 $\mu$m is obtained.

Production Method by Plasma Spray Coating and Filler Slurry Coating (Japanese Patent Publication Number Kokai Hei:2-220361)

This production method is characterized in that a filler material containing 40 wt % or more as solids concentration of yttrium stabilized zirconia is coated on voids of a solid electrolyte layer formed on the substrate cylinder by spraying, and then the tube is dried and sintered. According to an example described in the published specifications a slurry containing YSZ powders with a grain size of 0.05 to 2.5 $\mu$m is coated (brush hand coating) on an air plasma spray coated film having a thickness of 100 $\mu$m, and then the film is dried and sintered. Finally, a solid electrolyte thin film with very low gas permeability is obtained.

The aforesaid conventionally proposed techniques involve the following problems.

CVD Method, EVD Method:

These methods are appropriate for forming tight thin films. However, they require expensive equipment since film forming should be carried out under a special atmosphere and a physical condition isolated from the air. For large sized parts, large sized equipment is naturally required to accommodate the parts. Accordingly, film coating onto large parts is difficult as well as low in productivity and high in cost. Also, a corrosive starting gas is used so that there is a high risk that the substrate is corroded.

Plasma Spray Coating Method:

The films obtained by this method is fundamentally porous. Therefore, the film should be made relatively thick to eliminate gas permeability. Thus, high performance cell cannot be obtained. Also, its mass productivity is low.

Slurry Coating Method:

This method is an economical method since film formation is carried out in the air and expensive equipment is not necessary. This method, however, has been found to have problems in tightness and thickness of the film. Practically, and the solid electrolyte thin film disclosed as an example in the Japanese Patent publication number Kokai Hei:2-220361 has a thickness of 200 $\mu$m, which is considerably thicker than the target thickness of 10 to 50 $\mu$m for this kind of films. Also, sintering crack of the film was likely caused so that a plural times of sintering were required for obtaining a tight material while filling the crack. To solve such a problem and to increase sintering property of the film material, raising of the sintering temperature or finely pulverizing of slurry powder has been investigated. However, with regard to the former, a reaction between the substrate and the solid electrolyte becomes a problem, and in the latter, there is a difficulty in mass production of fine powder having a grain size of 0.1 $\mu$m or less.

Plasma Spray Coating and Slurry Filling Method:

This method requires two-step work, and moreover the film thickness tends to be thicker.

Prior art technique of a fuel electrode is to be explained.

As a material for the fuel electrode of SOFC, a sintered layer of a composite powder in which NiO and $Y_2O_3$-stabilized $ZrO_2$ (YSZ) are mixed and composited (Japanese Patent publication number Kokai Sho:61-153280, Japanese Patent publication number Kokai Sho:61-198570, etc.) has been mainly used. Incidentally, NiO in the sintered layer is reduced to Ni during operation of SOFC and said layer becomes a cermet film of Ni/YSZ.

As a production method of starting powder for Ni/YSZ cermet, there has been generally employed a method (a solid mixing method) in which NiO powder and YSZ powder are mixed both in solid states, and then, the temperature is elevated (calcination) to slightly sinter the material whereby it is composited. As a mixing method, there has been known a method of using a ball mill or a method by mechanochemical mechanical mixing.

The nickel base/zirconium base powder which has been obtained by the above-mentioned prior art techniques had a structure in which Ni grains or NiO grains and YSZ grains as electrolyte material had been simply dispersed after all. In the state in which Ni grains and YSZ grains having sole grain size are dispersed, under operating conditions of SOFC (1000° C., reduction), fine cracks occur on the surface of the fuel electrode due to reduction to break off a conductive pass which causes lowering in conductivity whereby lowering in output occurs.

Prior art technique of an interconnector is to be explained. For the interconnector of SOFC, the following characteristics are required.

To have a high electric conductivity. A role of the interconnector is to have an electrical connection between unit cells of SOFC so that it is the most fundamental required matter.

If the electric conductivity is low, self consumption of a power in the interconnector becomes large so that power generation performance of the cell is lowered. The electric conductivity is required to be 10 S·cm$^{-1}$ or more (more preferably 40 S·cm$^{-1}$ or more) at the film-formed state.

To have a low gas permeability. At the both surfaces of the interconnector, a fuel gas ($H_2$, CO, etc.) and an oxidizing agent (air, etc.) flow, but if they are mixed through the interconnector, power generation performance of the cell is lowered. The gas permeability is required to be 0.01 (m·hr$^{-1}$·atm$^{-1}$) or less (more preferably 0.0001 (m·hr$^{-1}$·atm$^{-1}$) or less).

To have durability to both of oxidation and reduction.

To have a thermal expansion coefficient close to that of constitutional materials of the other cells such as YSZ (yttria stabilized zirconia).

To have low reactivity to an air electrode material such as $LaSrMnO_3$, $LaCaMnO_3$, etc., and YSZ.

To have a form ability into thin film. Through the interconnector, a current flows to the thickness direction so that a thin material has a less resistance. It is required to have a film thickness of 200 μm or less.

Heretofore, as can be seen in Japanese Patent publication number Kokai Sho:61-153280, as a production process of an interconnector film of a cylindrical cell type-solid electrolyte type fuel cell, when those shown in said publication and carried out by the CVD-EVD method are described in detail, they are as follows:

In this method, a first reacting agent containing an oxygen source transmits through fine poreportion in a substrate material, and reacts with a halogenated metal gas at the other side of the substrate to form a film of metal oxide on the substrate. Accompanying with growth of the metal oxide which is a reaction product on the substrate, according to chemical vapor deposition (CVD), the reaction product closely shut out a plural number of fine pore portions in the substrate. Transfer of oxygen through an oxide layer in the course of growth from the oxygensource occurs so that the coated film is grown by the electrochemical vapor deposition (EVD).

Heretofore, as a collecting method of an interconnector comprising lanthanum chromite, electricity generation tests were carried out by directly connecting the lanthanum chromite and the collecting member.

In Japanese Patent publication number Kokai Hei:4-282566, as a structure of an interconnector, it is described that an antioxidative ceramics layer and a reduction-resistant metal layer are to be preferred.

In the conventional CVD.EVD method, it is suitable for forming a tight film having good adhesiveness. However, film formation should be carried out under a specific atmosphere and a physical condition isolated from the air so that an expensive device is required. For large sized parts, large sized equipment is naturally required to accommodate the parts. Accordingly, film coating onto large parts is difficult as well as low in productivity and high in cost. Also, in CVD.EVD, a composition of a material of the film to be formed is limited.

When electricity collection is carried out by contacting a lanthanum chromite membrane and a collecting member, contact resistance with the collecting member becomes large, and an output loss accompanied with joule heat loss is large whereby high output cannot be obtained.

In Japanese Patent publication number Kokai Hei: 4-282566, as a structure of an interconnector, it comprises an oxidation resistant ceramics layer and an reduction resistant metal layer. When the interconnector film having this structure is to be used in SOFC, sintering under oxidative atmosphere is difficult in order to form a metal layer so that preparation by the usual wet method is difficult and the production method limited to the CVD method or the plasma spray coatingmethod. It is possible to prepare the interconnector film according to these methods, but as mentioned above, productivity is low and a cost is high so that they are not practical methods. Also, preparation of a metal layer is possible even when a plating method is used, but this method requires a number of steps so that a cost is high whereby it is not practical.

A first object of the present invention is to provide an air electrode having high power generation performance and excellent in durability.

A second object of the present invention is to provide a formation of a tight solid electrolyte film excellent in economicity, mass productivity, easily capable of applying to a large surface area, low resistance and a uniform thin film within the range of 5 to 150 μm.

A third object of the present invention is to provide a production of a nickel base/zirconium base complex powder as a fuel electrode material, which can inhibit aggregation of Ni in a long term operation, and a fuel electrode film.

A fourth object of the present invention is, in the preparation of an interconnector film on an air electrode substrate, to prepare a tight interconnector film by a wet method by providing a tight ceramics film (hereinafter referred to as a ceramics intermediate layer) with a certain extent between the air electrode substrate and the interconnector film, and further to provide a method for preparing an interconnector film which can decrease an output-loss accompanied with contact resistance with a collecting material at power generation and can attain high output of a cell by providing a nickel oxide film at a reductive atmosphere side of the interconnector film.

DISCLOSURE OF THE INVENTION

As the first aspect of the present invention, an air electrode for a solid electrolyte type fuel cell comprises an air electrode supporting tube also serving also as a supporting tube, and having radial crushing strength of 15 MPa or more and a gas permeation coefficient of $3.5\ m^2 \cdot hr^{-1} \cdot atm^{-1}$ or more. More preferably, it has the radial crushing strength of 20 MPa or more and the gas permeation coefficient of $3.5\ m^2 \cdot hr^{-1} \cdot atm^{-1}$ or more.

Further preferably, it has the radial crushing strength of 20 MPa or more and the gas permeation coefficient of $5.0\ m^2 \cdot hr^{-1} \cdot atm^{-1}$ or more.

The air electrode supporting tube having the above characteristics has a composition of $(Ln_{1-x}Sr_x)_{1-a}MnO_3$, wherein $0.14 \leq x \leq 0.26$, $0 < a \leq 0.03$, Ln=at least one of La, Ce, Nd, Pr and Sm. Or else, it has a composition of $(Ln_{1-x}Ca_x)_{1-a}MnO_3$, wherein $0.20 < x < 0.35$, $0 < a \leq 0.03$, Ln=at least one of La, Ce, Nd, Pr and Sm. More preferably, it has a composition of $(Ln_{1-x}Sr_x)_{1-a}MnO_3$, wherein $0.16 \leq x \leq 0.21$, $0 < a \leq 0.03$, Ln=at least one of La, Ce, Nd, Pr and Sm. Or it has a composition of $(Ln_{1-x}Ca_x)_{-a}MnO_3$, wherein $0.25 \leq x \leq 0.30$, $0 < a \leq 0.03$, Ln=at least one of La, Ce, Nd, Pr and Sm.

As a production method, in the composition of $(Ln_{1-x}Sr_x)_{1-a}MnO_3$, wherein $0.16 \leq x \leq 0.21$, $0 < a \leq 0.03$, Ln=at least one of La, Ce, Nd, Pr and Sm, or in the composition of $(Ln_{1-x}Ca_x)_{1-a}MnO_3$, wherein $0.25 \leq x \leq 0.30$, $0 < a \leq 0.03$, Ln=at least one of La, Ce, Nd, Pr and Sm, the process comprises the steps of adding, to the above-mentioned ceramics powder (coarse powder) having a grain size distribution within the range of 10 to 150 μm, or within the range of 10 to 200 μm, ceramics powder (fine powder) having a finer grain size distribution than the above-mentioned coarse powder to prepare mixed powder of coarse powder and fine powder, forming and sintering the mixed powder of coarse powder and fine powder.

Also, lanthanum manganite powder to be used as a starting material has a relative density of 97% or more. More preferably, lanthanum manganite powder has a relative density of 98% or more.

In the above-mentioned air electrode supporting tube, it comprises an Fe content of 0.01 wt % or more to 0.5 wt % or less. More preferably, it comprises an Fe content of 0.01 wt % or more to 0.4 wt % or less.

In a sintering method of the above-mentioned air electrode support, it contains a step of sintering a long sintering body in the state in which it is substantially free from tensile stress to the longitudinal direction (lateral sintering step) and a step of sintering the long sintering body in the state in which it is hanged to the longitudinal direction after lateral sintering (hanging sintering step), wherein a sintering temperature of the lateral sintering step is set at 1400° C. or higher and a sintering temperature at the hanging sintering step is made higher than that of the lateral sintering step.

That is, after sintering the material at a sufficiently high sintering temperature in the lateral sintering step, the hanging sintering is carried out at a temperature higher than that of the lateral sintering temperature. The state of the sintering body during the lateral sintering is basically placed horizontally, but when a tensile stress which causes a problem is not applied to the material, it is not limited to the above. In the air electrode support for a solid electrolyte type fuel cell of the present invention, in order to ensure high cell output characteristics of 0.2 W/cm$^2$ or more, it is preferable that a gas permeation coefficient is 3.5 m$^2 \cdot$hr$^{-1} \cdot$atm$^{-1}$ or more. In order to ensure high cell output characteristics of 0.3 W/cm$^2$ or more, it is preferable that a gas permeation coefficient is 5.0 m$^2 \cdot$hr$^{-1} \cdot$atm$^{-1}$ or more.

Also, to improve a preparation yield in a cell preparation step and to prevent from breakage of a cell during power generation, radial crushing strength of an air electrode support is preferably, 15 MPa or more, more preferably 20 MPa or more.

In the air electrode support for a solid electrolyte type fuel cell of the present invention; it preferably has a composition of $(Ln_{1-x}Sr_x)_{1-a}MnO_3$, wherein $0.14 \leq x \leq 0.26$, $0 < a \leq 0.03$, Ln=at least one of La, Ce, Nd, Pr and Sm. Or else, it preferably has a composition of $(Ln_{1-x}Ca_x)_{1-a}MnO_3$, wherein $0.20 \leq x \leq 0.35$, $0 < a \leq 0.03$, Ln=at least one of La, Ce, Nd, Pr and Sm. This is because if a Sr doped amount is less than 0.14 or exceeds 0.26, or a Ca doped amount is less than 0.20 or exceeds 0.35, it is difficult to simultaneously ensure both of a gas permeation coefficient of 3.5 m$^2 \cdot$hr$^{-1} \cdot$atm$^{-1}$ or more and radial crushing strength of 15 MPa or more. If a exceeds 0.03, it is difficult to ensure a gas permeation coefficient of 3.5 m$^2 \cdot$hr$^{-1} \cdot$atm$^{-1}$ or more.

Also, it is more preferable to have a composition of $(Ln_{1-x}Sr_x)_{1-a}MnO_3$, wherein $0.16 \leq x \leq 0.21$, $0 < a \leq 0.03$, Ln=at least one of La, Ce, Nd, Pr and Sm or a composition of $(Ln_{1-x}Ca_x)_{1-a}MnO_3$, wherein $0.25 \leq x < 0.30$, $0 \leq a \leq 0.03$, Ln=at least one of La, Ce, Nd, Pr and Sm. When the composition is within the above range, it becomes possible to simultaneously ensure both of a gas permeation coefficient of 3.5 m$^2 \cdot$hr$^{-1} \cdot$atm$^{-1}$ or more and radial crushing strength of 20 MPa or more. At this composition, it is preferred to contain the steps of adding to coarse powder having a grain size distribution within 10 to 150 μm, fine powder having a grain size distribution-within 0.1 to 5.0 μm in an amount of 0.5 to 40 parts by weight to 100 parts by weight of the coarse powder and the fine powder in total to prepare a mixed powder of the coarse powder and the fine powder, and forming and sintering the mixed powder of the coarse powder and the fine powder. When the starting powder is within the grain size distribution, it is possible to simultaneously ensure both of a gas permeation coefficient of 3.5 m$^2 \cdot$hr$^{-1} \cdot$atm$^{-1}$ or more and radial crushing strength of 20 MPa or more.

Also, at this composition, it is preferred to contain the steps of adding fine powder having a grain size distribution within 0.1 to 5.0 μm to coarse powder having a grain size distribution within 10 to 200 μm in an amount of 0.5 to 40 parts by weight based on 100 parts by weight the coarse powder and the fine powder in total to prepare a mixed powder of the coarse powder and the fine powder, and forming and sintering the mixed powder of the coarse powder and the fine powder. When the starting powder is within the grain size distribution, it is possible to simultaneously ensure both of a gas permeation coefficient of 5.0 m$^2 \cdot$hr$^{-1} \cdot$atm$^{-1}$ or more and radial crushing strength of 20 MPa or more.

Also, to ensure radial crushing strength of an air electrode supporting tube of 15 MPa or more, it is preferable to make a relative density of lanthanum manganite powder 97% or more, and to ensure radial crushing strength of 20 MPa or more, it is preferable to make a relative density of lanthanum manganite powder 98% or more. In the present invention, to increase the density of the powder, a method of repeating pulverization, pressuring and heat treatment is employed, but the method is not limited thereto. For example, it is also possible by raising the heat treatment temperature, increase in compressing pressure, progress of pulverization before pressurizing, etc.

In an air electrode supporting tube made of lanthanum manganite according to the present invention, when this is used as an air electrode support for a solid electrolytic type fuel cell, to ensure high cell output characteristics of 0.2 W/cm$^2$ or more, a Fe content is preferably 0.5 wt % or less, and to ensure high cell output characteristics of 0.3 W/cm$^2$ or more, a Fe content is preferably 0.4 wt % or less.

Also, to improve preparation yield at a cell preparation step and to prevent from breakage of the cell during power generation, a Fe content is preferably 0.01 wt % or more.

An air electrode supporting tube of a solid electrolyte type fuel cell is preferably bend of 1.0 mm or less and roundness of 97% or more. In the preparation method of a conductive ceramics tube made of lanthanum manganite of the present invention, since the bend of the ceramics tube is 1.0 mm or less and the roundness is 97% or more, it is preferred that a long sintering body is sintered under the state in which it is substantially free from tensile stress to the longitudinal direction and the long sintering body is sintered in the state in which it is hanged to the longitudinal direction after lateral sintering, and a sintering temperature of the lateral sintering step is set to 1400° C. or higher and a sintering temperature at the hanging sintering step is made higher than that of the lateral sintering step. When the lateral sintering temperature is less than 1400° C., a risk of dropping by self-weight is high at the time of sintering under hanging and production yield is poor, and when the hanging sintering temperature is less than the lateral sintering temperature, the roundness becomes less than 97%.

In the above-mentioned lateral sintering step, sintering is carried out by placing a sintering body in grooves of a setter having the grooves, and here, said grooves preferably have substantially the same sectional profile as the sectional profile of the sintered body. To prevent deformation during the lateral sintering as much as possible, the grooves of the above-mentioned setter serves also as preventing deformation.

Particularly when a material such as lanthanum manganite base or lanthanum chromite base is sintered, high purity alumina is preferable as a setter material. These materials have high reactivity with Si, so that a fire resistant material containing no Si is preferred as a setter material. At the present stage, high purity alumina is practically used as such a material. Here, preferred purity of the alumina is 99% or more.

Also, it is preferred to apply coating to the grooves of the setter with the same materials as those of the sintering body to be sintered. This is because change in the material of the sintered body caused by diffusion of the atom during sintering can be prevented as much as possible. As a method of coating, a slurry coating method can be employed. A thickness of the coating is preferably 0.05 to 2.0 mm.

As the second aspect of the present invention, the solid electrolyte film is a solid electrolyte material such as zirconia ($ZrO_2$) type, ceria ($CeO_2$) type material, and a specific surface area of the solid electrolyte powder is made 0.2 to 50 $m^2/g$, or the heat treatment temperature of the solid electrolyte powder is set at 700 to 1600° C.

It is to be included a step of preparing a solid electrolyte slurry with the above-mentioned solid electrolyte material and a step of film-forming the solid electrolyte slurry on an electrode substrate.

In the present invention, the characteristic feature resides in forming a tight solid electrolyte film on the substrate of an air electrode or a fuel electrode. In the sintering on the substrate, when a stress due to sintering shrinkage is larger than that the strength of, the substrate, the substrate is deformed or broken. Also, the stress due to sintering shrinkage is smaller than the same, crack occurs in the solid electrolyte film itself or sufficient tightness cannot be obtained. Accordingly, sintering of the solid electrolyte film itself shall be carried out without giving a large stress to the sintering substrate, so that a specific surface area of the solid electrolyte powder and the heat treatment temperature are controlled.

A solid electrolyte slurry is prepared by using the above-mentioned electrolyte material, and the solid electrolyte slurry is coated on an electrode substrate to form a film, whereby a tight and thin solid electrolyte film can be formed.

Also, it is preferred that before the step of forming a film of the solid electrolyte slurry on an air electrode substrate, a slurry containing mixed powder (LSCM/YSZ) of La(Sr, Ca)MnO perovskite base oxide (LSCM) and yttria doped zirconia (YSZ) is coated on the air electrode substrate to form a film.

Also, in the method of film-forming the above-mentioned solid electrolyte slurry on an air electrode substrate or on a fuel electrode substrate by dipping, film-formation can be carried out by separating the air electrode substrate or the fuel electrode substrate from the slurry at a speed of 5000 mm/sec or less.

The characteristic feature of the present invention resides in uniformly forming a tight solid electrolyte thin film by the slurry coating method.

Its characteristic feature is, in a solid electrolyte powder which at least one of $Y_2O_3$, $Yb_2O_3$, $Dy_2O_3$, $Er_2O_3$, $Eu_2O_3$, $Gd_2O_3$, $Ho_2O_3$, $Lu_2O_3$, $Sm_2O_3$ and $Tm_2O_3$ element is added to a solid electrolyte material such as zirconia base, ceria base, etc. which are stable as a solid electrolyte at high temperatures, to control sintering property, a specific surface area and a heat treatment temperature of the solid electrolyte powder are to be controlled.

Also, in the method of forming a film by dipping, by separating the air electrode substrate or the fuel electrode substrate from the slurry at a speed of 5000 mm/sec or less, whereby a slurry amount adsorbed or attached to the substrate is made constant so that film-formation with a uniform film thickness is carried out.

The reason why the specific surface area of the solid electrolyte powder in the present invention is 50 $m^2/g$ or less, or a heat treatment temperature is set at 700° C. or higher is as follows. In a solid electrolyte powder having a specific surface area of larger than 50 $m^2/g$, or in a solid electrolyte powder subjected to a heat treatment at a temperature lower than 700° C., sintering properties are too high so that in sintering on an air electrode or a fuel electrode substrate, cracks sometimes occur in the solid electrolyte film or the substrate is deformed. Also, when a slurry is prepared by using the above-mentioned solid electrolyte powder, there is a problem that it is hardly mixed with a solvent uniformly, or the like.

The heat treatment temperature of the solid electrolyte powder according to the present invention is preferably 800° C. or higher and 1500° C. or lower. This is because, if the heat treatment temperature is too low, as mentioned above, sintering properties of the solid electrolyte powder are high so that a stress accompanied with sintering shrinkage of the solid electrolyte powder occurs at sintering on an air electrode or a fuel electrode substrate, and the substrate is damaged thereby. Also, if the heat treatment temperature is too high, it becomes difficult to grind the material until it has a suitable specific surface area.

When the heat treatment temperature is set a high temperature, e.g., it is set higher than 1600° C., after the heat treatment, the material may be ground so that the specific surface area becomes 0.2 $m^2/g$ or more, preferably 2 $m^2/g$ or more within the range of 50 $m^2/g$ or less, preferably within the range of 40 $m^2/g$ or less.

The reason why a ball mill is used when a solid electrolyte slurry is prepared is in the points that it is easily ground to uniform and fine solid electrolyte powder in the specific surface area of 50 $m^2/g$ or less, and that a solvent and the solid electrolyte powder can be uniformly dispersed.

Also, when a solid electrolyte slurry is subjected to film-formation on an air electrode substrate, it is preferred to coat a slurry containing mixed powder (LSCM/YSZ) of La(Sr,Ca)MnO$_3$ perovskite base oxide (LSCM) and yttria doped zirconia (YSZ) on an air electrode substrate to form a film before the step of coating the solid electrolyte slurry on the air electrode substrate to form a film.

By coating a slurry containing LSCM/YSZ mixed powder on the above-mentioned air electrode substrate to form a film, an interfacial conductivity between the air electrode and the solid electrolyte can be improved whereby a cell with high performances can be formed.

In the present invention, when a film is formed by dipping, the reason why the slurry is separated from the air electrode substrate or the fuel electrode substrate at a speed of 5000 mm/sec or less is as follows. If they are separated at a speed faster than 5000 mm/sec, difference in the film thickness of 2-folds or more occurs in the upper portion and the bottom portion of the film-formed substrate having a length of 1000 mm or so to the up and down direction.

The reason why the slurry is preferably separated from the air electrode substrate or the fuel electrode substrate at a speed of 500 mm/sec or less is as follows. If they are separated at a speed later than 500 mm/sec, difference in the film thickness can be controlled within 1.5-folds at the upper portion and the lower portion of the air electrode substrate or the fuel electrode substrate having a length of 1000 mm or so to the up and down direction.

The reason why the slurry is preferably separated from the air electrode substrate or the fuel electrode substrate at a speed of 50 mm/sec or less is as follows. If they are separated at a speed later than 50 mm/sec, difference in the film thickness can be controlled within 1.25-folds at the upper portion and the lower portion of the air electrode substrate or the fuel electrode substrate having a length of 1000 mm or so to the up and down direction.

Dipping of the present invention is preferably carried out with a plural number of times. It is also preferred that the upper portion of the air electrode substrate or the fuel electrode substrate comes to an upper side as the same times as the bottom portion of the air electrode substrate or the fuel electrode dose.

The reason is that a hanged amount of the slurry of the attached slurry can be made uniform at the up and down direction irrespective of the length of the air electrode substrate or the fuel electrode substrate whereby a film can be formed substantially without causing difference in film thickness to the up and down direction.

Dipping of the present invention preferably carried out a plural number of times, and the upper portion and the bottom portion of the air electrode substrate or the fuel electrode substrate are overturned alternately.

The reason is that a hanged amount of the slurry of the attached slurry can be made uniform at the up and down direction and an amount of the slurry adsorbed to the formed film can be made constant irrespective of the length of the air electrode substrate or the fuel electrode substrate whereby a film can be formed substantially without causing difference in film thickness to the up and down direction.

The reason why the slurry viscosity of the present invention is arranged to 1 to 500 cps, preferably 5 to 100 cps is as follows. The reason why the lower limited is restricted to 1 cps that, in the case of low viscosity, when a film is formed on a tight substrate, cissing occurs so that spots occurs in the film. Also, when a film is formed on a porous substrate, it is to prevent from penetrating the slurry into the substrate. The reason why the upper limit is restricted to 500 cps is to prevent from causing cracks during drying after film-formation.

As the dipping method of the present invention, in addition to the usual dipping method in which a substrate is dipped in a slurry in air, a method of dipping in a pressurized gas or in vacuum can be employed. In this case, a number of dipping times can be selected depending on the required film thickness and the slurry composition to be used.

The reason why a ratio of a solid electrolyte material occupied in an optional section of a solid electrolyte film is two thirds or more is that if it is less than two thirds, an inner resistance of the solid electrolyte film abruptly increases and electricity generation characteristics are markedly lowered. Also, voids at which no solid electrolyte material exists become a starting point of a cause of generating cracks.

As a film thickness of the solid electrolyte film, it is preferably 5 to 150 $\mu$m. If it is less than 5 $\mu$m, a sufficiently tight film cannot be obtained while if it exceeds 150 $\mu$m, an inner resistance is too large. It is preferably 100 $\mu$m or less, more preferably 50 $\mu$m or less.

The reason why the gas permeation coefficient of the solid electrolyte film is made $1 \times 10^{-9}$ m$^3$·s kg$^{-1}$ or less is to operate SOFE with a high utilizing ratio of fuel. It is preferably $1 \times 10^{-10}$ m$^3$·s·kg$^{-1}$ or less.

The reason why the sintering temperature of the solid electrolyte film is set 1200° C. to 1700° C. is that if the sintering is carried out at a temperature lower than 1200° C., sintering of the solid electrolyte powder does not proceed sufficiently so that a tight solide lectrolyte film cannot be obtained. Also, the sintering is carried out at the temperature higher than 1700° C., porosity of the electrode substrate is lost.

In the solid electrolyte material made of a zirconia base, a ceria base, etc., the reason why at least one of $Y_2O_3$, $Yb_2O_3$, $Dy_2O_3$, $Er_2O_3$, $Eu_2O_3$, $Gd_2o_3$, $Ho_2O_3$, $Lu_2O$, $Sm_2O_3$ and $Tm_2O_3$ element is contained in man amount of 3 to 20 mol is that ion conductivity is excellent in this range. It is preferably 8 to 12 mol %. Also, more preferably, in the zirconia base solid electrolyte material, $Y_2O_3$ is contained in an amount of 8 to 12 mol %.

The content of the solid electrolyte powder in the slurry of the present invention is preferably 10 parts to 50 parts to 100 parts of the slurry solution. The composition of the slurry solution of the slurry according to the present invention is not particularly limited. The slurry may contain a solvent, a binder, a dispersant, an anti-foaming agent, etc. However, it is preferable to contain, as a solvent, a hardly volatile solvent in an amount of 10 to 80 wt % based on the slurry solvent. An action of the hardly volatile solvent is to control viscosity change of the slurry at the time of preparing a slurry and during preservation, and to control occurrence of cracks caused by drying after film-formation (e.g., by dipping) by using this slurry. Here, the degree of hardly volatility is preferably, for example, 1 or less when the volatility of butyl acetate is set 100. For example, there may be mentioned $\alpha$ terpineol, etc.

In the slurry solution, a usual volatile solution may be contained other than the hardly volatile solvent. An action of the solvent contained in the solution is to improve dispersibility of the solid electrolyte powder and improve defoaming property. As an examples of such a solvent, ethyl alcohol is preferable. A preferable content thereof is 20 to 90 wt % of the slurry solution.

An action of the binder contained in the slurry solution is to improve coating property (adhesiveness) of the solid electrolyte powder to the substrate. An amount of the binder is preferably 0.1 to 10 parts to 100 parts of the solvent. The reason is that if it is a low concentration (less than 0.1 wt % or less), coating property is poor, while if it is a.high concentration (exceeding 10 wt %), dispersibility of the solid electrolyte powder becomes poor. Specific examples of the binder may be preferably mentioned ethyl cellulose.

An action of a dispersant contained in the slurry solution is to improve dispersibility of the solid electrolyte powder. An amount of the dispersant is preferably 0.1 to 4 parts to 100 parts of the solvent. The reason is that if it is a low concentration (less than 0.1 wt % or less), dispersibility is low, while if it is a high concentration (exceeding 4 wt %), modification of the slurry is likely caused. Specific examples of the dispersant may be preferably mentioned polyoxyethylene alkylphosphate.

An anti-foaming agent contained in the slurry solution has an action of defoaming bubbles in the slurry solution. An amount of the anti-foaming agent is preferably 0.1 to 4 parts to 100 parts of the solvent. The reason is that if it is a low concentration (less than 0.1 wt % or less), its effect cannot be expected, while if it is a high concentration (exceeding 4 wt %), modification of the slurry is likely caused. Specific examples of the anti-foaming may be preferably mentioned sorbitan sesquioleate.

As the mixing method of the respective agents and the solid electrolyte powder, a method of ball mill, etc. maybe employed.

The application method of the slurry to the substrate in. the production process of the present invention is not particularly limited. It may be a dipping method, spraymethod, brushing method, printing method, transfer method, etc. Of these, a dipping method is preferred. It is simple and easily, excellent in mass productivity and low cost. As the dipping method, in addition to the usual dipping method in which a substrate is dipped in a slurry in air, a method of dipping in a pressurized gas or in vacuum can be employed. In this case, a number of dipping times can be selected depending on the required film thickness and the slurry composition to be used., As the third aspect of the present invention, a fuel electrode material comprises a nickel base/zirconium base composite powder, and the nickel base/zirconium base composite powder is prepared by the step of synthesizing a composite powder comprising nickel and/or nickel oxide, and yttria doped zirconia (YSZ) and a step of subjecting to heat treatment after the above-mentioned powder is made a green compact. The heat treatment temperature is 1200 to 1600° C.

Or else, it is a composite powder comprising nickel and/or nickel oxide and yttria doped zirconia (YSZ), and the nickel base/zirconium base composite powder is prepared by subjecting to calcination under air atmosphere or reductive atmosphere as a previous and by subjecting to heat treatment further after making the green compact. The calcination temperature and the heat treatment temperature are each 500 to 1200° C. and 600 to 1200° C. under both of the air atmosphere and the reductive atmosphere.

Or else, it is a composite powder comprising nickel and/or nickel oxide and YSZ, and the nickel base/zirconium base composite powder is prepared by synthesizing powder to which at least one of calcium, strontium and magnesium is doped to a zirconium element.

Or else, it is a composite powder comprising nickel and/or nickel oxide and YSZ, and the nickel type/zirconium type composite powder is prepared by synthesizing powder to which at least one of cobalt, aluminum, titanium and magnesium is doped to a nickel oxide.

Or else, it is a nickel base/zirconium base composite powder with an optional ratio of a nickel element, zirconium element and yttrium element, and the nickel base/zirconium base composite powder is prepared by mixing these composite powder having different grain sizes. A ratio of the grain sizes of the mixed powder is made ½ or less. Also, in a formulation of the mixed powder, smaller powder (fine powder) is made 5 wt % to 50 wt % to larger powder (coarse powder).

The above-mentioned powder can be obtained by synthesizing with a co-precipitation method by making starting materials water-soluble metal salts such as nitrates, sulfates, carbonates or chlorides, etc.

The powder is subjected to heat treatment at a temperature of 600 to 1600° C. under air atmosphere or reductive atmosphere to produce a nickel base/zirconium base composite powder.

After subjecting to the heat treatment, graininess of the powder is regulated to 0.2 $\mu$m to 50 $\mu$m, and a slurry is prepared by using them and a film is formed by a slurry coating method.

The film material is sintered under air atmosphere at 1100° C. to 1500° C. or reductive atmosphere at 1100° C. to 1400° C. Incidentally, in the sintering under the reductive atmosphere, a side containing nickel and/or nickel oxide on the YSZ solid electrolyte film is made the reductive atmosphere, and a side containing LaMnO$_3$ type air electrode of the YSZ solid electrolyte film is made an oxidative atmosphere, and the sintering is carried out.

As effects of the third aspect of the present invention, when nickel type/zirconium base composite powder is to be synthesized, pressure is applied to the powder to make a green compact, and after making NiO grains and YSZ grains in a tight state, a heat treatment at a high temperature is carried out to obtain sufficient adhesiveness between NiO and YSZ. Also, by effecting a reductive treatment of nickel type/zirconium type composite powder, Ni/YSZ composite powder may be prepared.

When a green compact of NiO/YSZ composite powder is used, at the time of operating SOFC (100° C., reduction), NiO is reduced to Ni and a porosity of the fuel electrode film itself is increased. Due to increase in the porosity of the fuel electrode film, it is possible to make a fuel electrode film having a high gas permeability.

On the other hand, when a green compact of Ni/YSZ composite powder is used, particularly when reductive sintering is carried out, Ni has higher sintering property than NiO so that it is possible to form a strong and firm fuel electrode film at a lower temperature. Also, in an atmospheric sintering, Ni is oxidized to NiO during sintering, the same effect as the above-mentioned NiO/YSZ can be expected.

Moreover, as a previous step before making a green compact, by carrying out calcination under air atmosphere or reductive atmosphere, it is possible to more uniformly disperse the NiO grains or Ni grains and YSZ grains, and also adhesiveness between grains can be heightened.

By adding at least one of calcium, strontium and magnesium to the nickel base/zirconium base composite powder, sintering properties of the composite powder is improved so that conductivity is to be improved.

By adding at least one of cobalt, aluminum, titanium and magnesium to the nickel base/zirconium base composite powder, they are dispersed in Ni and/or NiO in the composite powder, and agglomeration of Ni can be prevented during a long term operation under high temperatures and reductive atmosphere.

In the synthesis of a fuel electrode powder, in the nickel base/zirconium base composite powder, these composite powder having different grain sizes are to be mixed. By mixing coarse powder to fine powder, sintering properties are improved and bonding forces between grains are increased whereby occurrence of fine cracks on the surface of the fuel electrode by reduction during a long term operation under high temperatures and reductive atmosphere can be controlled.

When the nickel base/zirconium base composite powder of the present invention is to be applied to a solid electrolyte type fuel cell, at an interface with the solid electrolyte, NiO and/or Ni is made 30 mol % to 50 mol %, and at an upper layer of the interface, NiO and/or Ni is made 50 mol % or more. The reason is because, at the interface with the solid electrolyte, adhesiveness with YSZ which is a solid electrolyte material is important and if NiO and/or Ni is 50 mol % or more, adhesiveness is lowered. Also, at the upper layer of the interface, high conductivity is required and if NiO and/or Ni is less than 50 mol %, conductivity is abruptly lowered.

A Y$_2$O$_3$ content of YSZ in the nickel base/zirconium base composite powder of the present invention is preferably 3 to mol %, more preferably 8 to 12 mol %. The reason is that an ion conductivity of YSZ to be used as the solid electrolyte is excellent in this range so that matching between the solid electrolyte and a fuel electrode is good.

The production process of the composite powder of the present invention is preferably a co-precipitation method. According to the co-precipitation method, a composite powder having a uniform structure and composition can be obtained and an interfacial conductivity between the electrode (the fuel electrode) and the solid electrolyte can be increased several. times as compared to a composite powder prepared by a solid mixing method.

As a pressure for forming a green compact of the nickel type/zirconium type composite powder, it is sufficient to make the pressure 100 kgf/cm² or more. If it is 100 kgf/cm² or less, sufficient green compact cannot be obtained.

In the nickel base/zirconium base composite powder which a green compact was made without effecting calcination, the heat treatment temperature is preferably 1200 to 1600° C. If it is 1200° C. or less, a tight powder which NiO and YSZ are sufficiently contacted to each other cannot be obtained. Also, if it is made 1600° C. or more, sintering of YSZ in the nickel base/zirconium base composite powder is too progressed so that regulation of graininess by grinding and classification is difficult, and formation of a strong and firm fuel electrode film cannot be carried out at the time of film-formation and sintering which are the later steps.

When a green compact is prepared after subjecting to calcination, the calcination temperature is preferably 500° C. to 1200° C. in air atmosphere. If it is higher than 1200° C., sintering of YSZ in the nickel base/zirconium base composite powder is excessively progressed in relation between the green compact preparation and the heat treatment temperature thereafter, and the powder becomes powder in which NiO grains and YSZ grains are not uniformly dispersed. The same can be applied to the preparation under the reductive atmosphere. Also, a temperature of subjecting a green compact of the nickel base/zirconium base composite powder to heat treatment under air atmosphere is preferably 600° C. to 1200° C. If it is lower than 600° C., tight powder in which NiO and YSZ are sufficiently contacted cannot be obtained. Also, if it exceeds 1200° C., sintering of YSZ in the nickel base/zirconium base composite powder is excessively progressed in relation with the calcination temperature, regulation of graininess by grinding and classification is difficult, and formation of a strong and firm fuel electrode film cannot be carried out at the time of film-formation and sintering which are the later steps. In the heat treatment under the reductive atmosphere, the same can be applied as under the air atmosphere.

In the nickel base/zirconium base composite powder which is not subjected to compression procedure, it is preferable to carry out the heat treatment at a temperature of 800° C. to 1600° C. If it is lower than 800° C., sufficient sintering property cannot be obtained in the nickel base/zirconium base composite powder. Also, if it is made 1600° C. or higher, sintering of YSZ in nickel base/zirconium base composite powder is excessively progressed, regulation of graininess by grinding and classification is difficult, and formation of a strong and firm fuel electrode film cannot be carried out at the time of film-formation and sintering which are the later steps.

Regulating of graininess of the slurry grains in the present invention can be carried out by classification, etc. after grinding. Also, the content of the ceramics grains in the slurry is preferably 10 parts to 50 parts to 100 parts of the slurry solution. A composition of the slurry solution of a slurry in the present invention is not specifically limited. The slurry may contain a solvent, a binder, a dispersant, an anti-foaming agent, etc. However, it is preferable to contain, as a solvent, a hardly volatile, solvent in an amount of 10 to 80 wt % to the slurry solvent. An action of the hardly volatile solvent is to control viscosity change of the slurry at the time of preparing a slurry and during preservation, and to control occurrence of cracks caused by drying after film-formation (e.g., by dipping) by using this slurry. Here, the degree of hardly volatility is preferably, for example, 1 or less when the volatility of butyl acetate is made 100. For example, there may be mentioned α terpineol, etc.

In the slurry solution, a usual volatile solution may be contained other than the hardly volatile solvent. An action of the solvent contained in the solution is to improve dispersibility of the solid electrolyte powder and improve defoaming property. As an examples of such a solvent, ethyl alcohol is preferable. A preferable content thereof is 20 to 90 wt % of the slurry solution.

An action of the binder contained in the slurry solution is to improve coating property (adhesiveness) of the powder to the substrate. An amount of the binder is preferably 0.1 to parts to 100 parts of the solvent. The reason is that if it is a low concentration (less than 0.1 wt % or less), coating property is poor, while if it is a high concentration. (exceeding 10 wt %), dispersibility of the powder becomes poor. Specific examples of the binder may be preferably mentioned ethyl cellulose.

An action of a dispersant contained in the slurry solution is to improve dispersibility of the powder. An amount of the dispersant is preferably 0.1 to 4 parts to 100 parts of the solvent. The reason is that if it is a low concentration (less than 0.1 wt % or less), dispersibility is low, while if it is a high concentration (exceeding 4 wt %), modification of the slurry is likely caused. Specific examples of the dispersant may be preferably mentioned polyoxyethylene alkylphosphate.

An anti-foaming agent contained in the slurry solution has an action of defoaming bubbles in the slurry solution. An amount of the anti-foaming agent is preferably 0.1 to 4 parts to 100 parts of the solvent. The reason is that if it is a low concentration (less than 0.1 wt % or less), its effect cannot be expected, while if it is a high concentration (exceeding 4 wt %), modification of the slurry is likely caused. Specific examples of the anti-foaming may be preferably mentioned sorbitan sesquioleate.

As the mixing method of the respective agents and the solid electrolyte powder, a usual method of ball mill, etc. may be employed.

The application method of the slurry to the substrate in the production process of the present invention is not particularly limited. It may be a dipping method, spray method, brushing method, etc. Of these, a dipping method is preferred. It is simple and easily, excellent in mass productivity and low cost. As the dipping method, in addition to the usual dipping method which a substrate is dipped in a slurry in air, a method of dipping in a pressurized gas or in vacuum can be employed. In this case, a number of dipping times can be selected depending on the required film thickness and the slurry composition to be used.

As a sintering temperature of the nickel base/zirconium base composite film is preferably 1100 to 1500° C. under air atmosphere and 1100° C. to 1400° C. under reductive atmosphere. If it is lower than 1100° C., it is close to the operating conditions of SOFC (1000° C.) so that aggregation of Ni grains during operation of SOFC becomes large. Also, in sintering on the YSZ film which is a solid electrolyte, adhesiveness to YSZ cannot sufficiently be ensured.

Also, in air atmosphere, if it is higher than 1500° C., it may become a cause of sintering crack of the electrolyte film, etc., and under the reductive atmosphere, if it is higher than 1400° C., a melting point of Ni is at around 1450° C. so that Ni is melted whereby it is difficult to ensure porous structure.

A temperature raising speed at the time of sihtering is preferably 300° C./hr or less. If it is faster than 300° C./hr, before NiO is sufficiently reduced to Ni during temperature raising, sintering of NiO proceeds. If sintering of NiO proceeds before NiO is reduced to Ni, a stress due to volume shrinkage occurs to the sintering film itself of the fuel electrode so that it becomes a cause of generating cracks.

As the fourth aspect of the present invention, when an interconnector film of a tight ceramics film (hereinafter also referred to as a tight ceramics film) is formed on an air electrode (hereinafter also referred to as aporous substrate), a ceramics intermediate layer is formed between the air electrode and the interconnector film so that it is possible to form a tight film of a sintering-resistant material such as lanthanum chromite, etc., by the wet method.

In the formation of an interconnector film of SOFC, by forming a lanthanum chromite film at the oxidation atmosphere side and forming a nickel oxide film at the reductive atmosphere side and then sintering, it is possible to form an interconnector film which can reduce output loss accompanied by contact resistance with a collecting material at the time of power generation, and realize high output of a cell by an inexpensive wet method.

In the present invention, it is said to preferably form a ceramics intermediate layer having a gas permeation flux $Q \leq 50$ (m·hr$^{-1}$·atm$^{-1}$) between a porous substrate and a tight ceramics film. The reason is that if $Q>50$ (m·hr$^{-1}$·atm$^{-1}$), gas sealing property of the tight ceramics film to be formed thereon becomes worse, particularly when a liquid phase sintering is carried out as an alkaline earth metal doped lanthanum chromite, if the ground is porous, diffusion of the liquid phase component occurs whereby it is difficult to become tight. From this viewpoint, the ceramics intermediate layer preferably has a gas permeability as little as possible.

A gas permeation flux Q2 of the tight ceramics film herein mentioned is preferably a gas permeation flux $Q2 \leq 0.01$ (m·hr$^{-1}$·atm$^{-1}$) measured between the porous substrate and the tight ceramics film. The reason is that when the tight sintered film is used as an interconnector film of SOFC, if the gas permeation flux $Q2>0.01$, an output of SOFC may be reduced.

In the present invention, it is preferred to subject to a surface roughening treatment after formation of the ceramics intermediate layer. The reason is that if a film-formation is carried out on a smooth ceramics substrate, adhesiveness to the film is poor and peeling of the film after sintering may be caused.

In the present invention, when a thickness of the ceramics intermediate layer which is tight in a certain degree before subjecting to surface roughening treatment is made t1 ($\mu$m) and a film thickness after the surface roughening treatment is made t2 ($\mu$m), it is made $0.01 \leq (t1-t2)/t1 \leq 0.2$. If $(t1-t2)/t1<0.01$, unevenness of the surface is too small so that adhesiveness of the film is poor and peeling of the film occurs. On the other hand, if $(t1-t2)/t1>0.2$, a function ($Q \leq 50$ (m·hr$^{-1}$·atm$^{-1}$), etc.) of the ceramics intermediate layer may be impaired.

A method of the surface roughening treatment of the present invention is not particularly limited. There are a method of treating with a sand paper, a method of spraying an abrasive on the surface (blast abrasion) by a spray, a method of attacking the surface by using chemicals such as an acid, an alkali, etc., and the like. Of these, the method of blast abrasion is preferred since operating step can be finished within a short time.

The abrasive to be used in the surface roughening treatment of the present invention is not particularly limited. There may be used silicon carbide, boron carbide, alumina, diamond, zirconia, etc. Of these, alumina and zirconia are preferable.

In the formation of a tight ceramics film of the present invention, it is preferred that a film is formed by the film forming method containing the step of dipping the material in the state of applying a differential pressure between the film forming surface and the surface of the opposite side (an opposite film forming surface) and a step of drying, and then, sintering. The reason is that in the film preparation comprising only the step of dipping the material with a relatively low differential pressure of less than 1 atm and drying, since a filling degree of powder at the film-formed portion is low, a tight film can hardly be obtained after sintering. Also, if when a high differential pressure exceeding 20 atm is applied, unevenness in powder distribution attached to the film forming portion may be caused, and when it becomes this state, there is a fear of causing peeling of the film or sintering crack after sintering. From this viewpoint, the differential pressure is preferably 1 atm $\leq \Delta P \leq$ 20 atm.

In the formation of a tight ceramics film of the present invention, it is preferred to form a film from a slurry containing powder having low sintering property and a slurry containing powder having high sintering property and sinter the film. The reason is that in a film-formed by using powder having low sintering property only, it is difficult to obtain a film having a high tightness, while in a film-formed by using powder having high sintering property only, peeling of the film or sintering crack after sintering may be caused.

The composition of the powder having low sintering property and the composition of the powder having high sintering property in the preparation of a tight ceramics film of the present invention are not particularly limited. They may be the same composition or different compositions, and further may be different materials.

For example, in the case of the same composition, Sr doped lanthanum chromite, Ca doped lanthanum manganite, etc., may be considered, while in the case of the different compositions, a combination of $La_{0.8}Ca_{0.2}CrO_3$ and $La_{0.7}Ca_{0.3}CrO_3$ or a combination of $La_{0.8}Ca_{0.2}CrO_3$ and $(La_{0.8}Ca_{0.2})(Cr_{0.9}Cu_{0.1})O_3$, and the like, can be considered. In the case of the different materials, a combination of Ca doped lanthanum chromite and calcium titanate, Ca doped lanthanum chromite and Ca doped lanthanum manganite, and the like, can be considered.

When the powder having low sintering property and the powder having high sintering property in the tight ceramics film of the present invention are the same composition, powder having high calcination temperature is made powder having low sintering property, and when they are different compositions or different materials, that having a low shrinkage ratio is made powder having low sintering property in the case of forming a press body and sintering the same temperature.

A calcination temperature of the powder having low sintering property to be used in the formation of the tight ceramics film according to the present invention is preferably 1000 to 1400° C. The reason is that if the powder having a calcination temperature of less than 1000° C. is used, sintering property is too high so that peeling of the film or sintering crack may be caused, while if it exceeds 1400° C., sintering property is low so that a film having high tightness can hardly be obtained.

An average grain size of the powder having low sintering property to be used in the formation of the tight ceramics film according to the present invention is preferably 0.1 to 2 $\mu$m. The reason is that if the grain is larger than 2 $\mu$m, a tight film can hardly be obtained, while if it is less than 0.1 $\mu$m, sintering property is improved so that there is a fear of causing peeling of a film or sintering crack.

A calcination temperature of the powder having high sintering property to be used in the formation of the tight ceramics film according to the present invention is preferably 800 to 1100° C. The reason is that if it is less than 800° C., sintering property is improved excessively so that it causes peeling of the film or sintering crack, while if it exceeds 1100° C., sintering property is low so that a tight film can hardly be obtained.

An average grain size of the powder having high sintering property to be used in the formation of the tight ceramics film according to the present invention is preferably 0.1 to 1 $\mu$m. The reason is that if the grain is larger than 1 $\mu$m, a tight film can hardly be obtained, while if it is less than 0.1 $\mu$m, sintering property is improved so that there is a fear of causing peeling of a film or sintering crack.

In the ceramics intermediate layer according to the present invention, formation of a film has been carried out by using two kinds of slurries, one of which is a coarse powder slurry containing a film substance having a relatively large grain size and the other is a fine powder slurry containing a film substance having a relatively small grain size, to form a film by sintering. This is because if the coarse slurry is used only, sintering property is low so that formation of a film having a tightness in a certain degree of $Q \leq 50$ (m·hr$^{-1}$·atm$^{-1}$) is difficult, while if the fine slurry is used only, sintering property is too high so that shrinkage at sintering is too high whereby sintering crack or peeling of the film is likely caused.

In the formation of the ceramics intermediate layer according to the present invention, when the coarse powder composition is $(La_{1-X1}M_{X1})_{Y1}MnO_3$, and the fine powder composition is $(La_{1-X2}M_{X2})_{Y2}MnO_3$, then, it is preferred that they are within the range of $0 < X1 \leq X2 \geq 0.4$, $0.9 \leq Y1 < 1$, and $0.9 \leq Y2 \leq 1$.

The reasons are that if $X1=0$ or $X2=0$, sintering property of the material itself is low so that formation of a film having a tightness in a certain degree of $Q \leq 50$ (m·hr$^{-1}$·atm$^{-1}$) is difficult, while if $X1$ or $X2 > 0.4$, sintering property is too high so that sintering crack or peeling of the film may be caused.

If $Y1$ or $Y2 < 0.9$, the manganese component is easily liberated or diffused and there is a problem in durability of the material, while if $Y1$ or $Y2 > 1$, sintering property is markedly lowered so that it is difficult to obtain a tight film.

In the ceramics intermediate layer according to the present invention, when the calcination temperature of the coarse powder is T1 and the calcination temperature of the fine powder is T2, it is preferred to be $T1 \geq T2$. The reason is that if the calcination temperature of the fine powder is higher than the other, a role of the fine powder as a sintering aid is reduced and it is difficult to form a film having a tightness in a certain degree of $Q \leq 50$ (m·hr$^{-1}$·atm$^{-1}$).

In the ceramics intermediate layer according to the present invention, when an amount of the coarse powder to be used in the coarse powder slurry is A g, and an amount of the fine powder is B g, the ratio of the amount of the coarse powder and that of the fine powder is preferably $0.1 \leq B/(A+B) \leq 0.5$. The reason is that if $B/(A+B) < 0.1$, an amount of the fine powder is little so that a tight film is hardly obtained, while if $B/(A+B) > 0.5$, an amount of the fine powder is too much so that sintering property is too high whereby sintering crack and peeling of the film are likely caused.

A substance to be doped to lanthanum chromite according to the present invention is not particularly limited. There may be employed Ca, Sr, Mg, Co, Zn, Ti, Li, Cu, etc. In the viewpoint that a tight film can be formed at the sintering temperature of the interconnector film of 1300 to 1550° C., lanthanum chromite containing Ca is preferred.

The synthesizing method of the lanthanum chromite powder according to the present invention is not particularly limited. There may be employed a coprecipitation method, powder mixing method, spray thermal decomposition method, sol gel method, evaporation to dryness method, etc. Of these, the spray thermal decomposition method is preferred in the viewpoints that uniformity of the composition is high, migration of impurities such as silica, iron, etc. is little, operation step is short (cost is cheap), etc.

In the present invention, a solution of a slurry for preparing a ceramics intermediate layer and a tight ceramics film may contain the following.

Binder: PVA, EC (ethyl cellulose), etc. An amount thereof is preferably 0.1 to 10 parts by weight to 10 parts by weight of the solvent.

Difficultly volatile solvent: α-terpineol, etc. An amount thereof is preferably 10 to 80 parts by weight to 100 parts by weight of the solvent.

Solvent: ethanol, 2-propanol, methanol, etc. An amount thereof is preferably 20 to 90 parts by weight to 100 parts by weight of the solvent.

Dispersant: polyoxyethlene alkylphosphate, CTAB, etc. An amount thereof is preferably 0.1 to 4 parts by weight to 100 parts by weight of the solvent.

Anti-foaming agent: sorbitan sesquioleate, etc. An amount thereof is preferably 0.1 to 4 parts by weight to 100 parts by weight of the solvent.

As a structure of an interconnector for SOFC according to the present invention, it is preferred to form a lanthanum chromite film at the oxidative atmosphere side and a nickel oxide film at the reductive atmosphere side. The reason is that in the interconnector comprising only lanthanum chromite, conductivity is markedly lowered at the reductive atmosphere side, and when a nickel oxide film is formed at the reductive atmosphere side, nickel oxide is changed to nickel to improve conductivity.

In the present invention, a sintering temperature of the interconnector film is preferably 1300 to 1550° C. The reason is that if it is less than 1300° C., an activity of a sintering aid (in Ca doped, calcium chromate and in Sr doped, strontium chromate) for lanthanum chromite is low and a tight film can hardly be obtained, while if it exceeds 1550° C., in the formation of a solid electrolyte type fuel cell, sintering shall be carried out at higher temperature than the other material and thus, it is not practical. Incidentally, an atmosphere at the sintering is preferably air atmosphere in view of the other material (particularly an air electrode material).

An average gain size of nickel oxide powder in the present invention is preferably 0.1 to 20 $\mu$m. The reason is that if it is less than 0.1 $\mu$m, sintering property is too high so that sintering crack, peeling of the film, etc. may be caused, while if it exceeds 20 $\mu$m, sintering property is too low so that it is difficult to form a tight film.

BRIEF DESCRIPTION OF THE DRAWINGS

FIG. 27A is a lengthwise sectional view of whole shape, and FIG. 27B is a lateral sectional view showing B—B section of FIG. 27A.

BEST MODE FOR CARRYING OUT THE INVENTION

Figure 1:
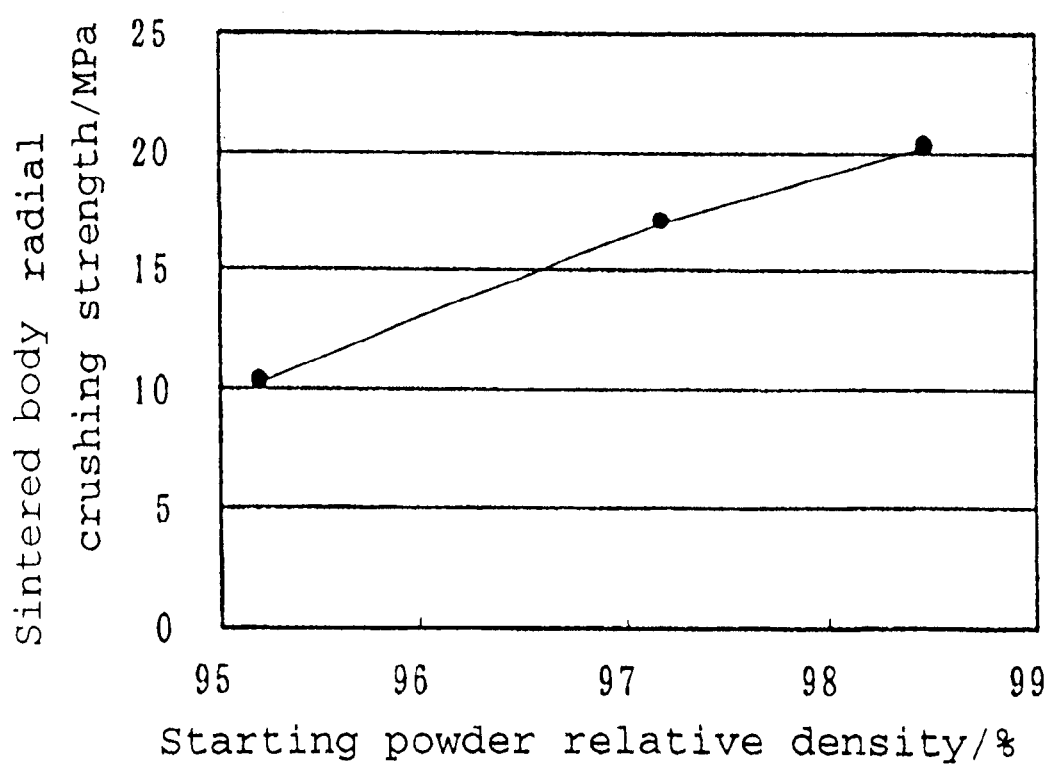
FIG. 1 is a graph showing a relative density of starting powder according to the embodiment of the present invention and a radial crushing strength of the sintered body prepared therefrom.

Embodiments of the present invention are explained in detail below.

EXAMPLE 1

Preparation Process of Test Cell and Test Method

By using powder wherein $(La_{0.75}Sr_{0.25})_{0.99}MnO_3$ powder or $(La_{0.80}Sr_{0.20})_{0.99}MnO_3$ powder having an average grain size of 20 to 50 μm was added by 5 to 15 wt % of powder of the same composition having an average grain size of 0.5 μm, seven kinds of samples having characteristics of 8.9 to 33.2 MPa radial crushing strength and 2.1 to 7.2 $m^2 \cdot hr^{-1} \cdot atm^{-1}$ gas permeation coefficient were prepared, and using these as an air electrode support to form a cell for a solid electrolyte type fuel cell and evaluation of power generation performance was carried out.

Also, with regard to $(La_{1-x}Sr_x)_{1-a}MnO_3$ and $(La_{1-x}Ca_x)_{1-a}MnO_3$, powders and sintered bodies were prepared by varying x and a within a certain range to make samples for evaluating air electrode support characteristics. Measurements of a radial crushing strength, a gas permeation coefficient and conductivity were carried out. Preparation methods are as follows.

As starting materials, lanthanum nitrate, strontium nitrate, calcium nitrate and manganese nitrate were weighed and mixed, and the mixture was subjected to heat treatment at 1400° C. for 10 hours, then, crushed and classified. Grain size of the powder was measured by using a laser diffraction scattering type grain size distribution measurement device and the grain size was subjected to measurement based on the volume. To 100 parts of the powder were added 10 parts of an organic binder, 3 parts of glycerin and 10 parts of water, the mixture was mixed in a mixer and kneaded by using a kneader. The kneaded material was formed by using an extrusion forming machine, dried and subjected to decreasing treatment. Subsequently, the material, was sintered in a gas sintering furnace at 1400 to 1500° C. for hours to form an air electrode support. A sample shape of an power generating experiment was an outer diameter of 22 mm, a thickness of 2.0 mm and a length of 1000 mm, and a number of each sample was made 30 pieces. A shape of samples for evaluating characteristics of the air electrode support was a diameter of 22 mm, a thickness of 2.0 mm and a length of 50 mm.

By using the air electrode support for an power generating experiment thus formed, cells were formed by the following method. On the outer surface of the air electrode support, an interconnector film having a width of 7.0 mm×a length of 900 mm×a thickness of 50 μm (an axis direction, linear state) was formed by the slurry coating method. The material to be used was $La_{0.75}Ca_{0.25}CrO_3$ and the sintering temperature was made 1400° C.×2 hours.

Next, a mixed layer was formed on the surface other than the interconnector of the air electrode support. A coprecipitation powder (a mixed weight ratio in conversion of an oxide 50:50) of 8 mol % YSZ and $(La_{0.75}Sr_{0.25})_{0.09}MnO_3$ according to the same method as described in Japanese Patent publication number Kokai Hei:9-86932 (the same applicant as in the present application). A film was formed by using the material according to the slurry coating method and sintered at 1500° C. for 5 hours. A thickness of the mixed layer was 30 μm.

An electrolyte film was formed on the surface of the mixed layer. A film of 8 mol % YSZ having a grain size of 0.3 μm was formed by the slurry coating method and sintered at 1500° C. for hours. A thickness of the electrolyte was 20 μm.

A fuel electrode was formed on the surface of the electrolyte. A film of NiO/YSZ powder (a weight ratio after Ni reduction 60:40) obtained by the coprecipitation method was formed by the slurry coating method and sintered at 1400° C. for 2 hours. A thickness of the fuel electrode was 100 μm. Next, the fuel electrode was subjected to reduction treatment under 3% $H_2$ and 97% $N_2$ atmosphere at 1000° C.

By using 18 cells formed as mentioned above, a bundle comprising 6 series connection and 3 parallel connection was formed, and by using air as an oxidizing agent and $H_2$+11% $H_2O$ as a fuel, an power generation evaluating operation was carried out with a fuel utilization ratio of 80%. An operation temperature was 1000° C. and continuous operation was carried out for 1000 hours during which a heat cycle test to room temperature was once carried out.

Also, characteristics such as a radial crushing strength, a gas permeation property, conductivity, etc. of the formed air electrode support were evaluated by the methods as mentioned below. A sample with a length of 50 mm was placed in air at 20° C. and differential pressure ($N_2$ gas) of 0.1 $kgf/cm^2$ was applied to the inner and outer surfaces of the sample. Under this differential pressure, an amount of $N_2$ gas permeating the sample was measured to calculate the gas permeation coefficient.

The radial crushing strength was calculated from the following equation by using a load value at break when a sample was placed between compressing tools and compressed from upside and downside until break.

$$\square_r = Px(D-d)/(l \times d^2)$$

Here $\square_r$ represents a radial crushing strength, P represents a break load, D represents an outer diameter of the sample, d represents a thickness and l represents a length of the sample.

With regard to $(La_{1-x}Sr_x)_{1-a}MnO_3$ and $(La_{1-x}Ca_x)_{1-a}MnO_3$ powder within the range of $0.10 \leq x \leq 0.40$ and $0 \leq a \leq 0.07$, air electrode supports were formed according to the above-mentioned method. To these supports were carried out evaluations of a radial crushing strength, a gas permeation property and conductivity according to the same method.

Conductivity of the sample was measured by a four-terminal method under air atmosphere at 1000° C.

(Relationships Between Radial Crushing Strength, Gas Permeation Coefficient and Yield at Cell Formation Step of Air Electrode Support, and Cell Breakage Ratio After Power Generating Test and Output Density)

Table 1 shows a table showing a relationship between a radial crushing strength, a gas permeation coefficient of air electrode support and a yield at cell formation step of air electrode support when a solid electrolyte type fuel battery cell was formed by using it as an air electrode support, and a cell breakage ratio after power generating test and an output density

TABLE 1

Relationships between yield at cell formation step, cell breakage ratio after power generating test and output density

| Radial crushing strength/ MPa | Gas permeation coefficient/ $m^2 \cdot hr^{-1} \cdot atm^{-1}$ | Yield at cell formation step/% | Cell breakage ratio after power generating test/% | Output density/ $W/cm^2$ |
|---|---|---|---|---|
| 8.9 | 7.2 | 67 | 11 | — |
| 15.0 | 5.7 | 97 | 0 | 0.35 |
| 17.7 | 5.0 | 97 | 0 | 0.30 |
| 18.7 | 4.6 | 97 | 0 | 0.26 |
| 20.5 | 4.0 | 100 | 0 | 0.23 |
| 21.7 | 3.5 | 100 | 0 | 0.21 |
| 33.2 | 2.1 | 100 | 0 | 0.15 |

In the sample having a radial crushing strength of less than 15 MPa, breakage of the cell was observed after the power generating test. A stress generating at the cell during power generation or heat cycle is considered to be a sum total of stresses caused by compressing pressure by a collecting plate and a thermal stress generating in the sell itself caused by the difference in thermal expansion coefficients of cell constituting materials.

From the results of the experiment, it is found that if the radial crushing strength of the air electrode support is 15 MPa or more, no breakage of the cell occurs during power generation. Also, with regard to the sample having the radial crushing strength of 15 to 18.7 MPa, there are little number of samples which breaks during cell formation. Also, with regard to the samples using an air electrode support having the radial crushing strength of 33.2 MPa and the gas permeation coefficient of 2.1 $m^2 \cdot hr^{-1} \cdot atm^{-1}$, the output density was 0.15 $W/cm^2$. Accompanying with increase in the gas permeation coefficient, there is a tendency of increasing the output density. It was found that when the gas permeation coefficient was 3.5 $m^2 \cdot hr \ atm^{-1}$ or more, the output density became 0.2 $W/cm^2$ or more and when the gas permeation coefficient was 5.0 $m^2 \cdot hr^{-1} \cdot atm^{-1}$ or more, the output density became 0.3$W/cm^2$ or more. From the results as mentioned above, the radial crushing strength of the air electrode support is required to be 15 MPa or more, more preferably 20 MPa or more, and the gas permeation coefficient is preferably 3.5 $m^2 \cdot hr^{-1} \cdot atm^{-1}$ or more, and more preferably 5.0 $m^2 \cdot hr^{-1} \cdot atm^{-1}$ or more.

(Relationship Between A Cite/B Cite Ratio Coefficient of Air Electrode Support Composition, Radial Crushing Strength and Gas Permeation)

In Table 2, a relationship between the air electrode support composition, a radial crushing strength and a gas permeation coefficient is shown.

TABLE 2

Relationship between air electrode support composition, radial crushing strength and gas permeation coefficient

| Composition | Radial crushing strength/MPa | Gas permeation coefficient/$m^2 \cdot hr^{-1} \cdot atm^{-1}$ |
|---|---|---|
| $(La_{0.75}Sr_{0.25})_{0.93}MnO_3$ | 33.5 | 0.08 |
| $(La_{0.75}Sr_{0.25})_{0.96}MnO_3$ | 24.5 | 0.34 |
| $(La_{0.75}Sr_{0.25})_{0.97}MnO_3$ | 20.5 | 3.55 |
| $(La_{0.75}Sr_{0.25})_{0.98}MnO_3$ | 18.7 | 3.66 |
| $(La_{0.75}Sr_{0.25})_{0.99}MnO_3$ | 16.9 | 3.68 |
| $(La_{0.75}Sr_{0.25})_{1.00}MnO_3$ | 11.7 | 4.06 |

A tendency was found that when the A cite/B cite ratio decreased, the radial crushing strength increased and the gas permeation coefficient lowered. The A cite/B cite ratio herein mentioned is a value in which, in a perovskite base crystal structure $ABO_3$, a number of atoms of La and Sr or La and Ca occupying the A cite is divided by a number of atoms of Mn occupying the B cite. In the cases where the A cite/B cite ratio is 0.93 or 0.96 and in the case where it is 1.00, the conditions that the radial crushing strength is 15 MPa or more and the gas permeation coefficient is 3.5 $m^2 \cdot hr^{-1} \cdot atm^1$ or more cannot be ensured. From the above results, the A cite/B-cite ratio is preferably 0.97 or more and less than 1.00.

(Relationship Between Sr Doped Amount of Air Electrode Support, Radial Crushing Strength and Gas Permeation Coefficient)

In Table 3, a relationship between the air electrode support composition, a radial crushing strength and a gas permeation coefficient is shown.

TABLE 3

Relationship between air electrode support composition, radial crushing strength and gas permeation coefficient

| Composition | Radial crushing strength/MPa | Gas permeation coefficient/$m^2 \cdot hr^{-1} \cdot atm^{-1}$ |
|---|---|---|
| $(La_{0.90}Sr_{0.10})_{0.99}MnO_3$ | 10.2 | 3.74 |
| $(La_{0.86}Sr_{0.14})_{0.99}MnO_3$ | 16.5 | 3.54 |
| $(La_{0.84}Sr_{0.16})_{0.99}MnO_3$ | 25.1 | 3.78 |
| $(La_{0.83}Sr_{0.17})_{0.99}MnO_3$ | 22.8 | 4.28 |
| $(La_{0.82}Sr_{0.18})_{0.99}MnO_3$ | 25.7 | 4.95 |
| $(La_{0.81}Sr_{0.19})_{0.99}MnO_3$ | 25.9 | 4.89 |
| $(La_{0.80}Sr_{0.20})_{0.99}MnO_3$ | 27.6 | 4.46 |
| $(La_{0.79}Sr_{0.21})_{0.99}MnO_3$ | 30.8 | 3.62 |
| $(La_{0.77}Sr_{0.23})_{0.99}MnO_3$ | 18.0 | 3.55 |
| $(La_{0.75}Sr_{0.25})_{0.99}MnO_3$ | 16.9 | 3.68 |
| $(La_{0.74}Sr_{0.26})_{0.99}MnO_3$ | 15.2 | 3.85 |
| $(La_{0.73}Sr_{0.27})_{0.99}MnO_3$ | 13.5 | 3.60 |

In the case where the Sr doped amount is in the range of 0.14 to 0.26, it is possible to ensure the characteristics that the radial crushing strength is 15 MPa or more and the gas permeation coefficient is 3.5 $m^2 \cdot hr \ atm^{-1}$. Also, in the case where the Sr doped amount is in the range of 0.16 to 0.21, it is possible to ensure the characteristics that the radial crushing strength is 20 MPa or more and.the gas permeation coefficient is 3.5 $m^2 \cdot hr^{-1} \cdot atm^{-1}$. From the above results, it was found that the Sr doped amount was preferably 0.14 or more to 0.26 or less, more preferably 0.16 or more to 0.21 or less.

(Relationship Between Ca Doped Amount of Air Electrode Support, Radial Crushing Strength and Gas Permeation Coefficient)

In Table 4, a relationship between the air electrode support composition, a radial crushing strength and a gas permeation coefficient is shown.

TABLE 4

Relationship between air electrode support composition, radial crushing strength and gas permeation coefficient

| Composition | Radial crushing strength/MPa | Gas permeation coefficient/$m^2 \cdot hr^{-1} \cdot atm^{-1}$ |
|---|---|---|
| $(La_{0.85}Ca_{0.15})_{0.99}MnO_3$ | 12.8 | 3.72 |
| $(La_{0.80}Ca_{0.20})_{0.99}MnO_3$ | 16.1 | 4.68 |
| $(La_{0.75}Ca_{0.25})_{0.99}MnO_3$ | 21.8 | 5.35 |
| $(La_{0.70}Ca_{0.30})_{0.99}MnO_3$ | 20.0 | 7.20 |
| $(La_{0.65}Ca_{0.35})_{0.99}MnO_3$ | 17.5 | 3.80 |
| $(La_{0.60}Ca_{0.40})_{0.99}MnO_3$ | 13.5 | 3.60 |

In the case where the Ca doped amount is in the range of 0.20 to 0.35, it is possible to ensure the characteristics that the radial crushing strength is 15 MPa or more and the gas permeation coefficient is 3.5 $m^2 \cdot hr^{-1} \cdot atm^{-1}$. Also, in the case where the Ca doped amount is in the range of 0.25 to 0.30, it is possible to ensure the characteristics that the radial crushing strength is 20 MPa or more and the gas permeation coefficient is 3.5 $m^2 \cdot hr^{-1} \cdot atm^{-1}$. From the above results, it was found that the Ca doped amount was preferably 0.20 or more to 0.35 or less, more preferably 0.25 or more to 0.30 or less.

(Conductivity Measurement Results)

As a result of measuring conductivity, in either of the samples having the radial crushing strength of 15 MPa or more, conductivity was each 80 S/cm or more. It is preferable that conductivity is 75 S/cm or more to ensure the output density of 0.2 W/cm² or more, and either of the samples satisfies the value.

EXAMPLE 2
(Formation Process of Test Cell and Test Method)

With regard to $(La_{0.80}Ca_{0.20})_{0.99}MnO_3$ powder and $(La_{0.75}Ca_{0.25})_{0.99}MnO_3$ powder prepared in the same manner as in Example 1, coarse powder was classified into the grain size distribution of 5 to 150, 10 to 150, 10 to 200, 10 to 300, 15 to 200, 20 to 200 and 40 to 200 μm, to 100 parts of the respective powders to which 10 wt % of powder having the same composition and having an average grain size of 0.5 μm was each added, were added 10 parts of an organic binder, 3 parts of glycerin and parts of water, and then the mixture was mixed in a mixer and kneaded by using a kneader. The kneaded material was formed by using an extrusion forming machine, dried and subjected to decreasing treatment. Subsequently, the material was sintered in a gas sintering furnace at 1450° C. for 10 hours to form air electrode supports. A sample shape was an outer diameter of 22 mm, a thickness of 2.0 mm and a length of 50 mm. With regard to this sample, a radial crushing strength and a gas permeation coefficient were evaluated. Evaluations of the radial crushing strength and the gas permeation coefficient were carried out in the same manner as in Example 1. A coarse powder grain size distribution herein mentioned means that at least 99% or more of powder exists in the range. Also, an average grain size of the coarse powder prepared was 41.2 μm in the case of 10 to 150 μm, and was 62.8 μm in the case of 10 to 200 μm.

(Relationship Between Coarse Powder Grain Size Distribution and Radial Crushing Strength and Gas Permeation Coefficient)

Table 5 is showing a relationship between a coarse powder grain size distribution, and a radial crushing strength and a gas permeation coefficient with regard to $(La_{0.80}Sr_{0.20})_{0.99}MnO_3$ powder and $(La_{0.75}Ca_{0.25})_{0.99}MnO_3$ powder.

TABLE 5

Relationship between radial crushing strength and gas permeation coefficient

| Composition | Coarse powder grain size distribution/ μm | Radial crushing strength/ MPa | Gas permeation coefficient/ m² · hr⁻¹ · atm⁻¹ |
|---|---|---|---|
| $(La_{0.80}Sr_{0.20})_{0.99}MnO_3$ | 5 to 150 | 38.5 | 1.84 |
| $(La_{0.80}Sr_{0.20})_{0.99}MnO_3$ | 10 to 150 | 27.6 | 4.46 |
| $(La_{0.80}Sr_{0.20})_{0.99}MnO_3$ | 10 to 200 | 23.3 | 6.01 |
| $(La_{0.80}Sr_{0.20})_{0.99}MnO_3$ | 10 to 300 | 13.5 | 9.80 |
| $(La_{0.80}Sr_{0.20})_{0.99}MnO_3$ | 15 to 200 | 20.3 | 7.87 |
| $(La_{0.80}Sr_{0.20})_{0.99}MnO_3$ | 20 to 200 | 16.9 | 8.98 |
| $(La_{0.80}Sr_{0.20})_{0.99}MnO_3$ | 40 to 200 | 13.2 | 10.3 |
| $(La_{0.75}Ca_{0.25})_{0.99}MnO_3$ | 5 to 150 | 36.2 | 3.00 |
| $(La_{0.75}Ca_{0.25})_{0.99}MnO_3$ | 10 to 150 | 29.5 | 3.50 |
| $(La_{0.75}Ca_{0.25})_{0.99}MnO_3$ | 10 to 200 | 21.8 | 5.35 |
| $(La_{0.75}Ca_{0.25})_{0.99}MnO_3$ | 10 to 300 | 14.4 | 8.55 |
| $(La_{0.75}Ca_{0.25})_{0.99}MnO_3$ | 15 to 200 | 20.1 | 7.05 |
| $(La_{0.75}Ca_{0.25})_{0.99}MnO_3$ | 20 to 200 | 16.6 | 7.12 |
| $(La_{0.75}Ca_{0.25})_{0.99}MnO_3$ | 40 to 200 | 14.2 | 8.63 |

In either of the compositions of samples, when the grain size distribution of coarse powder is 10 to 150 μm, 10 to 200 μm or 15 to 200 μm, a characteristic of 20 Mpa or more and the gas permeation coefficient of 3.5 m²·hr atm⁻¹ can be obtained. Also, when the grain size distribution of the coarse powder is 10 to 200 or 15 to 200 μm, characteristics of 20 MPa or more and the gas permeation coefficient of 5.0 m²·hr⁻¹·atm⁻¹ can be obtained. In the samples having the grain size distribution of the coarse powder of 5 to 150 μm, 10 to 300 μm and 40 to 200 μm, characteristics of the radial crushing strength of 15 MPa or more and the gas permeation coefficient of 3.5 m²·hr⁻¹·atm⁻¹ cannot be obtained. In the case where the grain size distribution is 5 to 150 μm, sintering property is too high so that sintering excessively proceeds whereby the gas permeation property is lowered. In the case of the grain size distribution of 10 to 300 μm and 40 to 200 μm, sintering property was insufficient and sintering did not proceed sufficiently whereby it could be considered that the radial crushing strength was insufficient.

EXAMPLE 3

Lanthanum manganite powders having different density were synthesized and sintered bodies were prepared by the powders, and measurements of the radial crushing strength, conductivity and gas permeation property were carried out.
(Preparation Process of Starting Powders and Measurement of Density)

Three kinds of lanthanum man ganite powders comprising the composition of $(La_{0.80}Sr_{0.20})_{0.99}MnO_3$ and having different densities were prepared by the method as mentioned below.

As starting materials, lanthanum nitrate, strontium nitrate and manganese nitrate were weighed and mixed, then, subjected to thermal decomposition, and subjected to a heat treatment at 1400° C. for 10 hours. The material was ground and classified to prepare powder (a) having a grain size distribution within the range of 15 to 200 μm.

After this powder was ground by a ball mill, CIP forming was carried out with a pressure of 2.5 t/cm², and subjected to a heat treatment at 1400° C. for 10hours. The material was ground and classified to prepare powder (b) having a grain size distribution within the range of 15 to 200 μm.

The powder was further subjected to ball mill grinding, CIP forming and heat treatment at 1400° C. for 10 hours, and then, grinding and classification were carried out to prepare powder (c) having a grain size distribution within the range of 15 to 200 μm.

Bulk densities of the prepared powders were measured by using a Gay-Lussac type specific gravity bottle (pyconometer). Also, XRD measurement was carried out and a lattice constant of the perovskite base crystal which is a crystal structure of the prepared powder was obtained, and a theoretical density of the powder was calculated therefrom. An oxygen number of the lanthanum manganite was obtained by using an oxidation-reduction titration method. To the sample powder were added KI, distilled water and HCl to completely dissolve the sample. This solution was subjected to oxidation-reduction titration by using a $Na_2S_2O_3$ solution to obtain amounts of $Mn^{3+}$ and $Mn^{4+}$ ions, and an oxygen number was determined therefrom. From the above-mentioned bulk density and the theoretical density, a relative density of the powder was calculated. Calculated relative densities of the respective powders (a), (b) and (c) were 95.2%, 97.2% and 98.5%, respectively.
(Preparation of Sintered Body)

Sintered bodies were formed from the prepared powders according to the following method.

To the prepared powder having a size of 15 to 200 μm was added a fine powder prepared by the same method and ground to submicron with an inner ratio of 10 parts. To 100 parts of the powder were added 10 parts of an organic binder, 10 parts of water and 3 parts of glycerin, and the mixture was mixed and kneaded by using a mixer and a kneader. This kneaded material was subjected to extrusion forming under the conditions of a pressure of 30 kgf/cm² and a temperature of 10° C., and then, subjected to drying and degreasing. Subsequently, sintering was carried out in a gas furnace at 1450° C. for 10 hours to prepare a pipe shaped sintered body having an outer diameter φ of 20 mm, a thickness of 2.0 mm and a length of 50 mm.
(Measurement of Conductivity)

Conductivity of the formed sintered body was measured under air atmosphere at 1000° C. by the four-terminal method. Conductivities of the sintered bodies formed from the powders (a), (b) and (c) were 85.7, 87.4 and 96.4 S/cm, respectively. For an air electrode support of a solid electrolyte type fuel cell, it is preferred to have the conductivity of 75 S/cm or more and either of them satisfied the requirement.
(Measurement of Radial Crushing Strength)

The sintered body formed was placed between compressing tools of a testing machine and broken by compressing from upside and downside, and the radial crushing strength was calculated from the following equation by using the load value at break.

FIG. 1 is a graph showing a relative density of the starting powder and a radial crushing strength of the sintered body formed therefrom. As can be seen from FIG. 1, accompanying with increase in the relative density of the starting powder, the radial crushing strength increases. For an air electrode support of a solid electrolyte type fuel cell, it is required to have the radial crushing strength of 15 MPa or more, so that the relative density of the starting powder is preferably 97% or more. Also, for an air electrode support of a solid electrolyte type fuel cell, it is preferred to have the radial crushing strength of 20 MPa or more, so that the relative density of the starting powder is preferably 98% or more.
(Measurement of Gas Permeability)

To the formed sintered body was applied 0.1 kgf/cm$^2$ of pressure difference by $N_2$ gas, and a gas flow amount permeating the sample was measured to calculate the gas permeation coeffiicient. The gas permeation coefficients of the sintered bodies formed from the powders (a), (b) and (c) were 9.62, 8.98 and 7.87 m$^2$·hr$^{-1}$·atm$^{-1}$, respectively. For an air electrode support of a solid electrolyte type fuel cell, it is preferred to have the gas permeation coefficient of 3.5 m$^2$·hr$^{-1}$·atm$^{-1}$ or more and either of them satisfied the requirement.

EXAMPLE 4
(Formation Method of Test Cell and Test Method)

$(La_{0.75}Sr_{0.25})_{0.99}MnO_3$ powder was synthesized and a sintered body was formed by using the powder as a starting material, and measurement of the radial crushing strength was carried out. Also, the formed sintered body was used as an air electrode support to form a solid electrolyte type fuel battery cell, and evaluations of power generating performance were carried out.

Synthetic method of the lanthanum manganite powder and formation method of the sintered body is as shown below. As starting materials, lanthanum nitrate, strontium nitrate and manganese nitrate were weighed and mixed, then, subjected to thermal decomposition, and subjected to a heat treatment at 1400° C. This powder is used as a starting material for Sample d.

The powder subjected to heat treatment at 1400° C. was ground, pressurized and subjected to heat treatment again at 1400° C. For grinding, impact type grinding machine was used and a grinding blade and a grinding room were made of a material comprising stainless as a base and subjected to tungsten carbide coating on the surface thereof to make an abrasion resistant one. This powder is used as a starting material for Sample e.

The starting powder for Sample e was further subjected to grind, pressurization and heat treatment at 1400° C., and the prepared powder is used for Sample f.

To the starting powder for Sample f was added 0.1 wt % of Fe powder and mixed to prepare a starting material for Sample g.

To the starting powder for Sample f was added 0.2 wt % of Fe powder and mixed to prepare a starting material for Sample h.

To the starting powder for Sample f was added 1.0 wt % of Fe powder and mixed to prepare a starting material for Sample i.

To 100 parts of the respective powders were added 10 parts of an organic binder, 3 parts of glycerin and 10 parts of water, and the mixture was mixed in a mixer and kneaded by using a kneader. This kneaded material was subjected to extrusion forming by using an extrusion forming machine, and then, subjected to drying and degreasing. Subsequently, sintering was carried out in a gas furnace at 1400 to 1500° C. to form an air electrode support. A shape of the sample for evaluating radial crushing strength and conductivity was an outer diameter of 22 mm, a thickness of 2.0 mm and a length of 50 mm. A shape of the air electrode for power generating test was an outer diameter of 22 mm, a thickness of 2.0 mm and a length of 200 mm.

In this experiment, in order to control migration of an Fe component into powder of the starting material, a coating of tungsten carbide was carried out to the grinding machine, but the method is not specifically limited to the above. It may be a material subjected to hardening treatment by melt spraying or hardening of ceramics.

With regard to the formed samples, quantitative analysis of an Fe amount was carried out by the ICP emission spectroscopic method. As a result, Fe amounts in Sample d, Sample e, Sample f, Sample g, Sample h and Sample i were 0.007 wt %, 0.20 wt %, 0.36 wt %, 0.45 wt %, 0.55 wt % and 1.33 wt %, respectively.

With regard to the prepared air electrode supports, measurement of a radial crushing strength was carried out.

By using the air electrode support for the power generating experiments to be formed, a cell was formed in the same manner as in Example 1.

The formed cells were subjected to power generating test. By using air as an oxidizing agent, $H_2+11\%$ $H_2O$ as a fuel, evaluation was carried out at an operation temperature of 1000° C. and a fuel utilizing ratio of 80%.
(Relationship Between Fe Content and Power Generating Performance)

In Table 6, an Fe content, cell output density and air electrode support radial crushing strength of the formed samples are shown.

TABLE 6

Fe content, cell output density and air electrode support radial crushing strength

| Sample name | Fe content/ wt % | Air support radial crushing strength/MPa | Cell output density/ W/cm$^2$ |
| --- | --- | --- | --- |
| d | 0.007 | 2.4 | — |
| e | 0.20 | 15.6 | 0.322 |
| f | 0.36 | 16.6 | 0.364 |
| g | 0.45 | 17.3 | 0.289 |
| h | 0.55 | 18.2 | 0.139 |
| i | 1.33 | 18.9 | Formation of cell impossible |

It was found that when the Fe content is increased, the cell output density is lowered. As the output density of SOFC, 0.2 W/cm$^2$ or more is preferred. When the Fe content exceeds 0.5 wt %, it is impossible to obtain an output density of 0.2 W/cm$^2$ or more. With regard to Sample i wherein the Fe content is 1.33 wt %, cracks occur during the formation of a cell so that it was impossible to obtain a cell to carry out the power generating evaluation. Also, it can be found that if the Fe content is 0.4 wt % or less, a high output density of 0.3 W/cm² or more can be obtained.

(Relationship Between Fe Content and Air Electrode Support Radial Crushing Strength)

It was found that when the Fe content is increased, the radial crushing strength of the air electrode support is increased. As the radial crushing,strength of the air electrode support for SOFC, it is preferable to be 15 MPa or more. With regard to Sampled wherein the Fe content is 0.007 wt %, the radial crushing strength is 2.4 MPa so that it is not preferred as an air electrode support for SOFC. From the above results, the Fe content in lanthanum manganite is preferably 0.01 wt % or more.

With regard to the prepared sintered samples, SEM/EDX analyses were carried out but an Fe enriched portion cannot be observed in the particles of the sintered body comprising lanthanum manganite. Since Fe becomes a solid solution in an Mn cite of lanthanum manganite, the Fe content in lanthanum manganite of the present invention is considered to be a sum of Fe which is present in the Mn cite as a solid solution in $(Ln_{1-x}M_x)_{1-a}MnO_3$ and a minute amount of Fe remained in the particles of lanthanum manganite.

From (Relationship between Fe content and power generating characteristics) and (Relationship between Fe content and air electrode support radial crushing strength), it can be found that the Fe content is required to be 0.01 wt % or more and 0.5 wt % or less. It is preferably 0.01 wt % or more and 0.4 wt % or less, more preferably 0.2 wt % or more and 0.4 wt % or less.

EXAMPLE 5

To 100 parts of $(La_{0.75}Sr_{0.25})_{0.99}MnO_3$ powder (average grain size of 30 μm: 90%, 0.5 μm: 10%) prepared by the thermal decomposition method were added 10 parts of an organic binder, 3 parts of glycerin and 10parts of water and the mixture was kneaded. This material was subjected to extrusion forming with a pressure of 30 kgf/cm² and at 5° C. to obtain a pipe shaped formed material having an outer diameter of 26 mm, a thickness of 2.2 mm and a length of 1200 mm. This was dried at 40° C., and then, the binder was removed at 175° C.

As a setter, a material comprising high purity alumina (alumina content: 99.5%, density: 85%) in which half-round sectional slate grooves with a radius of 11 mm had been drilled was prepared. The surface of the grooves were subjected to coating with the same powder to be used for preparation of the above-mentioned formed material by the slurry coating method with a thickness of 0.5 mm.

The above-mentioned formed material was placed on the above-mentioned setter, and the material was subjected to lateral sintering at the respective temperatures of 1300 to 1500° C. shown in Table 7 for 10 hours.

TABLE 7

Relationship between lateral sintering temperature, hanging sintering and bend of sintered body

| Lateral sintering temperature | Hanging sintering temperature (° C.) | | | | |
|---|---|---|---|---|---|
| (° C.) | 1360 | 1410 | 1440 | 1460 | 1510 |
| 1300 | Dropped | Dropped | Dropped | Dropped | Dropped |
| 1350 | Dropped | Dropped | Dropped | Dropped | Dropped |
| 1400 | 0.6 mm | 0.3 mm | 0.2 mm | 0.1 mm | Dropped |
| 1430 | 0.8 mm | 0.5 mm | 0.4 mm | 0.2 mm | Dropped |
| 1450 | 1.4 mm | 0.8 mm | 0.5 mm | 0.4 mm | 0.3 mm |
| 1500 | 1.8 mm | 1.5 mm | 0.7 mm | 0.5 mm | 0.4 mm |

Next, hanging sintering was carried out at the respective temperatures of 1360 to 1510° C. shown in said Table 7. The dimension of the sintered body after sintering was substantially an outer diameter of 22 mm, a thickness of 2.0 mm and a length of 1100 mm. Their porosities were 28 to 39%. With regard to the formed sintered bodies, their bend and roundness were measured. Bend was measured by placing the sintered body on a platen and the maximum gap between the sintered body and the platen was measured by using a thickness gauge. Roundness was calculated from the minimum diameter the maximum diameter×100 by measuring the maximum diameter÷and the minimum diameter of an outer diameter. The results of sintering are shown in Tables 7 and 8. Dropping means that the sintered body has toned and dropped during hanging.

TABLE 8

Relationship between lateral sintering temperature, hanging sintering temperature and roundness of sintered body

| Lateral sintering temperature | Hanging sintering temperature (° C.) | | | | |
|---|---|---|---|---|---|
| (° C.) | 1360 | 1410 | 1440 | 1460 | 1510 |
| 1300 | Dropped | Dropped | Dropped | Dropped | Dropped |
| 1350 | Dropped | Dropped | Dropped | Dropped | Dropped |
| 1400 | 98% | 99% | 99% | 99% | Dropped |
| 1430 | 96% | 96% | 98% | 98% | Dropped |
| 1450 | 96% | 96% | 96% | 97% | 97% |
| 1500 | 95% | 95% | 95% | 96% | 97% |

In Tables 7 and 8, at the lateral sintering temperatures of 1300 and 1350° C., the sintered bodies are each dropped during hanging sintering. When the lateral sintering temperature is 1400° C. or more, by making the hanging sintering temperature not less than the lateral sintering temperature, bend is 0.4 mm or less and roundness is 97% or more so that it is possible to satisfy the characteristics. From this experimental results, as sintering conditions of an air electrode supporting tube of a solid electrolyte type fuel cell, it is preferable to make the lateral sintering temperature 1400° C. or higher and the hanging sintering temperature not less than the lateral sintering temperature.

Next, examples of the solid electrolyte film of the present invention is explained by $Y_2O_3$ doped $ZrO_2$ (YSZ) solid electrolyte.

EXAMPLE 6

(Preparation of YSZ Powder)

By using an aqueous zirconium nitrate solution as a $ZrO_2$ starting material and an aqueous yttrium nitrate solution as a $Y_2O_3$, starting material, they were mixed so that $ZrO_2$:$Y_2O_3$=90:10 mol % (10YSZ) and were sufficiently stirred.
(Preparation of Coprecipitation Solution)

In the present example, sodium hydroxide was used as a coprecipitation solution for synthesizing YSZ powder. In a vessel was charged pure water, and solid sodium hydroxide was gradually added to pure water while stirring to dissolve the solid. With regard to the amount of an aqueous sodium hydroxide solution, it is preferred to use sodium hydroxide with a slightly excessive amount than the stoichiometric ratio so that zirconium ion and yttrium ions are completely precipitated in the coprecipitation step. An excessive amount at this time was about 5 mol %.
(Coprecipitation Reaction)

The YSZ starting material solution was gradually added to the aqueous sodium hydroxide solution while thoroughly stirring, whereby formation of precipitation was carried out by the coprecipitation method due to neutralization reaction.
(Washing)

To remove the sodium ion in the precipitated product, after a supernatant was removed by ultracentrifugator, the precipitated product was washed by using a sufficient amount of pure water. In the present example, washing was repeated until the sodium concentration becomes 50 ppm or less.
(Drying)

The sample after washing was dried at 120° C. to remove residual water.
(Rough Grinding)

The sample powdered by drying was roughly ground by a rough grinding machine or mortar, etc. In the present example, by a mortar made of zirconia, the secondary grain size was 100 μm or less.
(Heat Treatment)

The obtained powder was subjected to heat treatment at 500° C. to 700° C. crystallize and control sihtering property of the power.
(Gain Size Adjustment)

The power subjected to heat treatment was ground by a mortar made of zirconia to have a secondary grain size of 100 μor less to adjust the grain size for enabling a slurry preparation.
(Measurement of Specific Surface Area)

Figure 2:
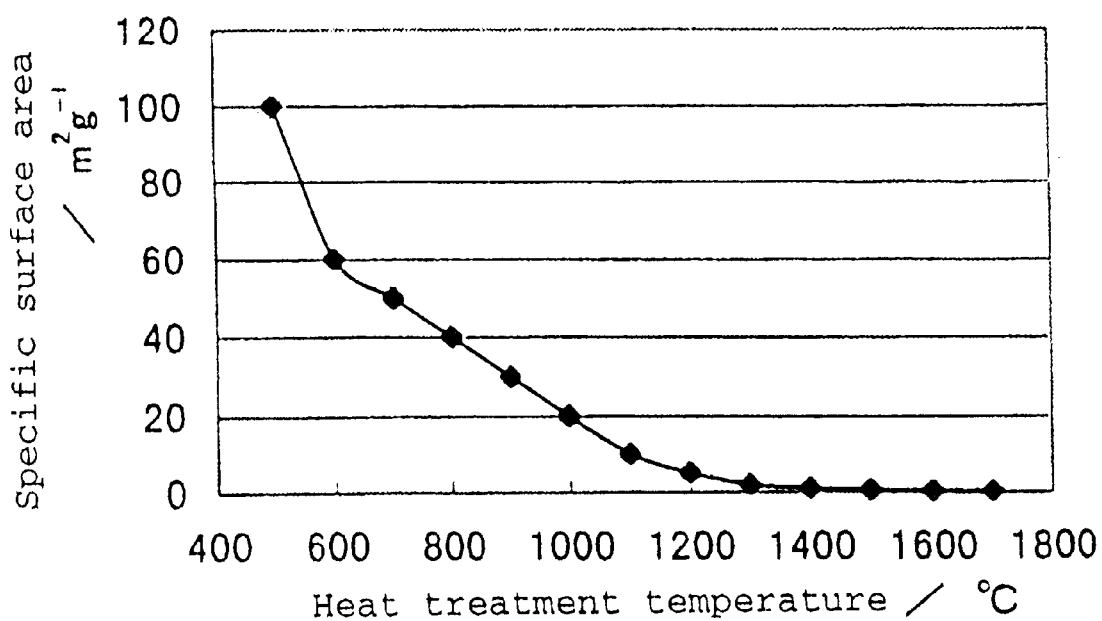
FIG. 2 is a graph showing a relationship between the heat treatment temperature and the specific surface area of 10YSZ powder according to the embodiment of the present invention.

With regard to powders subjected to heat treatment at the respective temperatures and grinding to 100 μm or less, measurement of BET type specific surface area which is obtained form an amount of a gas phsically adsorbed to the solid surface was carried out. In FIG. 2 and Table 9, the relationship between the heat treatment temperature and the specific surface area is shown.

TABLE 9

Relationship between heat treatment temperature and specific surface area

| Heat treatment temperature (° C.) | Specific surface area ($m^2$/g) |
| --- | --- |
| 1700 | 0.1 |
| 1600 | 0.2 |
| 1500 | 0.5 |
| 1400 | 1 |
| 1300 | 2 |
| 1200 | 5 |
| 1100 | 10 |
| 1000 | 20 |
| 900 | 30 |
| 800 | 40 |

TABLE 9-continued

Relationship between heat treatment temperature and specific surface area

| Heat treatment temperature (° C.) | Specific surface area ($m^2$/g) |
| --- | --- |
| 700 | 50 |
| 600 | 60 |
| 500 | 100 |

From FIG. 2 and Table 9, it is found that by making the heat treatment temperature higher, the specific surface area becomes small.

To make the specific surface area 0.2 $m^2$/g to 50 $m^2$/g, it may be set the heat treatment temperature to 700° C. to 1600° C.

To make the specific surface area more preferred value of 2 $m^2$/g to 40 $m^2$/g, it may be set the heat treatment temperature to 800° C. to 1300° C.
(Preparation of Slurry Solution)

Absolution for slurry, asolvent, abinder, adispersant and an antifoaming agent are contained. As a solvent, 60 wt % of ethyl alcohol was mixed with 40 wt % of a terpineol. As a binder, ethyl cellulose was used, as a dispersant, polyoxyethylene alkylphosphate was used and as an antifoaming agent, sorbitane sesquioleate was used. A mixing ratio in the solution was made solvent:binder:dispersant:antifoaming agent=93:6.8:0.1:0.1. The mixture was stirred by a stirrer for 24 hours.
(Preparation of Slurry)

By using the powders after adjusting grain size, preparation of a slurry was carried out by mixing 30 parts of the powder and 70 parts of the above-mentioned solution by using a ball mill for 24 hours.
(Film Formation)

By using the above-mentioned slurry, on an air electrode substrate having a total length of 1100 mm, an outer diameter of 22 mm and an average pore size of 11 μm was formed a tight interconnector and sintered, and then, film formation of a YSZ film was carried out by the dipping method on the substrate on which the air electrode material and a YSZ complex powder are formed. As the dipping method, the substrate was inserted into an apparatus in which the slurry was filled at a speed of 50 mm/sec, and taken out at a drawing speed of 10 mm/sec to 10000 mm/sec. After dipping, the substrate was dried at 100° C., and then, dipping and drying were repeated so that an average film thickness of the YSZ film became about 50 μm.

Also, a cell in which neither an air electrode material nor a YSZ composite powder was formed before forming the YSZ film was prepared for comparing an output.
(Sintering)

Film-formed sample was sintered at 1500° C. for 5 hours.
(Evaluation of Film Thickness)

Figure 3:
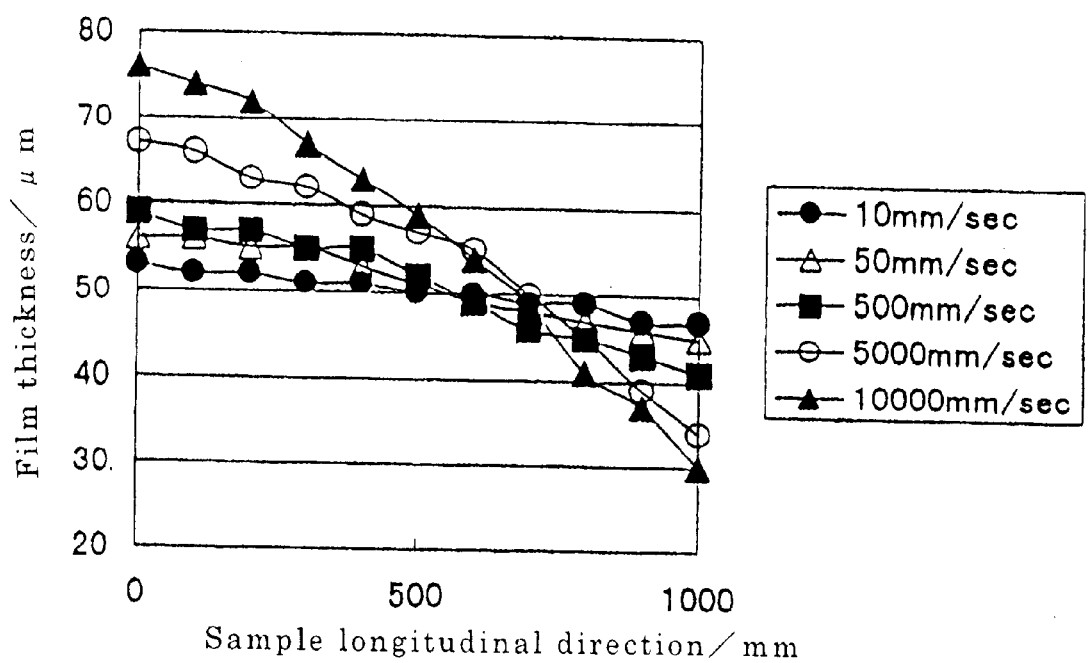
FIG. 3 is a graph showing a film thickness of the YSZ section to the longitudinal direction of a sample with the respective drawing speed when a substrate with a total length of 1100 mm according to the embodiment of the present invention is used.

With regard to the samples after sintering, film thickness was measured with a distance of 100 mm intervals to the longitudinal direction of the samples. As the measurement method, the section of the sample was actually measured by using an electron microscope. In FIG. 3, film thickness of the YSZ section to the longitudinal direction of the samples at the respective drawing speeds are shown. Incidentally, in FIG. 3, the position of 0 mm of the cell to the longitudinal direction is a bottom side of the sample, and the position at 1000 mm is the upper side of the sample.

From the results of this Example, it is found that as the sample is slowly drawing from the slurry, thickness difference to the upper and lower direction can be decreased.

In drawing of the samples at 10 mm/sec carried out in this Example, the thickness difference of the upper and lower portions with a length of an upper and lower direction of 1000 mm can be controlled to 1.1-fold or so.

In the above-mentioned samples, the reason why the thickness difference of the upper and lower direction can be decreased by drawing the sample slowly from the slurry is that flowing of the slurry adhered to the substrate from the upper portion to the bottom portion can be restrained.

(Evaluation of Tightness)

Figure 4:
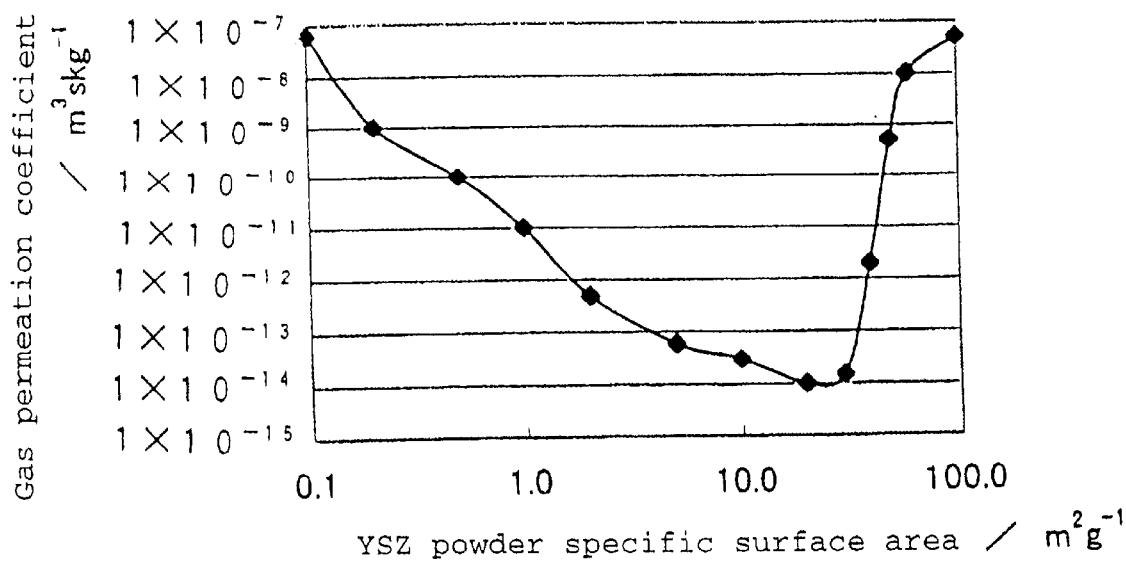
FIG. 4 is a graph showing a relationship between the specific surface area of 10YSZ powder and a gas permeation coefficient of the YSZ film using the slurry of the powder according to the embodiment of the present invention.

With regard to the samples after sintering, a gas permeation amount was measured under the pressure difference of 1 kgf/cm$^2$ with a nitrogen gas. In FIG. 4 and Table 10, a relationship between the specific surface area of the powder used for the YSZ slurry and the gas permeation coefficient is shown.

TABLE 10

Relationship between specific surface area of the powder used for YSZ slurry and gas permeation coefficient

| specific surface area (m$^2$/g) | gas permeation coefficient (m$^3$ skg$^{-1}$) |
| --- | --- |
| 0.1 | $6 \times 10^{-8}$ |
| 0.2 | $1 \times 10^{-9}$ |
| 0.5 | $1 \times 10^{-10}$ |
| 1 | $1 \times 10^{-11}$ |
| 2 | $5 \times 10^{-13}$ |
| 5 | $6 \times 10^{-14}$ |
| 10 | $3 \times 10^{-14}$ |
| 20 | $1 \times 10^{-14}$ |
| 30 | $1.5 \times 10^{-14}$ |
| 40 | $2 \times 10^{-12}$ |
| 50 | $5 \times 10^{-10}$ |
| 60 | $1 \times 10^{-8}$ |
| 100 | $5 \times 10^{-8}$ |

When the powder having the specific surface area of 0.2 to 50 m$^2$/g was used, the gas permeation coefficient became $1 \times 10^{-9}$ m$^3$·s·k$^{-1}$ or less. When the powder having the specific surface area of 0.1 m$^2$/g or less was used, it became $6 \times 10^{-8}$ m$^3$·s·kg$^{-1}$ which was substantially the same as the gas permeation coefficient of the substrate. Also, when the powder having the specific surface area of 50 m$^2$/g or more was used, cracks occurred in the YSZ film and the gas permeation coefficient was abruptly increased.

(Formation of Cell for Power Generation Test)

On the substrate in which film formation until the above-mentioned YSZ film had been carried out was formed a NiO/YSZ base fuel electrode film and sintered.

(Evaluation of Power Generation Characteristics)

Figure 5:
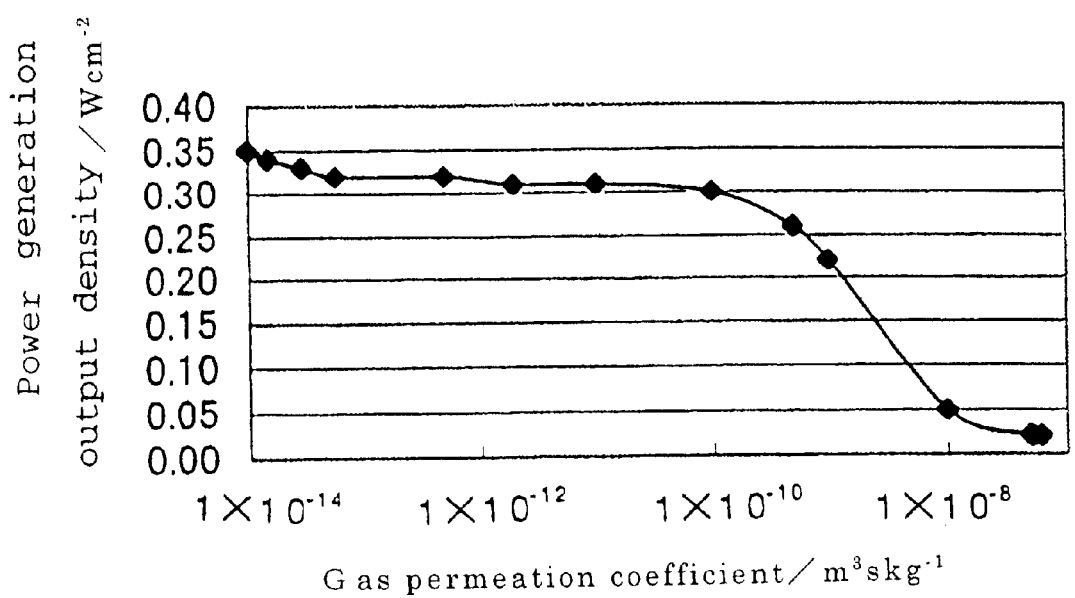
FIG. 5 is a graph showing a relationship between a gas permeation coefficient and an power generating output density by the slurry using 10YSZ powder according to the embodiment of the present invention.

The above-mentioned respective cells for power generation test were subjected to reduction treatment under a 5% hydrogen atmosphere at 1000° C., and then, cell characteristics evaluation was carried out under the conditions at a current density of 0.3 A/cm$^2$, by using a fuel; 11% H$_2$O-89% H$_2$ with a fuel utilization ratio of 80%, an oxidizing agent; air with a air utilization ratio of 25%. In FIG. 5 and Table 11, a relationship between the gas permeation coefficient and power generation output density of the YSZ film in which the air electrode material and the YSZ complex powder had been form before the YSZ film formation is shown.

TABLE 11

Relationship between gas permeation coefficient and electricity generation output density of YSZ film

| Gas permeation coefficient (m$^3$ skg$^{-1}$) | Electricity generation output density (Wcm$^{-2}$) |
| --- | --- |
| $6 \times 10^{-8}$ | 0.02 |
| $5 \times 10^{-8}$ | 0.02 |
| $1 \times 10^{-8}$ | 0.05 |
| $1 \times 10^{-9}$ | 0.22 |
| $5 \times 10^{-10}$ | 0.26 |
| $1 \times 10^{-10}$ | 0.30 |
| $1 \times 10^{-11}$ | 0.31 |
| $2 \times 10^{-12}$ | 0.31 |
| $5 \times 10^{-13}$ | 0.32 |
| $6 \times 10^{-14}$ | 0.32 |
| $3 \times 10^{-14}$ | 0.33 |
| $1.5 \times 10^{-14}$ | 0.34 |
| $1 \times 10^{-14}$ | 0.35 |

When the gas permeation coefficient of the YSZ film is $1 \times 10^{-9}$ m$^3$·s·kg$^{-1}$ or less, it showed a high output density of 0.2 W/cm$^2$ or more. Also, when the gas permeation coefficient is $1 \times 10^{-1}$ m$^3$·s·kg$^{-1}$ or less, it showed an extremely high output density of 0.3 W/cm$^2$ or more.

On the other hand, when the air electrode material and the YSZ composite powder were not formed as a film before the formation of the YSZ film, the cell output is lowered 5% to 15% or so as compared to the case where the film is formed.

Next, Examples of the present invention directed to a fuel electrode will be explained.

EXAMPLE 7

Film-formed Material Using Green Compact Without Effecting Calcination (Preparation of Composite Powder)

By using an aqueous yttrium zirconium nitrate solution (containing 8 mol % of Y$_2$O$_3$) as a YSZ starting material and an aqueous nickel nitrate solution as a NiO starting material, they were mixed so that YSZ and NiO were 2:8 in a molar ratio and were sufficiently stirred.

(Preparation of Coprecipitation Solution)

In the present example, an aqueous oxalic acid solution was used as a coprecipitation solution. In a vessel was charged pure water, and pure water was heated to about 80° C. While stirring this hot water, crystal of oxalic acid dihydrate was gradually added to the hot water to dissolve the crystal and the solution was maintained at 70° C. to 90° C. With regard to the amount of an aqueous oxalic acid solution, it is preferred to use oxalic acid with a slightly excessive amount than the stoichiometric ratio so that metal ions are completely precipitated in the coprecipitation step. An excessive amount at this time was made about 5 mol %.

(Coprecipitation Reaction)

The starting material solution (NiO/YSZ composite solution) heated to 70° C. to 90° C. was gradually added to the aqueous oxalic acid solution while thoroughly stirring, whereby formation of precipitation was carried out by the oxalic acid coprecipitation method.

(Drying)

A vessel made of Teflon was left at rest in a drying machine, and water content and nitric acid in the coprecipitate were evaporated by feeding hot air of 120° C.

(Thermal Decomposition)

The sample after drying was subjected to heat treatment at 500° C. for 5 hours to remove the remaining nitric acid component and oxalic acid.

(Grinding)

The sample powdered by thermal decomposition was subjected to grain size adjustment by a rough grinding machine or mortar, etc. In this experiment, secondary grain size was 180 μm or less by a mortar made of alumina.

(Calcination)

To crystallize the resulting powder, a heat treatment at 700° C. for 10 hours was carried out.

(Compression of Powder)

To make the powder carried out calcination treatment green compact, a load was applied by a monoaxial pressing machine or hydrostatic pressure forming machine. In this experiment, a load of 3 kgf/mm$^2$ was applied by a monoaxial pressing machine to obtain a green compact.

(Heat Treatment)

The green compact was subjected to heat treatment at 1500° C. for 5 hours to obtain a sintered body.

(Classification)

The sintered body was subjected to grinding by using a finely grinding machine, and then, three kinds of powders each having grain size distributions of 0.5 to 5 μm, 1 to 20 μm and 5 to 50 μm were prepared by a classifying machine.

(Preparation of Slurry)

To enhance adhesiveness at the interface between the solid electrolyte (YSZ) film and the fuel electrode, in the compositions having NiO content of 30 mol % and 50 mol %, by using powders to which only calcination treatment at 800° C. and 1100° C. had been applied or the above-mentioned three kinds of classified powders, 20 parts of a solvent, 5 parts of a dispersant, 0.5 part of a surfactant, 0.5 part of an antifoaming agent and 1 part of a binder were mixed with 10 parts of the powder, slurries for coating were obtained.

(Film Formation)

By using the above-mentioned slurry of NiO/YSZ composite. powder, on a substrate in which an interconnector and an electrolyte film had been formed on a $La_{0.75}Sr_{0.25}MnO_3$ air electrode support, a film formation was carried out by the dipping method so that the calcination treatment powder at 800° C. and 1100° C. were each coated to have a thickness of about 10 μm and three kinds of powders to have a thickness of 0.5 to 5 μm, 1 to 20 μm and 5 to 50 μm and subjected to powder compression treatment became thickness of about 30 μm, 40 μm and 50 μm, respectively.

(Sintering)

Film-formed samples were sintered at 1500° C. for 5 hours. Incidentally, the samples may be sintered under a reductive atmosphere.

(Evaluation of Power Generation Characteristics)

By using the above-mentioned cells, they were firstly, reduced under 3% $H_2$—$N_2$ atmosphere at 1000° C.×10 hours. As a result of evaluating power generation under the operation conditions of a fuel; 11% $H_2O$-789% $H_2$, an oxidizing agent; 4-fold equivalent of air, a fuel utilization ratio; 40% and a temperature of 1000° C., it showed a high output of the maximum output, 0.51 W/cm$^2$. Thus, it can be confirmed that it is higher than the maximum output (about 0.42 W/cm$^2$) of the cell prepared by using powder subjecting to no powder compression treatment of the conventional powder mixture.

(Durability Test)

Under the above-mentioned conditions, operation was carried out continuously for 1000 hours, and change in the cell output after 1000 hours was examined. Three kinds of powders having different grain size distribution were prepared from the starting material subjected to powder compression treatment. Change in cell potential per 1000 hours of the cells formed by using these powders showed that was 0.2%-decrease. On the other hand, change in cell potential per 1000 hours of the cell formed by using powder subjecting to no powder compression treatment of the conventional powder mixture was 1.4%-decrease. Thus, it can be confirmed that it is possible to form a cell excellent in durability by using a fuel electrode powder subjected to powder compression treatment.

EXAMPLE 8

Film-formed Material Using Green Compact Subjected to Calcination

EXAMPLE 8-1

The Case in which Calcination is Carried Out Under Air Atmosphere (Preparation of Composite Powder)

By using an aqueous yttrium-zirconium nitrate solution (containing 8 mol % of $Y_2O_3$) as a YSZ starting material and an aqueous nickel nitrate solution as a NiO starting material, they were mixed so that YSZ and NiO were 2:8 in a molar ratio and were sufficiently stirred.

(Preparation of Coprecipitation Solution)

In the present example, an aqueous oxalic acid solution was used as a coprecipitation solution. In a vessel was charged pure water, and pure water was heated to about 80° C. While stirring this hot water, crystal of oxalic acid dihydrate was gradually added to the hot water to dissolve the crystal and the solution was maintained at 70° C. to 90° C. With regard to the amount of an aqueous oxalic acid solution, it is preferred to use oxalic acid with a slightly excessive amount than the stoichiometric ratio so that metal ions are completely precipitated in the coprecipitation step. An excessive amount at this time was made about 5 mol %.

(Coprecipitation Reaction)

The starting material solution (NiO/YSZ composite solution) heated to 70° C. to 90° C. was gradually added to the aqueous oxalic acid solution while thoroughly stirring, whereby formation of precipitation was carried out by the oxalic acid coprecipitation method.

(Drying)

A vessel made of Teflon was left at rest in a drying machine, and water content and nitric acid in the coprecipitate were evaporated by feeding hot air of 120° C.

(Thermal Decomposition)

The sample after drying was subjected to heat treatment at 500° C. for 5 hours to remove the remaining nitric acid component and oxalic acid.

(Grinding)

The sample powdered by thermal decomposition was subjected to grain size adjustment by a rough grinding machine or mortar, etc. In this experiment, secondary grain size was made 180 μm or less by a mortar made of alumina.

(Calcination)

The resulting powders were each carried out heat treatment under air atmosphere at a temperature of 500° C. to 1400° C. for 10 hours.

(Compression of Powder)

To make the powder carried out calcination treatment green compact, a load was applied by a monoaxial pressing machine or hydrostatic pressure forming machine. In this experiment, a load of 1000 kgf/mm$^2$ was applied by a hydrostatic pressure forming machine to obtain a green compact.

EXAMPLE 8-2

The Case in Which Calcination is Carried Out Under Reductive Atmosphere (Preparation of Composite Powder)

By using an aqueous yttrium-zirconium nitrate solution (containing 8 mol % of $Y_2O_3$) as a YSZ starting material and an aqueous nickel nitrate solution as a NiO starting material, they were mixed so that YSZ and NiO were 2:8 in a molar ratio and were sufficiently stirred.

(Preparation of Coprecipitation Solution)

In the present example, an aqueous oxalicacid solution was used as a coprecipitation solution. In a vessel was charged pure water, and pure water was heated to about 80° C. While stirring this hot water, crystal of oxalic acid dihydrate was gradually added to the hot water to dissolve the crystal and the solution was maintained at 70° C. to 90° C. With regard to the amount of an aqueous oxalic acid solution, it is preferred to use oxalic acid with a slightly excessive amount than the stoichiometric ratio so that metal ions are completely precipitated in the coprecipitation step. An excessive amount at this time was made about 5 mol %.

(Coprecipitation Reaction)

The starting material solution (NiO/YSZ composite solution) heated to 70° C. to 90° C. was gradually added to the aqueous oxalic acid solution while thoroughly stirring, whereby formation of precipitation was carried out by the oxalic acid coprecipitation method.

(Drying)

A vessel made of Teflon was left at rest in a drying machine, and water content and nitric acid in the coprecipitate were evaporated by feeding hot air of 120° C.

(Thermal Decomposition)

The sample after drying was subjected to heat treatment at 500° C. for 5 hours to remove the remaining nitric acid component and oxalic acid.

(Grinding)

The sample powdered by thermal decomposition was subjected to graininess adjustment by a rough grinding machine or mortar, etc. In this experiment, secondary grain size was made 180 μm or less by a mortar made of alumina.

(Calcination)

The resulting powders were each carried out heat treatment under $3\%H_2$—$N_2$ reductive atmosphere at a temperature of 500° C. to 1400° C. for 10 hours.

(Compression of Powder)

To make the powder carried out calcination treatment green compact, a load was applied by a monoaxial pressing machine or hydrostatic pressure forming machine. In this experiment, a load of 1000 kgf/mm$^2$ was applied by a hydrostatic pressure forming machine to obtain a green compact.

(Heat Treatment)

The green compacts obtained in the case of subjecting to calcination under air atmosphere and in the case of subjecting to calcination under reductive atmosphere were subjected to heat treatment at a temperature of 500° C. to 1400° C. each for 10 hours in the case of air atmosphere to prepare NiO/YSZ composite powders. Also, in the case of $3\%H_2$—$N_2$ reductive atmosphere, heat treatment was carried out at a temperature of 500° C. to 1400° C. each for 10 hours in the case of air atmosphere to prepare NiO/YSZ composite powders.

(Grinding-Classification)

The above-mentioned powders each subjected to heat treatment were subjected to grinding and classification to prepare three kinds of powders each having grain size distributions of 0.5 μm to 5 μm, 1 to 20 μm and 5 to 50 μm.

(Preparation of Slurry)

To enhance adhesiveness at the interface between the solid electrolyte (YSZ) film and the fuel electrode, in the compositions having NiO content of 30 mol % and 50 mol %, by using powders to which only calcination treatment at 800° C. and 1100° C. had been applied or the above-mentioned each three kinds of classified powders, 20 parts of a solvent, 5 parts of a dispersant, 0.5 part of surfactant, 0.5 part of an antifoaming agent and 1 part of a binder were mixed with 10 parts of the powder, slurries for coating were obtained. Viscosities of said slurries were each 110 cps, 100 cps, and 90 cps, 80 cps and 60 cps.

(Film Formation)

By using the above-mentioned slurry of NiO/YSZ composite powder or the slurry of Ni/YSZ composite powder, on a tight YSZ substrate, a film formation was carried out by the dipping method so that the calcination treatment powder at 800° C. and 1100° C. were each coated to have a thickness of about 10 μm and three kinds of slurries to have a thickness of 0.5 μm to 5 μm, 1 to 20 μm and 5 to 50 μm became thickness of about 30 μm, 40 μm and 50 μm, respectively.

(Sintering)

Film-formed materials prepared by using the above-mentioned slurry of NiO/YSZ composite powder or the slurry of Ni/YSZ composite powder were sintered at 1500° C. for 5 hours. Also, with regard to the film-formed materials prepared by using the slurry of Ni/YSZ composite powder, sintering was carried out under a reductive atmosphere at 1400° C. for 5 hours.

(Evaluation of Conductivity)

The above-mentioned NiO/YSZ film and Ni/YSZ film thus formed were reduced in 5% $H_2$-$N_2$ atmosphere at 1000° C.×5 hours, and then, conductivity thereof was measured in 11% $H_2O$-89% $H_2$ at 1000° C. by the direct current four-terminal method.

(Durability Test)

Under the above-mentioned conditions, operation was carried out continuously for 1000 hours, and change in the cell output after 1000 hours was examined.

FIG. 6, FIG. 7, FIG. 8, FIG. 9, FIG. 10 and FIG. 11 are graphs showing the relationship between the heat treatment temperature and change in conductivity after 1000 hours in the difference of the calcination temperature with regard to the samples sintered by changing the respective atmospheres of calcination, heat treatment and sintering.

Figure 6:
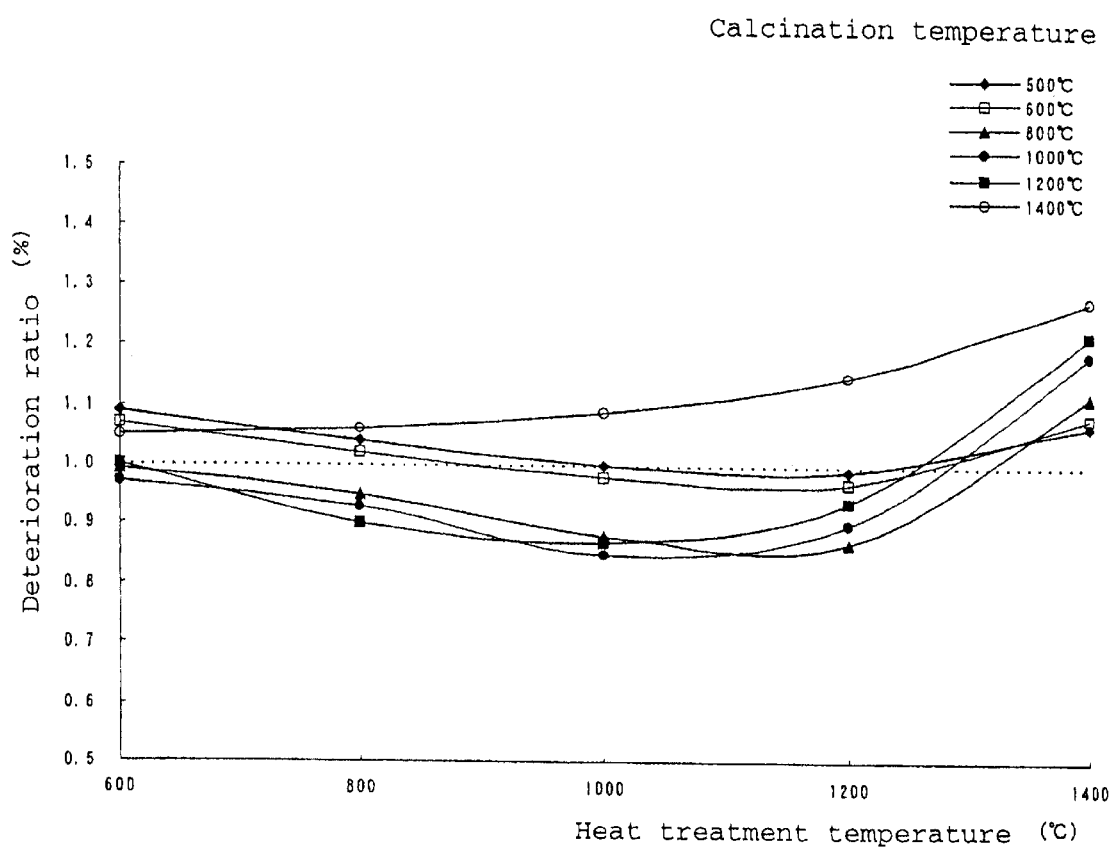
FIG. 6 is a graph showing change in conductivity of heat treated powder using powder calcinated under air atmosphere according to the embodiment of the present invention (heat treatment: air atmosphere, sintering: air atmosphere).

FIG. 6 is a graph showing change in conductivity of heat treated powder using powder calcinated under air atmosphere, and the heat treatment is carried out under air atmosphere and sintering of the film-formed material is carried out under air atmosphere.

Figure 7:
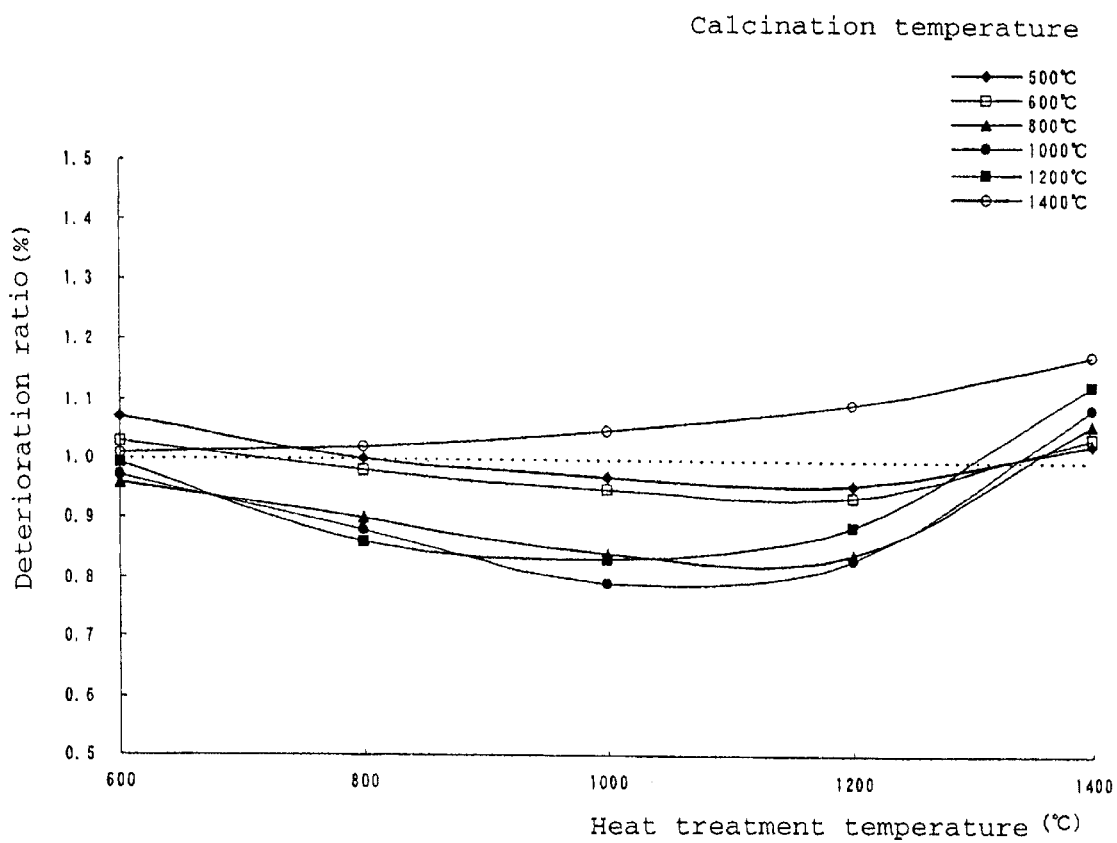
FIG. 7 is a graph showing change in conductivity of heat treated powder using powder calcinated under air atmosphere according to the embodiment of the present invention (heat treatment: reductive atmosphere, sintering: air atmosphere)

FIG. 7 is a graph showing change in conductivity of heat treated powder using powder calcinated under air atmosphere, and the heat treatment is reductive atmosphere and sintering of the film-formed material is carried out under air atmosphere.

Figure 8:
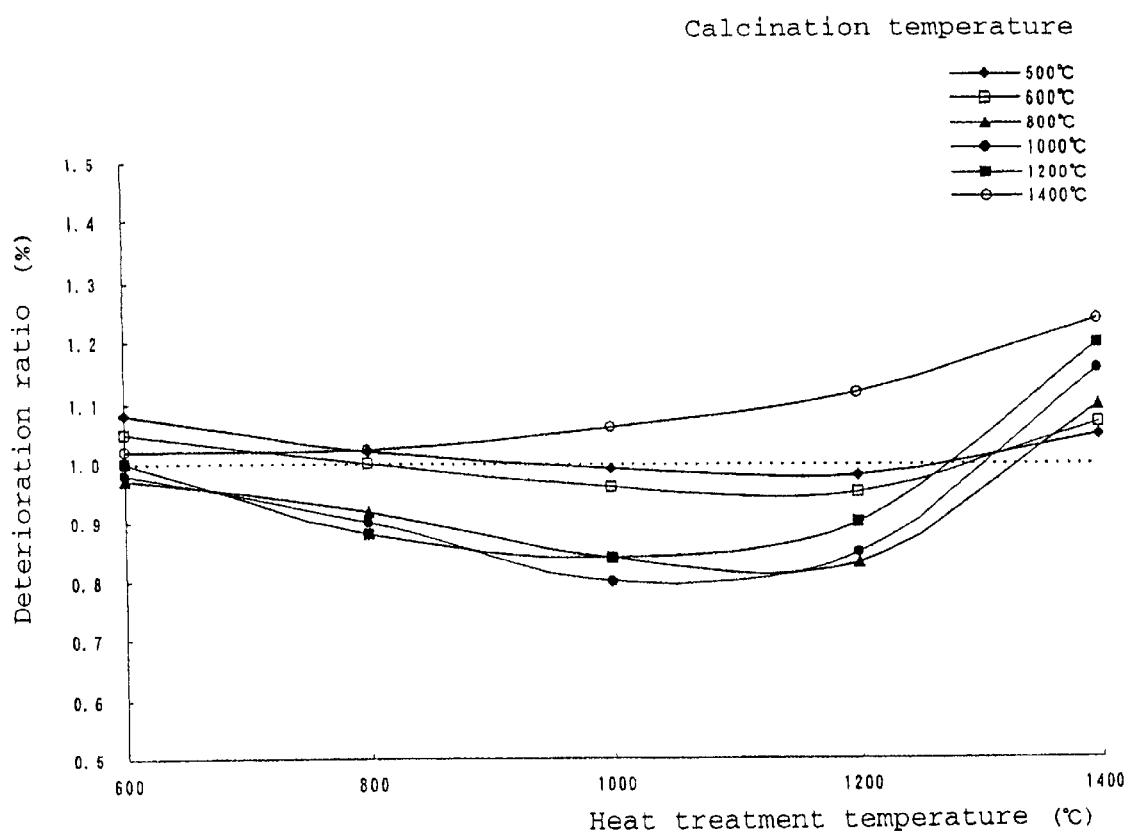
FIG. 8 is a graph showing change in conductivity of heat treated powder using powder calcinated under reductive atmosphere according to the embodiment of the present invention (heat treatment: air atmosphere, sintering: air atmosphere)

FIG. 8 is a graph showing change in conductivity of heat treated powder using powder calcinated under reductive atmosphere, and the heat treatment is carried out under air atmosphere and sintering of the film-formed material is carried out under air atmosphere.

Figure 9:
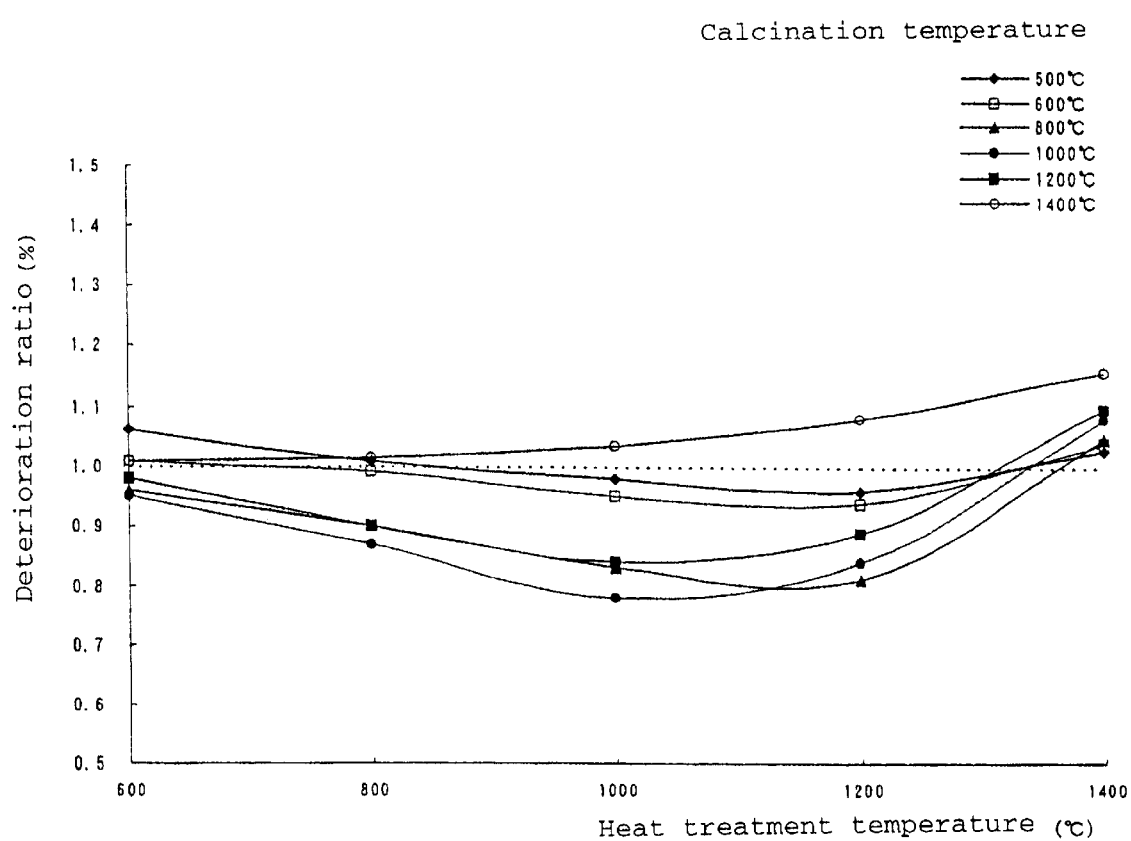
FIG. 9 is a graph showing change in conductivity of heat treated powder using powder calcinated under reductive atmosphere according to the embodiment of the present invention (heat treatment: reductive atmosphere, sintering: air atmosphere).

FIG. 9 is a graph showing change in conductivity of heat treated powder using powder calcinated under reductive atmosphere, and the heat treatment is carried out under reductive atmosphere and sintering of the film-formed material is carried out under air atmosphere.

Figure 10:
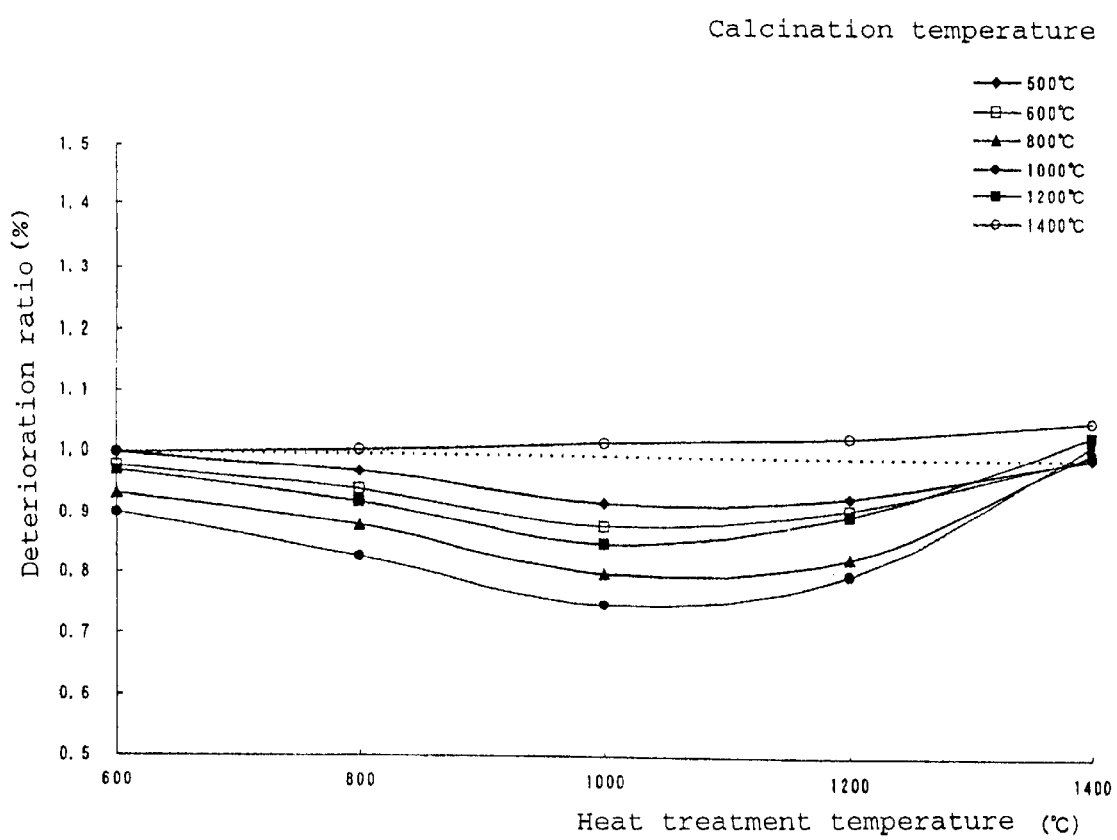
FIG. 10 is a graph showing change in conductivity of heat treated powder using powder calcinated under air atmosphere, according to the embodiment of the present invention (heat treatment: reductive atmosphere, sintering: reductive atmosphere).

FIG. 10 is a graph showing change in conductivity of heat treated powder using powder calcinated under air atmosphere, and the heat treatment is carried out under reductive atmosphere and sintering of the film-formed material is carried out under reductive atmosphere.

Figure 11:
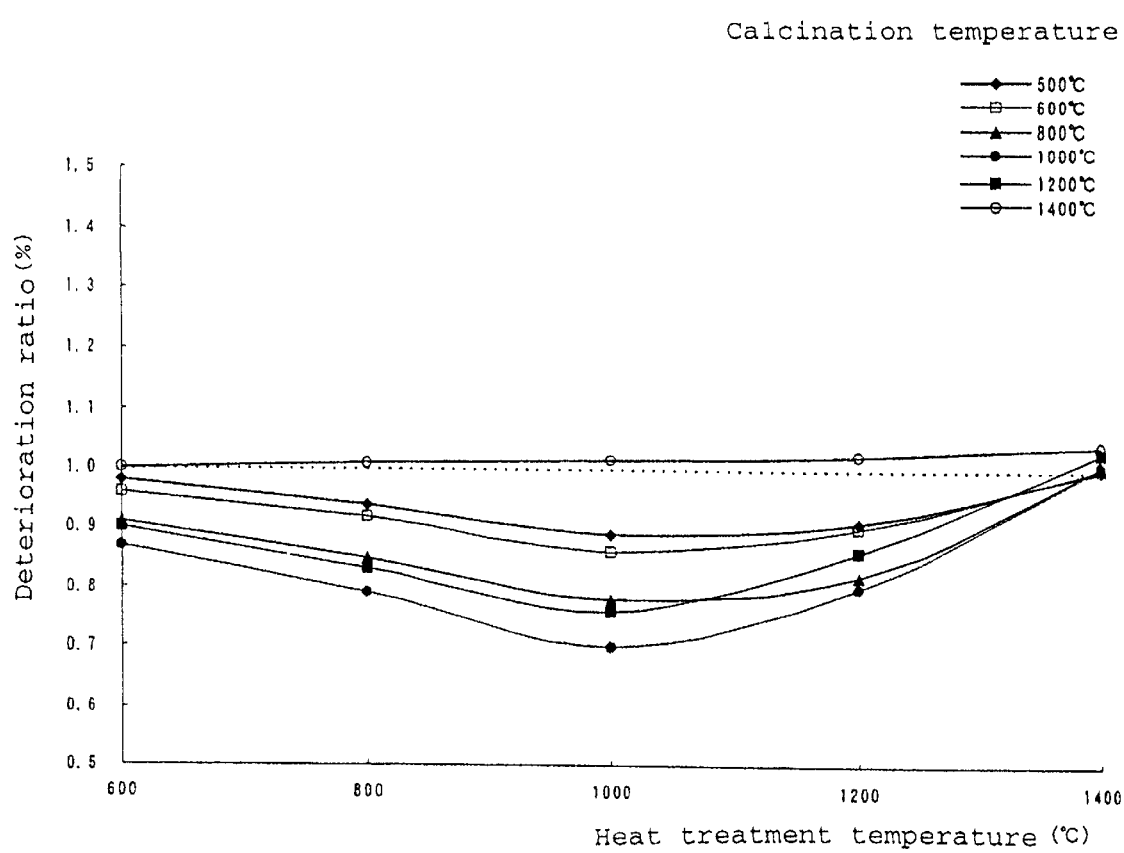
FIG. 11 is a graph showing change in conductivity of heat treated powder using powder calcinated under reductive atmosphere according to the embodiment of the present invention (heat treatment: reductive atmosphere, sintering: reductive atmosphere).

FIG. 11 is a graph showing change in conductivity of heat treated powder using powder calcinated under reductive atmosphere, and the heat treatment is carried out under reductive atmosphere and sintering of the film-formed material is carried out under reductive atmosphere.

By subjecting to compression of powder, and as a pretreatment, calcination is carried out under air atmosphere or reductive atmosphere at a temperature of 500° C. to 1200° C. and as a post-treatment, heat treatment is similarly carried out under air atmosphere or reductive atmosphere at a temperature of 600° C. to 1200° C., change in conductivity after 1000 hours can be improved as compared with the deterioration ratio of 1% of the conventional heat treatment powder subjecting no compression of powder. In particular, in the calcination temperature of 800° C. to 1200° C. and the heat treatment temperature of 800° C. to 1200° C., further improvement in deterioration ratio can be observed. Moreover, in the case of the calcination temperature of 1000° C. or less, the heat treatment temperature is set to 1000° C. or higher, while in the case of the calcination temperature of 1000° C. or higher, the heat treatment temperature is set to 1000° C. or less, by the combination of the heat treatment temperature and the calcinations temperature mentioned-above, improvement can be observed.

EXAMPLE 9

Doping of Calcium, Strontium and Magnesium
(Preparation of Composite Powder)

By using an aqueous yttrium-zirconium nitrate solution (containing 8 mol % of $Y_2O_3$) as a YSZ starting material and an aqueous nickel nitrate solution as a NiO starting material, they were mixed so that YSZ and NiO were 4:6 in a molar ratio. Also, by using calcium nitrate, strontium nitrate and magnesium nitrate as a calcium, strontium and magnesium source, they were doped in amounts of 1 mol % to 50 mol % to the zirconium element in the YSZ and were sufficiently stirred.
(Preparation of Coprecipitation Solution)

In the present example, an aqueous oxalic acid solution was used as a coprecipitation solution. In a vessel was charged pure water, and pure water was heated to about 80° C. While stirring this hot water, crystal of oxalic acid dihydrate was gradually added to the hot water to dissolve the crystal and the solution was maintained at 70° C. to 90° C. With regard to the amount of an aqueous oxalic acid solution, it is preferred to use oxalic acid with a slightly excessive amount than the stoichiometric ratio so that metal ions are completely precipitated in the coprecipitation step. An excessive amount at this time was made about 5 mol %.
(Coprecipitation Reaction)

The starting material solution (NiO/YSZ composite solution) heated to 70° C. to 90° C. was gradually added to the aqueous oxalic acid solution while thoroughly stirring, whereby formation of precipitation was carried out by the oxalic acid coprecipitation method.
(Drying)

A vessel made of Teflon was left at rest in a drying machine, and water content and nitric acid in the coprecipitate were evaporated by feeding hot air of 120° C.
(Thermal decomposition)

The sample after drying was subjected to heat treatment at 500° C. for 5 hours to remove the remaining nitric acid component and oxalic acid.

(Grinding)

The sample powdered by thermal decomposition was subjected to grain size adjustment by a rough grinding machine or mortar, etc. In this experiment, a secondary grain size was made 180 μm or less by a mortar made of alumina.
(Heat Treatment)

The resulting powders were subjected to heat treatment from 600° C. to 1800° C.
(Regrinding)

The powders subjected to heat treatment were again ground by a mortar made of alumina to have a secondary grain size of 180 μm or less.
(Formation of Pressed Body)

To the above-mentioned powders subjected to heat treatment and regrinding was added 1% of PVA, and pressed bodies having about 50 mm×5 mm×5 mm were formed.
(Sintering)

The pressed bodies formed as mentioned above were sintered under the conditions of 1350° C.×5 hours to obtain sintered bodies.
(Reduction Treatment)

Reduction treatment was carried out in 3% $H_2$—$N_2$ atmosphere at 1000° C.×10 hours to reduce nickel oxide to nickel.
(Measurement of Conductivity)

With regard to the pressed bodies subjected to reduction treatment, measurement of conductivity was carried out under the conditions of 3% water vapor moistening—hydrogen atmosphere, at 1000° C. by the direct current four-terminal method.

Figure 12:
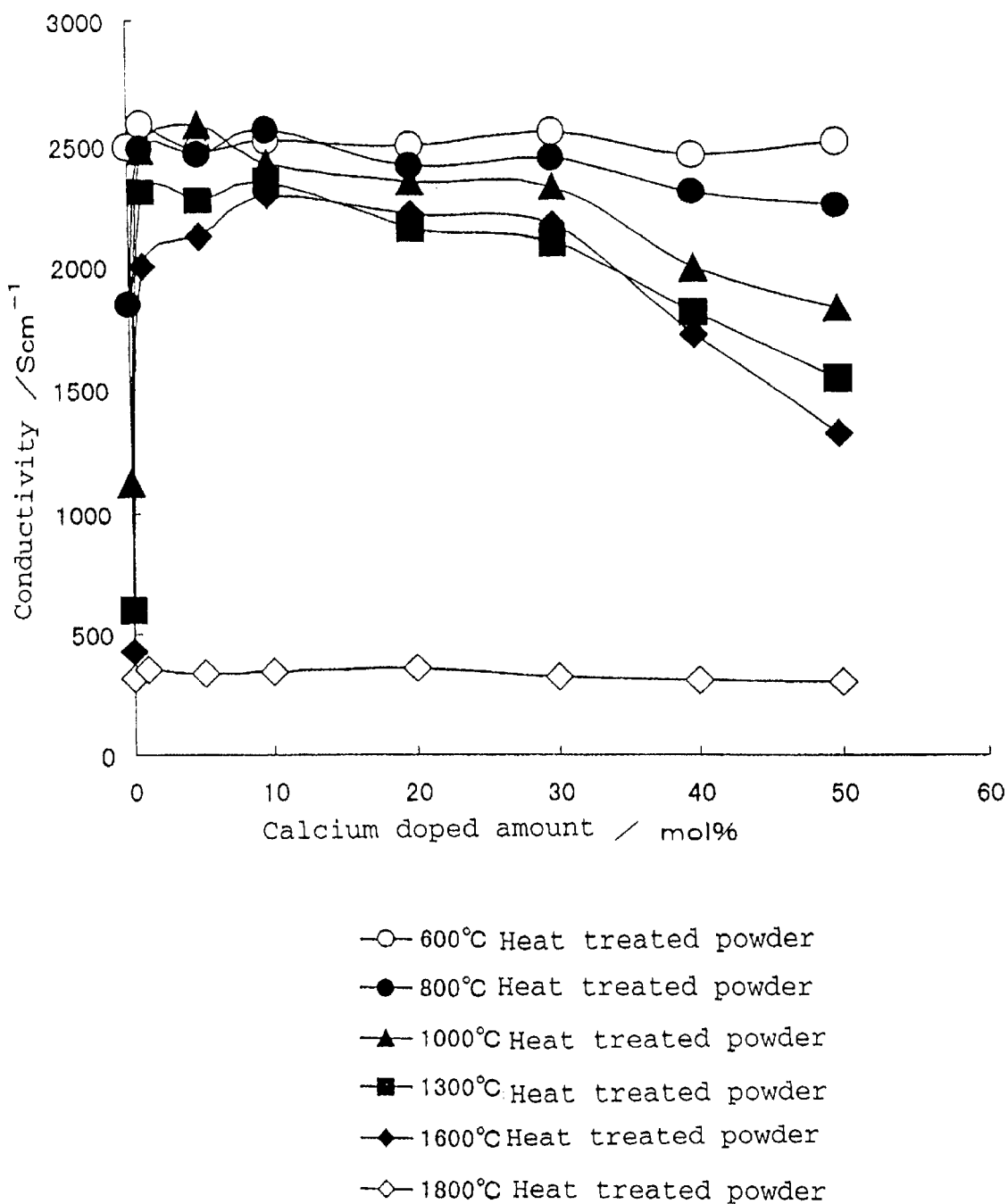
FIG. 12 is a graph showing a relationship between a doped amount and conductivity when calcium is doped in the synthesis by the coprecipitation method according to the embodiment of the present invention.
Figure 13:
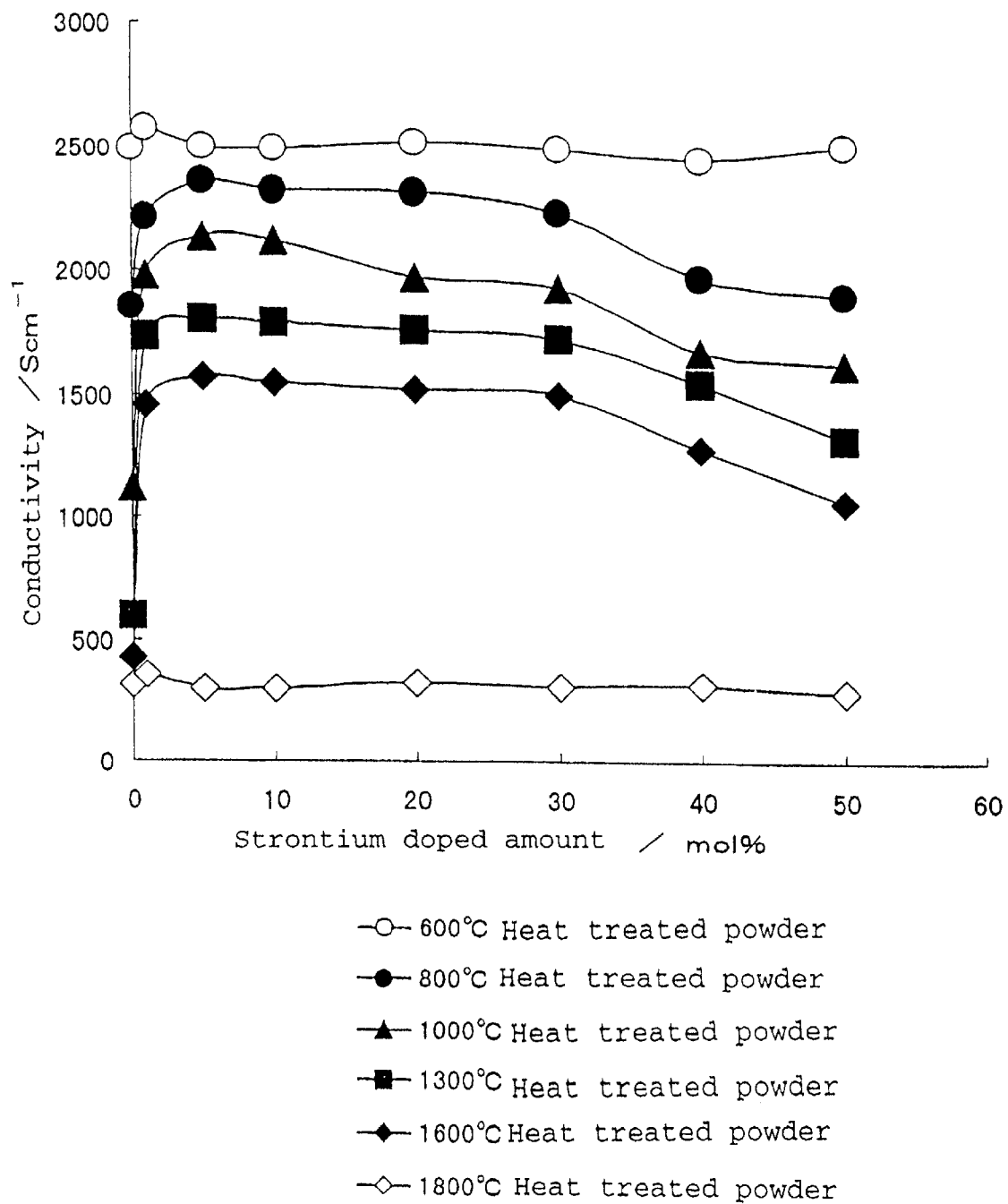
FIG. 13 is a graph showing a relationship between a doped amount and conductivity when strontium is doped in the synthesis by the coprecipitation method according to the embodiment of the present invention.
Figure 14:
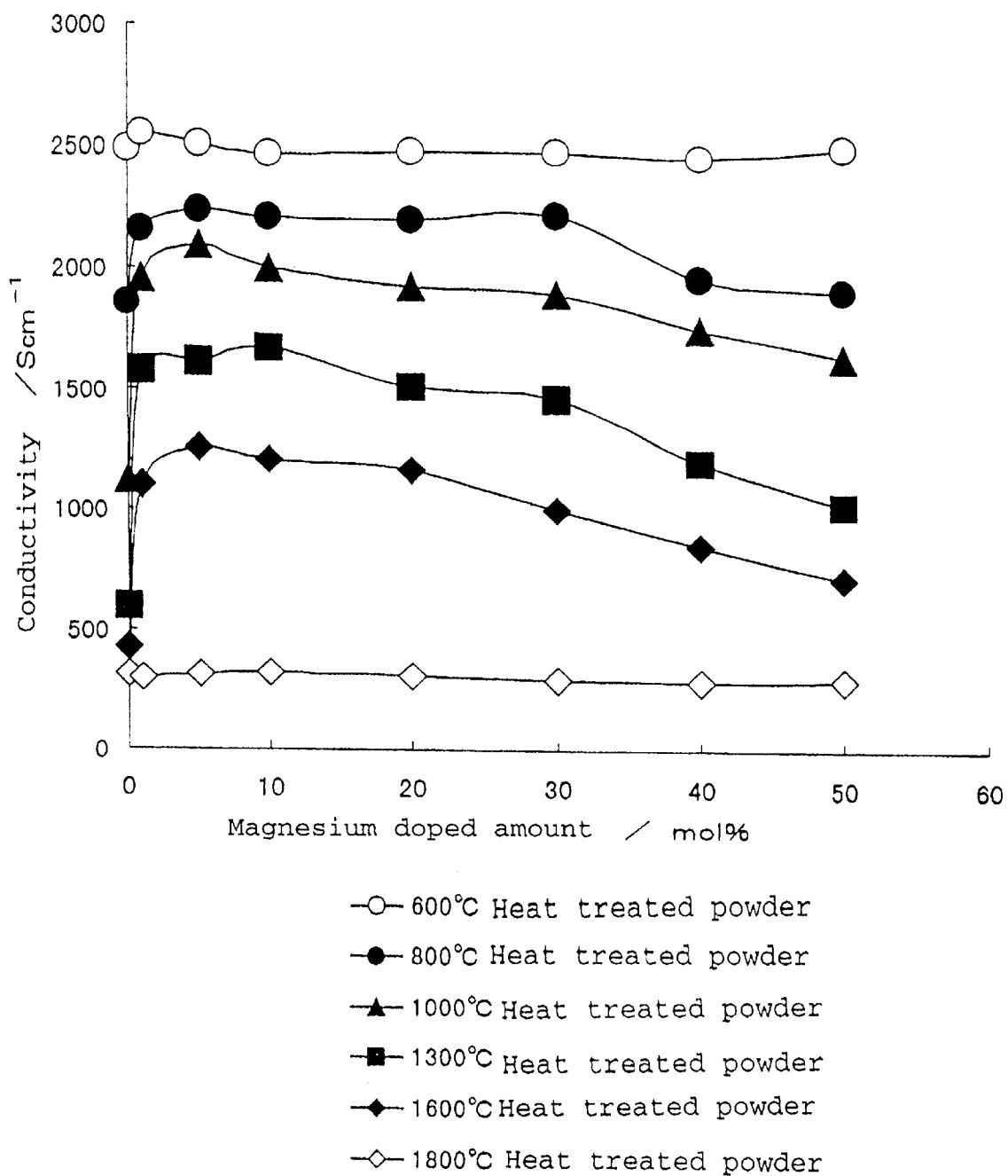
FIG. 14 is a graph showing a relationship between a doped amount and conductivity when magnesium is doped in the synthesis by the coprecipitation method according to the embodiment of the present invention.
Figure 15:
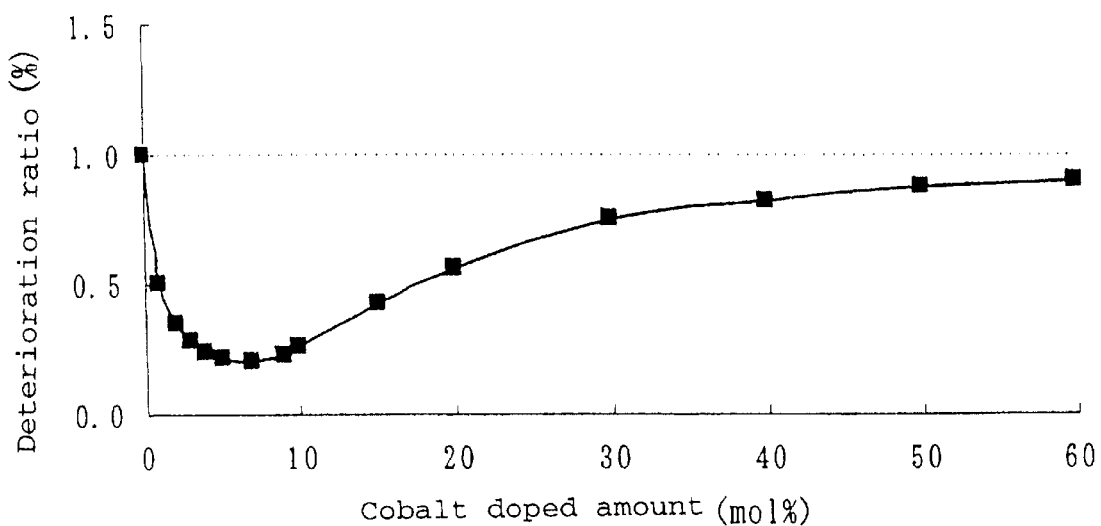
FIG. 15 is a graph showing a relationship between a doped amount and conductivity change after 1000 hours when cobalt is doped according to the embodiment of the present invention.
Figure 16:
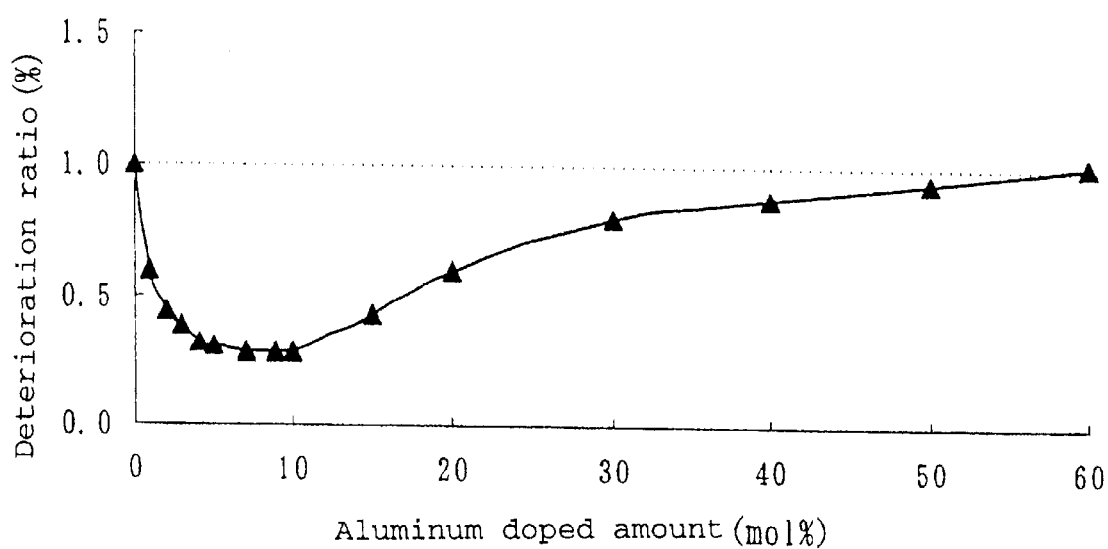
FIG. 16 is a graph showing a relationship between a doped amount and conductivity change after 1000 hours when aluminum is doped according to the embodiment of the present invention.
Figure 17:
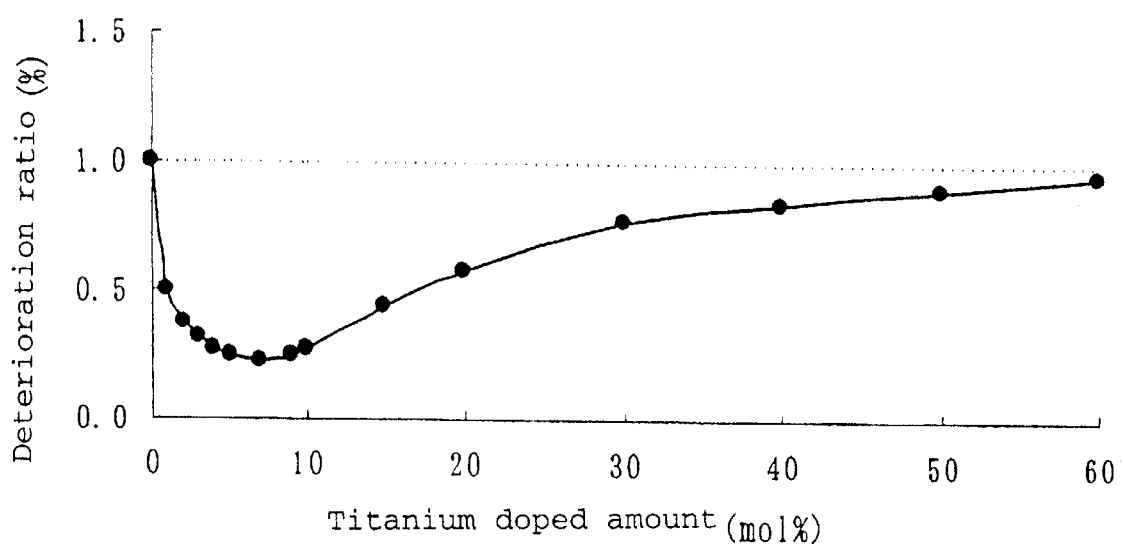
FIG. 17 is a graph showing a relationship between a doped amount and conductivity change after 1000 hours when titanium is doped according to the embodiment of the present invention.
Figure 18:
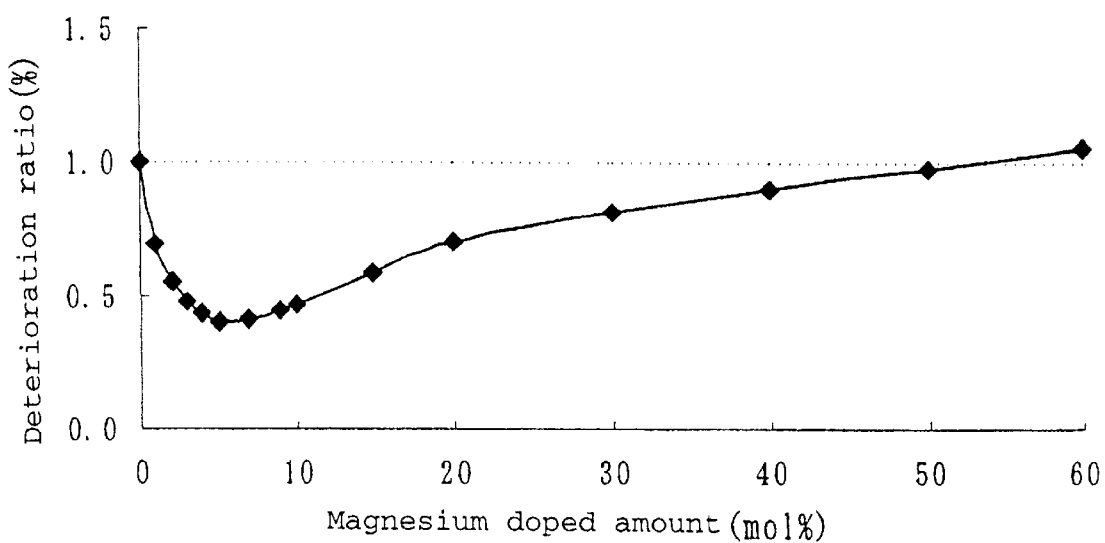
FIG. 18 is a graph showing a relationship between a doped amount and conductivity change after 1000 hours when magnesium is doped according to the embodiment of the present invention.

FIG. 12, FIG. 13 and FIG. 14 are graphs showing relationships between doped amounts of calcium, strontium and agnesium and conductivities of the pressed bodies using powders synthesized by doping a calcium element, strontium element and magnesium element by the coprecipitation method at the respective heat treatment temperatures. In all the three kinds of the doped elements, at the heat treatment temperature of 800° C. to 1600° C., conductivity was abruptly increased. When the doped amount of the element to be doped was less than 50 mol % which had been examined range, increase in conductivity was observed as compared with the case where no element was doped. In particular, at a doped amount of 30 mol % or less, conductivity was markedly increased.

EXAMPLE 10

Doping of Cobalt, Aluminum, Titanium and Magnesium
(Preparation of Composite Powder)

By using an aqueous yttrium-zirconium nitrate solution (containing 8 mol % of $Y_2O_3$) as a YSZ starting material and an aqueous nickel nitrate solution as a NiO starting material, they were mixed so that YSZ and NiO were 4:6 and 3:7 in a molar ratio. Also, by using cobalt nitrate, aluminum nitrate and magnesium nitrate as a cobalt, aluminum and magnesium source, and by using titanium chloride as a titanium source, they were doped in range of 0 mol % to 60 mol % each as an oxide to NiO and were sufficiently stirred.
(Preparation of Coprecipitation Solution)

In the present example, an aqueous oxalic acid solution was used as a coprecipitation solution. In a vessel was charged pure water, and pure water was heated to about 80° C. While stirring this hot water, crystal of oxalic acid dihydrate was gradually added to the hot water to dissolve the crystal and the solution was maintained at 70° C. to 90° C. With regard to the amount of an aqueous oxalic acid solution, it is preferred to use oxalic acid with a slightly excessive amount than the stoichiometric ratio so that metal ions are completely precipitated in the coprecipitation step. An excessive amount at this time was made about 5 mol %.
(Coprecipitation Reaction)

The starting material solution (NiO/YSZ composite solution) heated to 70° C. to 90° C. was gradually added to the aqueous oxalic acid solution while thoroughly stirring, whereby formation of precipitation was carried out by the oxalic acid coprecipitation method.
(Drying)

A vessel made of Teflon was left at rest in a drying machine, and water content and nitric acid in the coprecipitate were evaporated by feeding hot air of 120° C.
(Thermal Decomposition)

The sample after drying was subjected to heat treatment at 500° C. for 5 hours to remove the remaining nitric acid component and oxalic acid.
(Grinding)

The sample powdered by thermal decomposition was subjected to graininess adjustment by a rough grinding machine or mortar, etc. In this experiment, a secondary grain size was made 180 $\mu$m or less by a mortar made of alumina.
(Heat Treatment)

The resulting powders were subjected to heat treatment each at 800° C. and 1500° C.
(Grinding-Classification)

The powders subjected to heat treatment were again ground by a mortar made of alumina to obtain two kinds of powders having grain sizes of 2 $\mu$m or less and 5 $\mu$m to 50 $\mu$m.
(Preparation of Slurry)

By using the above-mentioned two kinds of powders in which the heat treatment had been carried out, and grinding and classification had been carried out, 20 parts of a solvent, 5 parts of a dispersant, 0.5 part of a surfactant, 0.5 part of an antifoaming agent and 1 part of a binder were mixed with 10 parts of the powder, whereby slurries for coating were obtained.
(Film Formation)

By using the above-mentioned of nickel base/zirconia base composite powders, on a tight YSZ substrate, to enhance adhesiveness at the interface between the solid electrolyte (YSZ) film and the fuel electrode, in the compositions in which NiO amount was 30 mol % and 50 mol %, film formations were carried out so that powders to which only calcination treatment was carried out at 800° C. and 1100° C. were each coated to have film thickness of about 10 $\mu$m, the slurry using the powder having a size of 2 $\mu$m or less to have a film thickness of 20 $\mu$m and the slurry using the powder having a size of 5 to 50 $\mu$m to have a film thickness of 80 $\mu$m, and they were sintered at 1500° C. for 50 hours.
(Measurement of Conductivity)

The above-mentioned nickel base/zirconia base film thus formed was reduced under 3% $H_2$—$N_2$ atmosphere at 1000° C.×10 hours, and then, conductivity thereof was measured in 11% $H_2O$-89% $H_2$ at 1000° C. by the direct current four-terminal method.
(Durability Test)

The samples prepared under the above-mentioned conditions were operated continuously for 1000 hours, and change in conductivity after 1000 hours was examined.

FIG. 15, FIG. 16, FIG. 17 and FIG. 18 are graphs showing relationships between doped amounts of a cobalt element, an aluminum element, a titanium element and a magnesium element and changes in conductivities after 1000 hours. In all the four kinds of the doped elements, the deterioration ratio became 0.5% to 0.7% at a doped amount of 1 mol %, so that they were improved in 30% to 50% as compared with the conventional materials. As a doped amount, improvement can be admitted with an amount of 50 mol %, and in particular, remarkable improvement can be admitted with an amount of 20 mol % or less.

Incidentally, in the present example, doped amounts of a cobalt element, an aluminum element, a titanium element and a magnesium element are changed in the range from 0 mol % to 60 mol % to nickel oxide, and the mixture was sufficiently stirred. Even if the doped amount of the above-mentioned elements to nickel was changed, the same results can be obtained.

EXAMPLE 11

Coarse Powder/fine Powder Mixture
(Preparation of Composite Powder)

By using an aqueous yttrium-zirconium nitrate solution (containing 8 mol % of $Y_2O_3$) as a YSZ starting material and an aqueous nickel nitrate solution as a NiO starting material, they were mixed so that YSZ and NiO became 4:6 and 3:7 in a molar ratio and sufficiently stirred.
(Preparation of Coprecipitation Solution)

In the present example, an aqueous oxalic acid solution was used as a coprecipitation solution. In a vessel was charged pure water, and pure water was heated to about 80° C. While stirring this hot water, crystal of oxalic acid dihydrate was gradually added to the hot water to dissolve the crystal and the solution was maintained at 70° C. to 90° C. With regard to the amount of an aqueous oxalic acid solution, it is preferred to use oxalic acid with a slightly excessive amount than the stoichiometric ratio so that metal ions are completely precipitated in the coprecipitation step. An excessive amount at this time was made about 5 mol %.
(Coprecipitation Reaction)

The starting material solution (NiO/YSZ composite solution) heated to 70° C. to 90° C. was gradually added to the aqueous oxalic acid solution while thoroughly stirring, whereby formation of precipitation was carried out by the oxalic acid coprecipitation method.
(Drying)

A vessel made of Teflon was left at rest in a drying machine and water content and nitric acid in the precipitates were evaporated by feeding hot air of 120° C.
(Thermal Decomposition)

The sample after drying was subjected to heat treatment at 500° C. for 5 hours to remove the remaining nitric acid component and oxalic acid.
(Grinding)

The sample powdered by thermal decomposition was. subjected to graininess adjustment by a rough grinding machine or mortar, etc. In this experiment, a secondary grain size was made 180 $\mu$m or less by a mortar made of alumina.
(Heat Treatment)

The resulting powders were subjected to heat treatment each at 800° C. and 1500° C.
(Grinding-Classification)

The powders subjected to heat treatment were subjected to grinding and classification to obtain powders of fine powders having grain sizes of 0.1 $\mu$m to 5 $\mu$m, 0.2 $\mu$m to 10 $\mu$m, 0.5 $\mu$m to 25 $\mu$m and 0.7 $\mu$m to 35 $\mu$m, and coarse powder having a grain size of 1 $\mu$m to 50 $\mu$m.
(Preparation of Slurry)

With regard to the powder in which the above-mentioned two kinds of the heat treatment had been carried out, and grinding and classification had been carried out, each 0 wt % to 60 wt % of fine powder was each mixed with the coarse powder, and 20 parts of a solvent, 5 parts of a dispersant, 0.5 part of a surfactant, 0.5 part of an antifoaming agent and 1 part of a binder were mixed with 10 parts of the mixed powder, whereby slurries for coating were obtained.
(Film Formation)

On a tight YSZ substrate, to enhance adhesiveness at the interface between the solid electrolyte (YSZ) film and the fuel electrode, in the compositions in which NiO amount was 30 mol % and 50 mol %, film formations were carried out so that powders to which only calcination treatment was carried out at 800° C. and 1100° C. were each coated to have a film thickness of about 10 $\mu$m, and coarse powder/fine powder mixed powder of the above-mentioned nickel base/zirconium base complex powder to have a thickness of 100 $\mu$m, and they were sintered at 1500° C. for 5 hours.
(Measurement of Conductivity)

The above-mentioned nickel base/zirconia base film thus formed was reduced under 3% $H_2$—$N_2$ atmosphere at 1000° C.×10 hours, and then, conductivity thereof was measured in 11% $H_2O$-89% $H_2$ at 1000° C. by the direct current four-terminal method.
(Durability Test)

The samples formed under the above-mentioned conditions were operated continuously for 1000 hours, and change in conductivity after 1000 hours was examined.

Figure 19:
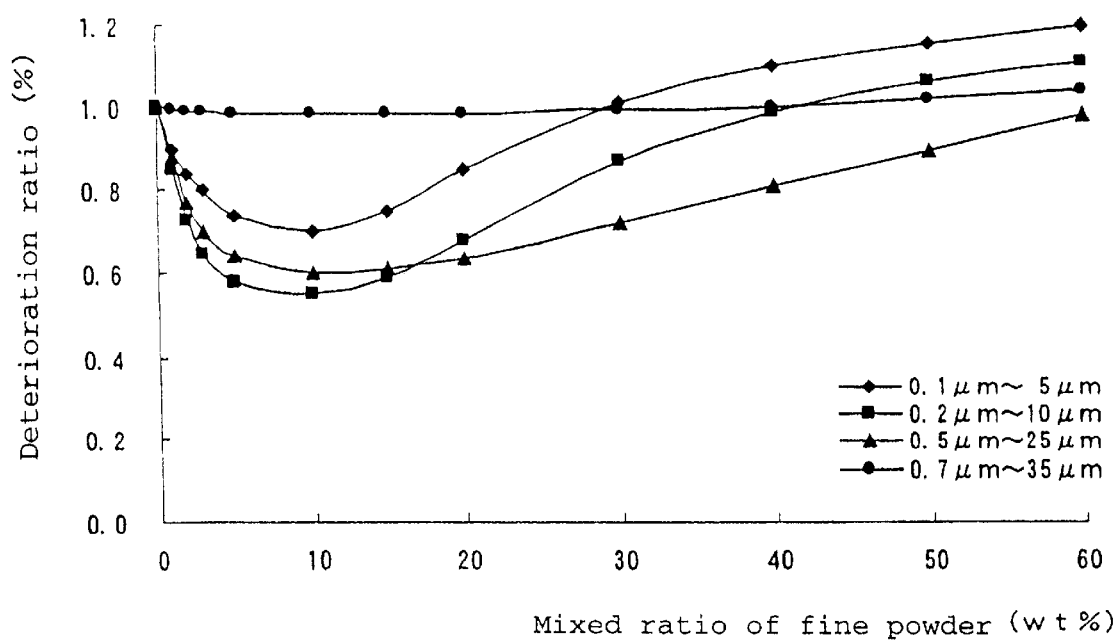
FIG. 19 is a graph showing a mixed ratio of fine powder to coarse powder due to the difference in grain size of the fine powder and a deterioration ratio of conductivity after 1000 hours according to the embodiment of the present invention.

FIG. 19 is a graph showing the relationship between a mixed ratio of fine powder to coarse powder by the difference in grain size of the fine powder and a deterioration ratio of conductivity after 1000 hours according to the embodiment of the present invention.

From FIG. 19, it is found that the deterioration ratio is decreased (in the case of the same, it is 1%) by mixing powders having different grain sizes.

A mixing ratio of the fine powder to the coarse powder is preferably more than 0 wt % and less than 30 wt % from FIG. 19.

More preferably, the mixing ratio of the fine powder to the coarse powder is more than 0 wt % to 10 wt % from FIG. 19.

In the above-mentioned mixing ratio, in the cases of the grain size ration of the mixed powder that the fine powder having 0.1 $\mu$m to 5 $\mu$m, 0.2 $\mu$m to 10 $\mu$m and 0.5 $\mu$m to 25 $\mu$m mixed to the coarse powder having 1 $\mu$m to 50 $\mu$m, decrease in the deterioration ratio is large so that the ratio of grain sizes of the mixed powder is preferably set to ½ or less in the above-mentioned mixing ratio.

From FIG. 19, by adjusting the grain size of the fine powder, the mixing ratio of the fine powder can be increased.

Grain size of the fine powder is regulated in the range of 0.2 to 35 $\mu$m, and the fine powder can be made more than 0 wt % to 40 wt % or less to the coarse powder.

Grain size of the fine powder is regulated in the range of 0.5 to 25 $\mu$m, and the fine powder can be made more than 0 wt % to 60 wt % or less to the coarse powder.

EXAMPLE 12

Reduction Sintering
(Preparation of Composite Powder)

An aqueous yttrium zirconium nitrate solution (containing 10 mol % of $Y_2O_3$) as a YSZ starting material and an aqueous nickel nitrate solution as a NiO starting material were mixed so that YSZ and NiO were 8:2, 5:5 and 2:8 in mol ratio to form three kinds of compositions and sufficiently stirred, respectively
(Preparation of Coprecipitation Solution)

In the present example, an aqueous oxalic acid solution was used as a coprecipitation solution. In a vessel was charged pure water, and pure water was heated to about 80° C. While stirring this hot water, crystal of oxalic acid dihydrate was gradually added to the hot water to dissolve the crystal and the solution was maintained at 70° C. to 90° C. With regard to the amount of an aqueous oxalic acid solution, it is preferred to use oxalic acid with a slightly excessive amount than the stoichiometric ratio so that metal ions are completely precipitated in the coprecipitation step. An excessive amount at this time was made about 5 mol %.
(Coprecipitation Reaction)

The starting material solution (NiO/YSZ composite solution) heated to 70° C. to 90° C. was gradually added to the aqueous oxalic acid solution while thoroughly stirring, whereby formation of precipitation was carried out by the oxalic acid coprecipitation method.
(Drying)

A vessel made of Teflon was left at rest in a drying machine, and water content and nitric acid in the precipitate were evaporated by feeding hot air of 120° C.
(Thermal Decomposition)

The sample after drying was subjected to heat treatment at 500° C. for 5 hours to remove the remaining nitric acid component and oxalic acid.
(Grinding)

The sample powdered by thermal decomposition was subjected to grain size adjustment by a rough grinding machine or mortar, etc. In this experiment, a secondary grain size was made 180 $\mu$m or less by a mortar made of alumina.
(Calcination)

To crystallize the resulting powder, heat treatment was carried out at 700° C. for 10 hours.
(Heat Treatment and Grain Size Adjustment)

At the electrolyte interface, powder with low NiO content and having fine grain size distribution was used and at the upper layer thereof, to gradually increase the NiO content and make grain size distribution large, the YSZ/NiO=80/20 mol % composition was subjected to heat treatment at 800° C., and then, ground up to 1 $\mu$m or less. Also, with regard to the YSZ/NiO=50/50 mol % composition, the powder was subjected to heat treatment at 1200° C., and then, ground and classification to have a grain size of 0.5 $\mu$m to 20 $\mu$m. Also, with regard to the YSZ/NiO=20/80 mol % composition, the powder was subjected to heat treatment at 160° C., and then, ground and classification to have a grain size of 2$\mu$m to 60 $\mu$m.
(Preparation of Slurry)

With respect to the powder of 1 $\mu$m or less, the powder of 0.5 $\mu$m to 20 $\mu$m and the powder of 2 $\mu$m to 60 $\mu$m, 20 parts of a solvent, 5 parts of a dispersant, 0.5 part of a surfactant, 0.5 part of an antifoaming agent and 1 part of a binder were mixed with 10 parts of the respective powders to obtain slurries for coating.
(Film Formation)

By using the above-mentioned slurries of NiO/YSZ composite powders, on a substrate in which an interconnector with a $La_{0.7}Ca_{0.3}CrO_3$ composition and a YSZ solid electrolyte film were formed on a tubular air electrode support with a $La_{0.75}Sr_{0.025}MnO_3$ composition one side of which is encapsulated, a film was formed by a slurry using the NiO/YSZ composite powder having a graininess of 1 $\mu$m or less with a thickness of about 20 $\mu$m, then, a film was formed thereon by a slurry using the NiO/YSZ composite powder having a grain size of 0.5 $\mu$m to 20 $\mu$m with a thickness of about 40 $\mu$m, and a film was further formed thereon by a slurry using the NiO/YSZ composite powder having a graininess of 2 $\mu$m to 60 $\mu$m with a thickness of about 80 $\mu$m, each by the dipping method.

(Drying)

In the above film formations, after film formation by the respective dipping methods, drying was carried out at room temperature for 2 hours, 50° C. for 2 hours, and 150° C. for 2 hours, then cooled to room temperature, and film formation at the next step was carried out.

(Sintering)

By using a high temperature type electric furnace having a furnace core tube in which a tight alumina pipe was maintained to the perpendicular direction, a film-formed sample (cell) was set so that the encapsulated portion came to the bottom side, an alumina tube was inserted into the inside of an air electrode tube through which air was flown into an air electrode. Also, to make the outside of the sample of the film-formed body a reduced atmosphere, a hydrogen gas containing 40° C. saturated steam was flowing from the bottom portion of the sample of the film-formed body, and the temperature was raised at a sintering speed of 150° C./hr and sintering was carried out at 1300° C. for hours.

The reason why when a film of a Ni/oxide composite film is formed, a side containing Ni and/or NiO of a yttria stabilized zirconia solid electrolyte thin film is made a reductive atmosphere and a side containing $LaMnO_3$ base air electrode of a yttria stabilized zirconia solid electrolyte thin film is made an oxidative atmosphere and sintering is carried out, is that at the side containing Ni and/or NiO, it is to maintain the state of metal Ni without oxidizing Ni or to reduce NiO to metal Ni, and at the side containing the $LaMnO_3$ base air electrode, it is to prevent from forming $La_2O_3$ or $MnO_2$ by the decomposition of the $LaMnO_3$ base air electrode.

(Microscopic Observation of Cell After Sintering)

With regard to the fuel electrode film of the cell after sintering, observation by microscope was carried out. As a result, it was confirmed that no failure portion such as crack, etc., was observed in the fuel electrode film.

(Evaluation of Power Generation Performance)

By using the above-mentioned cells, they were firstly raised the temperature up to 1000° C. under 3% $H_2$—$N_2$ atmosphere. Also, with regard to evaluation of power generation performance, under the operation conditions of a fuel; 11% $H_2O$-89% $H_2$, an oxidizing agent; 4-fold equivalent of air, a fuel utilization ratio; 40% and a temperature of 1000° C., evaluations were carried out. As a result, it showed a high output of the maximum output, 0.5 W/cm$^2$.

(Durability Test)

Under the above-mentioned conditions, operation was carried out continuously for 1000 hours, and change in the output after 1000 hours was examined. As a result, change in the cell potential per 1000 hours was 0.2%-decrease. On the other hand, change in cell potential per 1000 hours of the cell formed by sintering the fuel cell electrode under the conventional air atmosphere was about 1.4%-decrease. Thus, it can be confirmed that it is possible to form a cell excellent in durability by sintering the fuel electrode film under a reductive atmosphere.

(Microscopic Observation of Cell After Durability Test)

With regard to the fuel electrode film of the cell after durability test, observation was carried out by an optical microscope and electron microscope. As a result, it was confirmed that failure portion such as crack, etc., was not admitted in the fuel electrode film as well as in the fuel electrode of the cell after sintering, a state of aggregating Ni was also not observed as compared with the structure of the cell after sintering, and no change in the structure occurred.

Next, Examples of the present invention with regard to an interconnector film is explained.

EXAMPLE 13

Formation of $La_{0.2}Ca_{0.2}CrO_3$ Tight Film

On a porous substrate of $La_{0.8}Sr_{0.2}MnO_3$ (gas permeation flux: 2000 (m·hr$^{-1}$·atm$^{-1}$)), a ceramics intermediate layer (gas permeation flux: 0.01 to 100 (m·hr$^{-1}$·atm$^{-1}$)) comprising a $La_{0.8}Ca_{0.2}MnO_3$ film was formed and sintered. The $La_{0.8}Ca_{0.2}MnO_3$ film was subjected to surface roughening treatment by alumina powder, and then, a tight ceramics film comprising a $La_{0.8}Ca_{0.2}CrO_3$ film was formed on the above film and sintered. In the following, detailed formation method is shown.

(Formation of $La_{0.8}Ca_{0.2}MnO_3$ Ceramics Intermediate Layer)

(Synthesis of $La_{0.8}Ca_{0.2}MnO_3$ Powder)

$La(NO_3)_3$ aq, $Ca(NO_3)_2 \cdot 4H_2O$ and $Mn(NO_3)_2$ aq were each mixed so that they became predetermined composition ratio to prepare an aqueous nitrate containing La, Ca and Mn. Incidentally, an oxide content at this time was made 20 wt %.

Separately prepared aqueous oxalic acid solution (with regard to an oxalic acid amount, it is 1.05-fold to the amount of La, Ca and Mn with a stoichiometric ratio) was added to the above-mentioned aqueous nitrate solution and the mixture was stirred for about 5 hours. After stirring, the mixture was dried at 120° C. to evaporate water content, and thermal decomposition at 500° C. for 5 hours so that the nitric acid component and the residual oxalic acid were removed. Moreover, the powder subjected to thermal decomposition was subjected to calcination treatment, and then, ground and classified to become a predetermined grain size whereby powder for a slurry was obtained.

(Slurry Aqueous Solution)

After mixing 33 parts of α-terpineol and 100 parts of ethanol, 1.2 parts of ethyl cellulose as a binder, 1 part of polyoxyethylene alkylphosphate as a dispersant, and 1 part of sorbitan sesquioleate as an antifoaming agent were added to the mixture and mixed to obtain a slurry solution.

(Preparation of Coarse Powder Slurry)

To 100 parts of the above-mentioned slurry solution were added 40 parts of coarse powder having a composition of $La_{0.8}Ca_{0.2}MnO_3$ controlled to an average grain size of 2 μm at a calcination temperature of 1300° C. and 10 parts of fine powder having a composition of $La_{0.8}Ca_{0.2}MnO_3$ controlled to an average grain size of 0.5 μm at a calcination temperature of 1100° C. to prepare a coarse powder slurry.

(Preparation of Fine Powder Slurry)

To 100 parts of the above-mentioned slurry.solution were added 20 parts of fine powder having a composition of $La_{0.8}Ca_{0.2}MnO_3$ controlled to an average grain size of 0.5 μm at a calcination temperature of 1100° C. to prepare a fine powder slurry.

(Formation of $La_{0.8}Ca_{0.2}MnO_3$ Ceramics Intermediate Layer)

By using the above-mentioned coarse powder slurry and fine powder slurry, a $La_{0.8}Ca_{0.2}MnO_3$ film having a gas permeation flux of 0.01 to 100 (m·hr$^{-1}$·atm$^{-1}$) was formed.

(Surface Roughening Treatment)

As the degree of the surface roughening treatment, when the film thickness of the $La_{0.8}Ca_{0.2}MnO_3$ film was t1 and the film thickness after the surface roughening treatment was t2, it was (t1−t2)/t1=0.05 or so.

(Formation of $La_{0.8}Ca_{0.2}CrO_3$ Tight Ceramics Film)

(Preparation Method of $La_{0.8}Ca_{0.2}CrO_3$ Powder)

An aqueous nitric acid solution containing La, Ca and Cr was prepared so as to become $La_{0.8}Ca_{0.2}CrO_3$ and subjected to spray thermal decomposition at 700° C. to prepare powder. The prepared powder was further subjected to steps of calcination and graininess control to prepare powder for a slurry.

(Preparation Method of Powder Having Low Sintering Property)

A precursor obtained by spray thermal decomposition was calcinated at 1200° C. The calcinated powder was further mechanically ground by a ball mill to make an average grain size of 1 μm. (Hereinafter referred to as Powder A)

(Preparation Method of Powder Having High Sintering Property)

A precursor obtained by spray thermal decomposition was calcinated at 900° C. The calcinated powder was further mechanically ground by a ball mill to make an average grain size of 0.5 μm. (Hereinafter referred to as Powder B)

(Preparation of Slurry Solution)

After mixing 33 parts of a-terpineol and 100 parts of ethanol, 1.2 parts of ethyl cellulose as a binder, 1 part of polyoxyethylene alkylphosphate as a dispersant, and 1 part of sorbitane sesquioleate as an antifoaming agent were added to the mixture and mixed to obtain a slurry solution.

(Preparation of Powder A Slurry)

To 100 parts by weight of the above-mentioned slurry solution was mixed 60 parts by weight of Powder A prepared at a calcination temperature of 1200° C. to prepare a slurry.

(Preparation of Powder B Slurry)

To 100 parts by weight of the above-mentioned slurry solution was mixed 50 parts by weight of Powder B prepared at a calcination temperature of 900° C. to prepare a slurry.

(Dipping Method of $La_{0.8}Ca_{0.2}CrO_3$ Film)

A film of $La_{0.8}Ca_{0.2}CrO_3$ was formed by the dipping method shown in Table 12.

TABLE 12

Dipping method of $La_{0.8}Ca_{0.2}CrO_3$ film

| Step | Dipping conditions | Slurry |
|---|---|---|
| 1 | Film formed without pressure difference | A |
| 2 | Film formed with pressure difference (5 atm) | B |
| 3 | Film formed with pressure difference (5 atm) | A |
| 4 | Film formed with pressure difference (5 atm) | B |
| 5 | Film formed without pressure difference | A |

(Outline of Film Forming Apparatus)

Figure 20:
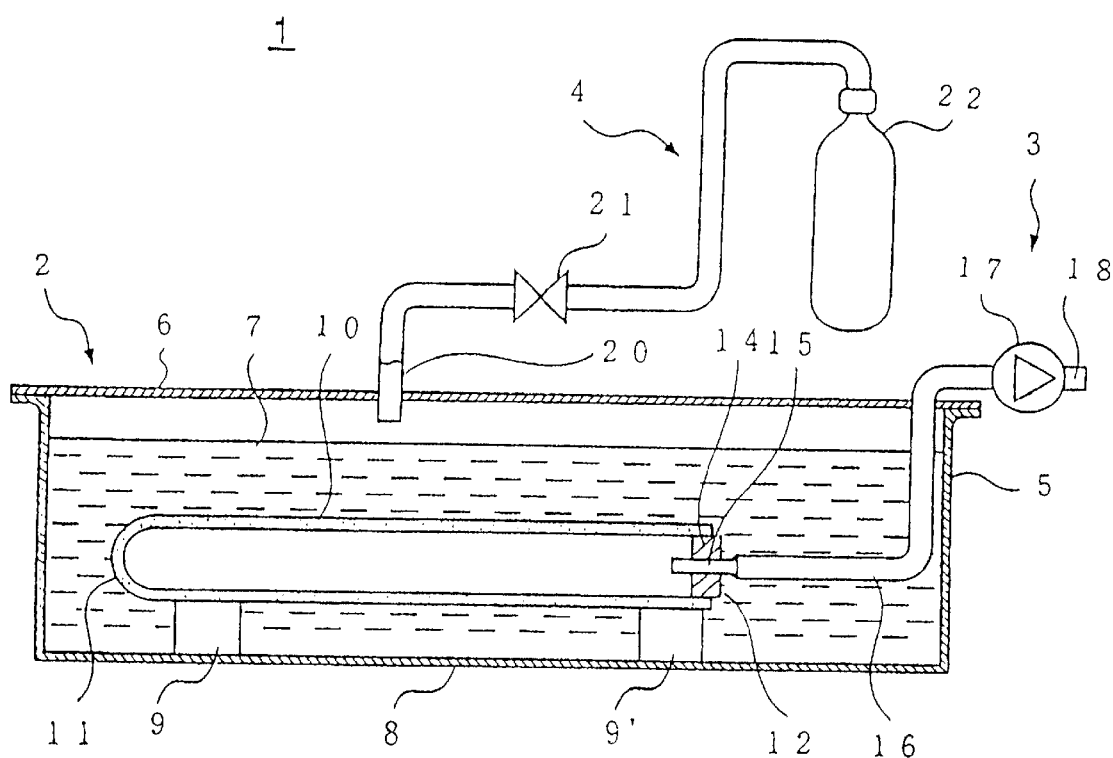
FIG. 20 is a drawing showing a film forming device according to the embodiment of the present invention.

Film-formation of the $La_{0.8}Ca_{0.2}CrO_3$ film was carried out by using a film-forming apparatus shown in FIG. 20. With regard to outline of the film-formation, it is explained by referring to FIG. 1. The dipping apparatus 1 of FIG. 20 is constituted by a dipping tank 2, a pressure-reducing apparatus 3 and a pressurizing apparatus 4. The dipping tank 2 has an oblong tank with a relatively shallow depth. On the tank 5, a lid is removably fitted. Between the tank 5 and the lid 6, a means (packing, etc.) for ensuring air-tightness in the dipping tank 2 is provided. In the dipping tank 2, a slurry 7 is filled with a certain level.

On a bottom 8 of the dipping tank 2, a substrate 10 is laid down through two stands 9 at the right and left side. The substrate 10 has a cylindrical shape having a bottom, and the left end is the bottom portion 11 and the right end is an opening end 12. An opening end 13 is closed with a stopper 14. Into the center portion of the stopper 14, an exhaust tube 15 is inserted. This exhaust tube 15 is connected to an exhaust pump 17 (vacuum pump) through an exhaust pipeline 16. When the exhaust pump 17 is operated, air in the substrate 10 is exhausted from an exhaust port 18 of the outlet side of the pump 17 through the exhaust tube 15 and the exhaust pipeline 16 whereby a pressure in the substrate 10 is reduced.

A pressurizing apparatus 19 comprises a pressurizing tube 20, a valve 21 and a gas bomb 22. When the valve 21 is opened, a nitrogen gas is fed from the gas bomb 22 through the pressurizing tube 20 into the dipping tank 2 to pressurize the dipping tank. Incidentally, between the lid 6 and the pressurizing tube 20, and the exhaust pipeline 16 are also sealed with a suitable means.

By using such a dipping apparatus 1, a slurry coating can be applied to the substrate 10 under various pressurizing conditions. Incidentally, the substrate 10 shown in this figure is a cell of a cylindrical type solid electrolyte fuel cell. The portions contacting with the stands 9 and 9' cannot be subjected to slurry coating, but there is no problem if the position is made a non-film forming portion. Also, the differential pressure apparatus may be an upright shape, and the substrate tube is retained in the body. In this case, when the substrate tube is placed in an apparatus, the stands 9 and 9' are not necessary so that film-formation can be carried out on the whole surface.

(Film-forming Step)

As shown in FIG. 20, a slurry is charged in an apparatus, and a sample was dipped therein for 30 seconds. After taking out the sample, it was maintained at room temperature for 30 minutes and further dried at 100° C. for one hour. This dipping and drying steps were repeated five times.

The five times of the dipping are the steps shown in Table 12. Incidentally, the film-formation without pressure difference shown in Table 12 is a film-formation method in which the sample is dipped in a slurry as such, and in the film formation with pressure difference (5 atm), a sample is dipped in a slurry while drawing a vacuum in the tube and a pressure difference of 4 atm is further applied from the outside of the slurry whereby film-formation was carried out while applying total pressure difference of 5 atm to the sample.

(Sintering)

Sintering was carried out at 1400° C. for 10 hours.

(Evaluation of Gas Permeation flux of $La_{0.8}Ca_{0.2}CrO_3$ Tight Ceramics Film)

Under the conditions of $N_2$ gas and a pressure difference of 1 atm, a gas permeation flux between the $La_{0.8}Sr_{0.2}MnO_3$ film and the $La_{0.8}Ca_{0.2}CrO_3$ film was measured to evaluate tightness of the $La_{0.8}Ca_{0.2}CrO_3$ film.

(Results of Gas Permeation Flux of $La_{0.8}Ca_{0.2}CrO_3$ Tight Ceramics Film)

Figure 21:
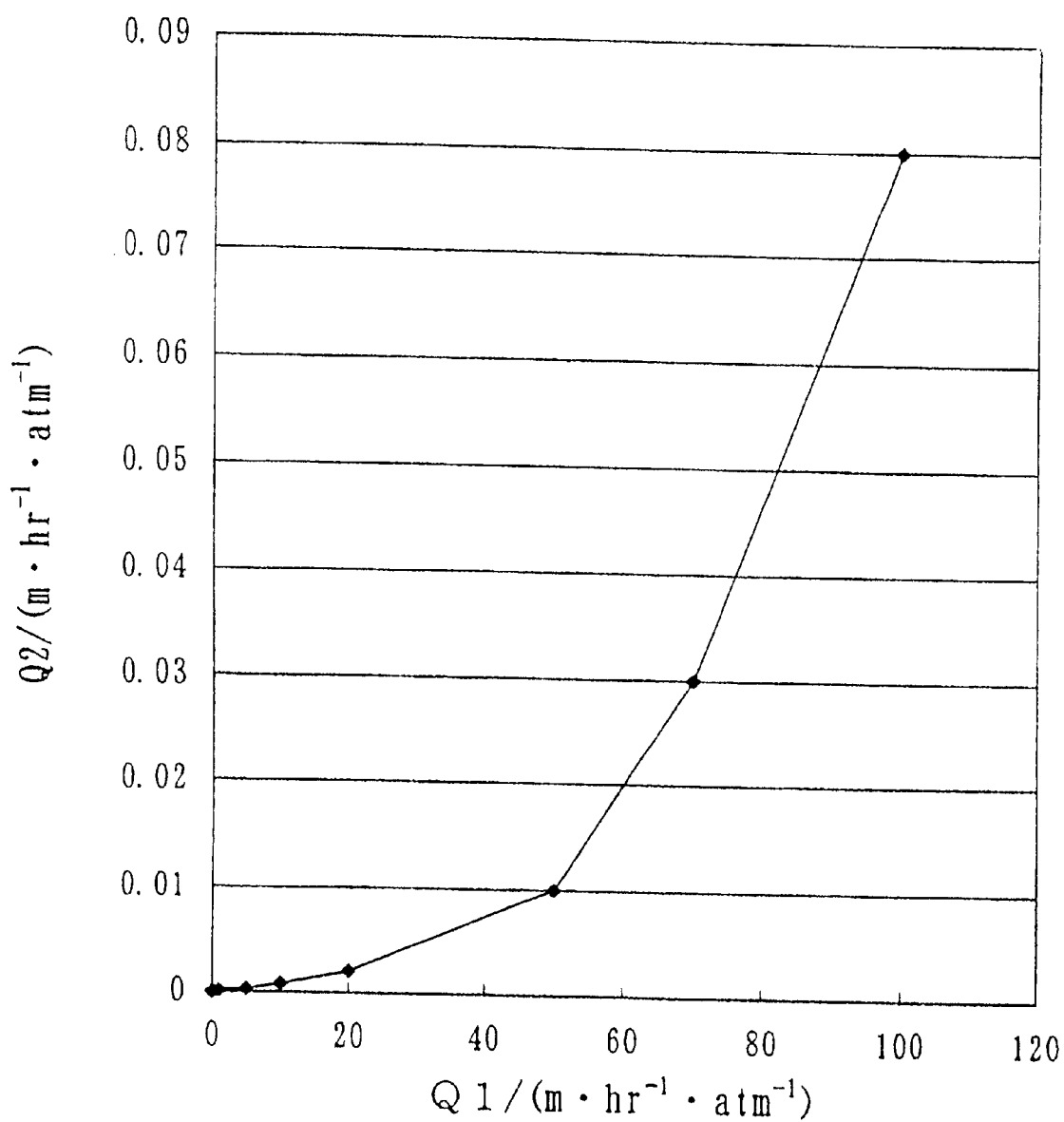
FIG. 21 is a graph showing a relationship between a gas permeation flux (Q1) of a $La_{0.8}Ca_{0.2}MnO_3$ ceramics intermediate layer and a gas permeation flux (Q2) of a $La_{0.8}Ca_{0.2}CrO_3$ tight ceramics film according to the embodiment of the present invention.

In FIG. 21, the relationship between the gas permeation flux (Q1) of the $La_{0.8}Ca_{0.2}MnO_3$ ceramics intermediate film and the gas permeation flux (Q2) of the $La_{0.8}Ca_{0.2}CrO_3$ tight ceramics film is shown. The gas permeability of the $La_{0.8}Ca_{0.2}CrO_3$ film tends to be low as the gas permeability of the $La_{0.8}Ca_{0.2}MnO_3$ film is low. Also, when the gas permeation flux of the $La_{0.8}Ca_{0.2}MnO_3$ film is 50 ($m \cdot hr^{-1} \cdot atm^{-1}$) or less, it is found that the gas permeation flux of the $La_{0.8}Ca_{0.2}CrO_3$ film becomes 0.01 ($m \cdot hr^{-1} \cdot atm^{-1}$) or less so that it is found that a gas permeability which is preferred to as an interconnector film of SOFC can be ensured.

EXAMPLE 14

With Respect to Surface Roughening Treatment

In the same manner as in Example 13, on a porous substrate of $La_{0.8}Sr_{0.2}MnO_3$ (gas permeation flux: 2000

(m·hr$^{-1}$·atm$^{-1}$)), a La$_{0.8}$Ca$_{0.2}$MnO$_3$ ceramics intermediate film (gas permeability flux: 0.01 to 100 (m·hr$^{-1}$·atm$^{-1}$)) was formed and sintered, and then, surface roughening treatment was carried out by alumina powder. Moreover, on the film, a La$_{0.8}$Ca$_{0.2}$CrO$_3$ tight ceramics film was formed and sintered.

As the above-mentioned surface roughening treatment conditions, a film thickness of the La$_{0.8}$Ca$_{0.2}$MnO$_3$ ceramics intermediate film before the surface roughening treatment was controlled to t1 and a film thickness of the La$_{0.8}$Ca$_{0.2}$MnO$_3$ ceramics intermediate film after the surface roughening treatment was controlled to t2, and then, on the film, a La$_{0.8}$Ca$_{0.2}$CrO$_3$ film was formed and sintered, and they were evaluated from peeling of the film after sintering and the gas permeation flux.

(Peeling Test)

In Table 13, the relationship between the surface roughening treatment conditions and peeling of the film was shown.

TABLE 13

Relationship between surface roughening conditions and peeling of film

| (t1 − t2)/t1 | Gas permeation flux Q3 after surface roughening treatment/ (m · hr$^{-1}$ · atm$^{-1}$) | La$_{0.8}$Ca$_{0.2}$CrO$_3$ film gas permeation Q4/ (m · hr$^{-1}$ · atm$^{-1}$) | Peeling |
|---|---|---|---|
| No surface roughening treatment | 35 | 1.05 | Present |
| 0.002 | 35 | 0.63 | Present |
| 0.005 | 36 | 0.13 | Only edge portion, peeling is present |
| 0.008 | 36 | 0.03 | Only edge portion, peeling is present |
| 0.01 | 37 | 0.007 | None |
| 0.03 | 38 | 0.0009 | None |
| 0.05 | 40 | 0.0002 | None |
| 0.10 | 42 | 0.0002 | None |
| 0.15 | 45 | 0.0008 | None |
| 0.20 | 50 | 0.009 | None |
| 0.25 | 65 | 0.05 | None |
| 0.30 | 100 | 0.35 | None |
| 0.40 | 180 | 1.55 | None |

When La$_{0.8}$Ca$_{0.2}$CrO$_3$ film is formed without applying to the surface roughening treatment, peeling degree of the film was remarkable and a tendency that the gas permeability became large could be admitted. Also, even when the surface roughening treatment was carried out, if the treatment was carried out with the degree of (t1−t2)/t1<0.01, adhesiveness of the film was poor so that the film was likely peeled off. When (t1−t2)/t1≧0.01, no peeling of the film was admitted.

(Gas Permeation Flux of La$_{0.8}$Ca$_{0.2}$CrO$_3$ Tight Ceramics Film)

Figure 22:
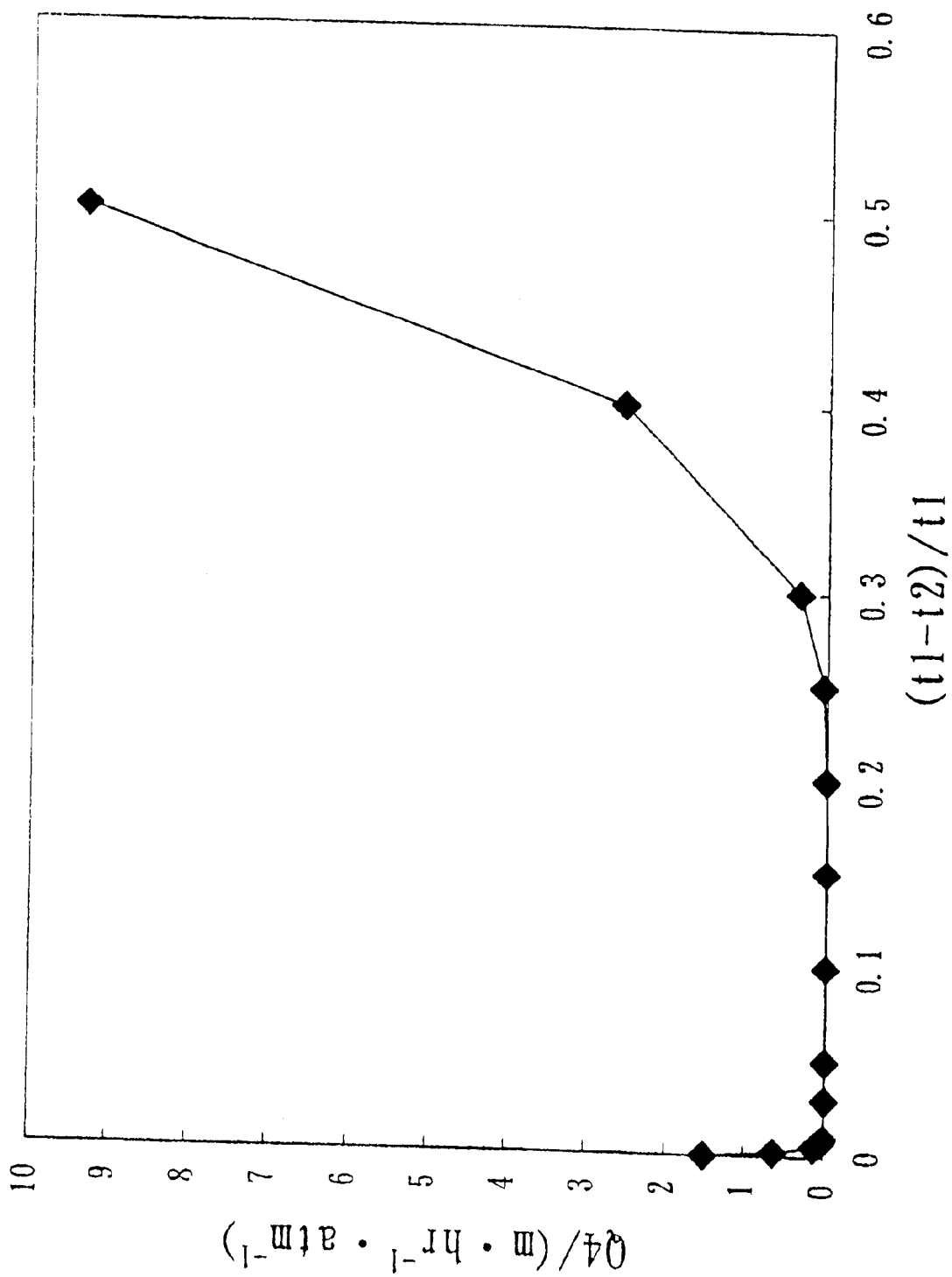
FIG. 22 is a graph showing a gas permeation flux of a $La_{0.8}Ca_{0.2}CrO_3$ film according to the embodiment of the present invention.

In Table 13 and FIG. 22, the results of the gas permeation flux of the La$_{0.8}$Ca$_{0.2}$CrO$_3$ film are shown. When (t1−t2)/t1 was 0.05 or less, there was a tendency that the gas permeation flux became small could be admitted, and further, from 0.05 to 0.01, it was the same degree, and when it exceeded 0.1, there was a tendency that the gas permeation flux became large could be admitted. Also, when it exceeded 0.2, the gas permeation flux became larger than 0.01 (m·hr$^{-1}$·atm$^{-1}$) so that it was not a tight film, and further, when (t1−t2)/t1>0.2, the tendency that the gas permeation flux became markedly large could be admitted. Tightness of the La$_{0.8}$Ca$_{0.2}$CrO$_3$ tight ceramics is markedly lowered. This can be estimated that the background La$_{0.8}$Ca$_{0.2}$MnO$_3$ tight ceramics intermediate layer became porous so that a sintering aid of La$_{0.8}$Ca$_{0.2}$CrO$_3$ was diffused into the background at sintering whereby a tight La$_{0.8}$Ca$_{0.2}$CrO$_3$ film could not be obtained. From this viewpoint, it is preferred within the range of 0.01≦(t1−t2)/t1≦0.2.

(Gas Permeation Flux of La$_{0.8}$Ca$_{0.2}$MnO$_3$ Film After Surface Roughening Treatment)

In Table 13, the relationship between the gas permeation flux (Q3) of the La$_{0.8}$Ca$_{0.2}$MnO$_3$ intermediate layer after surface roughening treatment and the gas permeation flux (Q4) of the La$_{0.8}$Ca$_{0.2}$CrO$_3$ tight ceramics film is shown. From the results, in the gas permeation flux Q3>50 (m·hr$^{-1}$·atm$^{-1}$) of the La$_{0.8}$Ca$_{0.2}$MnO$_3$ film after surface roughening treatment, the gas permeation flux Q4 of the La$_{0.8}$Ca$_{0.2}$CrO$_3$ film is >0.01 (m·h$^{-1}$·atm$^{-1}$), and for forming a tight La$_{0.8}$Ca$_{0.2}$CrO$_3$ film, it is preferred that Q3=≦50 (m·hr$^{-1}$·atm$^{-1}$) after surface roughening treatment.

EXAMPLE 15

Film Forming Conditions Under Pressure Difference of La$_{0.8}$Ca$_{0.2}$CrO$_3$ Tight Ceramics Film (Film Forming Method)

A film in which a La$_{0.8}$Ca$_{0.2}$MnO$_3$ ceramics intermediate layer having a gas permeation flux Q=40 (m·hr$^{-1}$·atm$^{-1}$) had been formed on a La$_{0.8}$Sr$_{0.2}$MnO$_3$ (gas permeation flux: 2000 (m·hr$^{-1}$·atm$^{-1}$)) porous substrate was subjected to surface roughening treatment, and then, film formation was carried out by the dipping method (steps) shown in Table 14. The surface roughening treatment conditions and the other conditions such as sintering conditions are the same as in Example 13.

TABLE 14

| Steps | Dipping method (steps) |
|---|---|
| 1 | Film formed without pressure difference |
| 2 | Film formed with pressure difference |
| 3 | Film formed with pressure difference |
| 4 | Film formed with pressure difference |
| 5 | Film formed without pressure difference |

(Pressure Difference Film Forming Conditions)

As shown in Table 15, as the pressure difference conditions, the test was carried out within the range of 0.5 to 30 atm. Incidentally, as shown in Table 14, the pressure difference film forming conditions in the steps 2 to 4 are made the same conditions.

TABLE 15

Pressure difference film forming conditions

| Conditions | Pressure difference film forming conditions/atm |
|---|---|
| 1 | 0.5 |
| 2 | 1 |
| 3 | 5 |
| 4 | 10 |
| 5 | 20 |

TABLE 15-continued

Pressure difference film forming conditions

| Conditions | Pressure difference film forming conditions/atm |
|---|---|
| 6 | 25 |
| 7 | 30 |

(Gas Premeation Flux of $La_{0.8}Ca_{0.2}CrO_3$ Tight Ceramics Film)

Under the conditions of $N_2$ gas and a pressure difference of 1 atm, gas permeation fluxes of the respective samples were measured.

In Table 16, the results of gas permeation flux of $La_{0.8}Ca_{0.2}CrO_3$ film are shown.

TABLE 16

Gas permeation flux of $La_{0.8}Ca_{0.2}CrO_3$ film

| Pressure difference film forming conditions (atm) | Gas permeation flux Q5 of $La_{0.8}Ca_{0.2}CrO_3$ film/ $(m \cdot hr^{-1} \cdot atm^{-1})$ |
|---|---|
| 0.5 | 0.07 |
| 1 | 0.01 |
| 5 | 0.0001 |
| 10 | 0.0002 |
| 20 | 0.004 |
| 25 | 0.03 |
| 30 | 0.25 |

In the range of 1 to 20 atm, the results became 0.01 $(m \cdot hr^{-1} \cdot atm^{-1})$ or less, but in other than this range, they showed larger values than 0.01 $(m \cdot hr^{-1} \cdot atm^{-1})$. From these results, the pressure difference $\Delta P$ in the pressure difference film forming is preferably 1 atm $\leq \Delta P \leq 20$ atm.

EXAMPLE 16

With Regard to Powder (Powder A) of $La_{0.8}Ca_{0.2}CrO_3$ Having Low Sintering Property (Preparation of Powder A Slurry)

To 100 parts by weight of the above-mentioned slurry solution was mixed 60 parts by weight of Powder A having a calcination temperature T3 (900 to 1500° C.) to prepare a slurry.

(Preparation of Powder B Slurry)

To 100 parts by weight of the above-mentioned slurry solution was mixed 60 parts by weight of Powder B having a calcination temperature 900° C. to prepare a slurry.

(Film Formation)

A film in which a $La_{0.8}Ca_{0.2}MnO_3$ ceramics intermediate layer having a gas permeation flux Q=40 $(m \cdot hr^{-1} \cdot atm^{-1})$ had been formed on a $La_{0.8}Sr_{0.2}MnO_3$ (gas permeation flux: 2000 $(m \cdot hr^{-1} \cdot atm^{-1})$) porous substrate was subjected to surface roughening treatment, and then, film formation was carried out by the dipping method (steps) shown in Table 12. The surface roughening treatment conditions and the other conditions such as sintetring conditions are the same as in Example 13. Also, for comparison, film formation (B in Table 12 is film formed by A) was carried out only by using Powder A slurry, and compared with Example 16 and investigated.

(Gas Permeation Flux of $La_{0.8}Ca_{0.2}CrO_3$ Tight Ceramics Film)

Figure 23:
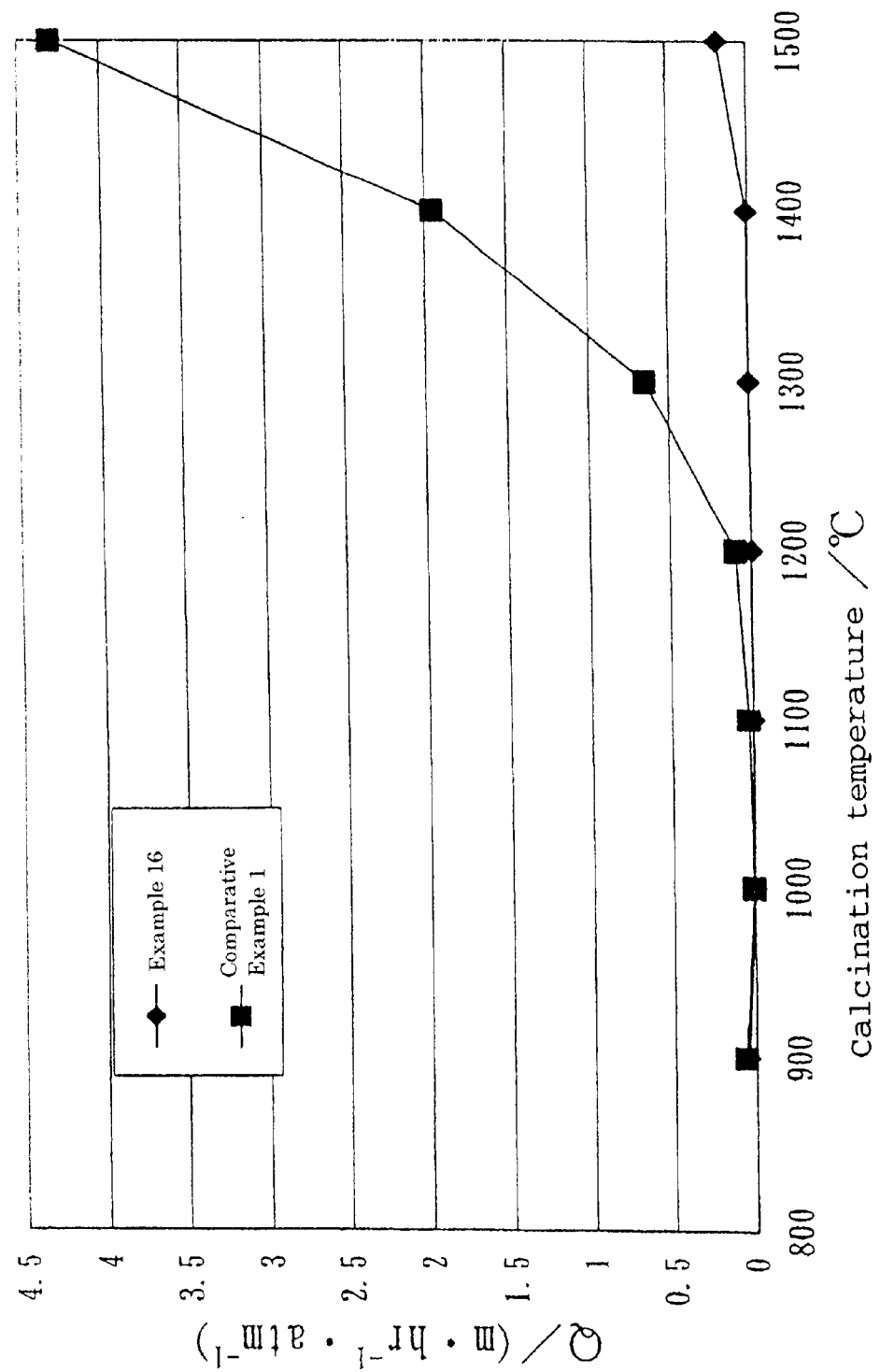
FIG. 23 is a graph showing a relationship between a calcination temperature and a gas permeation flux of a low sintering property powder of $La_{0.8}Ca_{0.2}CrO_3$ according to the embodiment of the present invention.

In FIG. 23 and Table 17, the relationship between th e calcination temperature and gas permeation flux of Powder A is shown.

TABLE 17

Relationship between calcination temperature and gas permeation flux of Powder A

| Calcination temperature (° C.) | Example 16 gas permeation flux Q6 $(m \cdot hr^{-1} \cdot atm^{-1})$ | Comparative example 1 gas permeation flux Q7 $(m \cdot hr^{-1} \cdot atm^{-1})$ |
|---|---|---|
| 900 | 0.05 | 0.06 |
| 1000 | 0.001 | 0.008 |
| 1100 | 0.0001 | 0.03 |
| 1200 | 0.0001 | 0.1 |
| 1300 | 0.006 | 0.65 |
| 1400 | 0.01 | 1.95 |
| 1500 | 0.18 | 4.30 |

In Example 16, at the calcination temperatures of 900° C. and 1500° C., the gas permeation flux values are greater than 0.01 so that it is found that when the $La_{0.8}Ca_{0.2}CrO_3$ film is used as an interconnector of SOFC, the range of 1000 to 1400° C. is preferred. Also, when it is compared with the comparative example, at the lower calcination temperature conditions, no substantial difference was admitted, but at the calcination temperature of 1100° C. or higher, great difference could be admitted in the gas permeation value whereby it could be found that it was difficult to ensure tightness of the film by the formation of a film using Powder A only.

EXAMPLE 17

Calcination Temperature of Powder (Powder B) $La_{0.8}Ca_{0.2}CrO_3$ Having High Sintering Property (Preparation of Powder A)

By using powder calcinated at 1200° C. and having an average grain size of 1 μm as Powder A, a slurry was prepared in the same manner as in Example 16.

(Preparation of Powder B)

By using powder calcinated at s temperature T2 (700 to 1200° C.) and having an average grain size of 0.5 μm as Powder A, a slurry was prepared in the same manner as in Example 16.

(Film Formation)

A film in which a $La_{0.8}Ca_{0.2}MnO_3$ ceramics intermediate layer having a gas permeation flux Q=40 $(m \cdot hr^{-1} \cdot atm^{-1})$ had been formed on a $La_{0.8}Sr_{0.2}MnO_3$ (gas permeation flux: 2000 $(m \cdot hr^{-1} \cdot atm^{-1})$) porous substrate was subjected to surface roughening treatment, and then, film formation was carried out by the dipping method (steps) shown in Table 12. The surface roughening treatment conditions and the other conditions such as sintering conditions are the same as in Example 13. Also, for comparison, film formation (B in Table 12 is film formed by A) was carried out only by using Powder A slurry, and compared with Example 17 and investigated.

(Gas Permeation Flux of $La_{0.8}Ca_{0.2}CrO_3$ Tight Ceramics Film)

Figure 24:
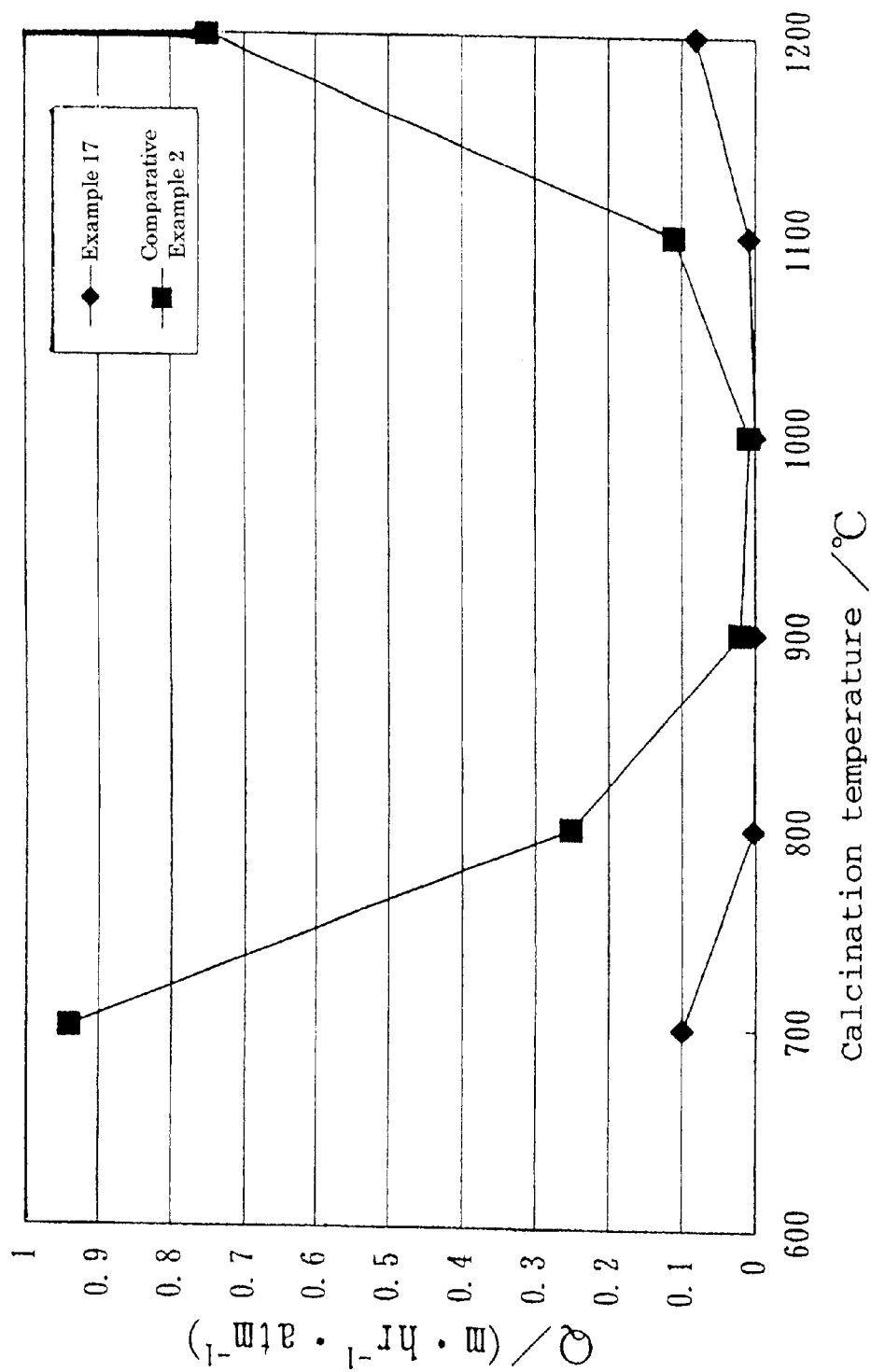
FIG. 24 is a graph showing a relationship between a calcination temperature and a gas permeation flux of a high sintering property powder of $La_{0.8}Ca_{0.2}CrO_3$ according to the embodiment of the present invention.

In FIG. 24 and Table 18, the relationship between the calcination temperature and gas permeation flux of Powder B is shown.

TABLE 18

Relationship between calcination temperature and gas permeation flux of Powder B

| Calcination temperature (° C.) | Example 17 gas permeation flux Q8 (m · hr$^{-1}$ · atm$^{-1}$) | Comparative example 2 gas permeation flux Q9 (m · hr$^{-1}$ · atm$^{-1}$) |
| --- | --- | --- |
| 700 | 0.1 | 0.94 |
| 800 | 0.003 | 0.25 |
| 900 | 0.0001 | 0.02 |
| 1000 | 0.0003 | 0.008 |
| 1100 | 0.008 | 0.11 |
| 1200 | 0.08 | 0.75 |

In Example 17, at the calcination temperatures of 700° C. and 1200° C., the gas permeation flux values are greater than 0.01 so that it is found that when the $La_{0.8}Ca_{0.2}CrO_3$ film is used as an interconnector of SOFC, the range of 800 to 1100° C. is preferred. Also, when it is compared with the comparative example, at the calcination temperatures of 900 to 1000° C., no substantial difference was admitted, but at the calcination temperatures other than this range, great difference could be admitted in the gas permeation value whereby it could be found that it was difficult to ensure tightness of the film by the formation of a film using Powder B only.

EXAMPLE 18

Figure 25:
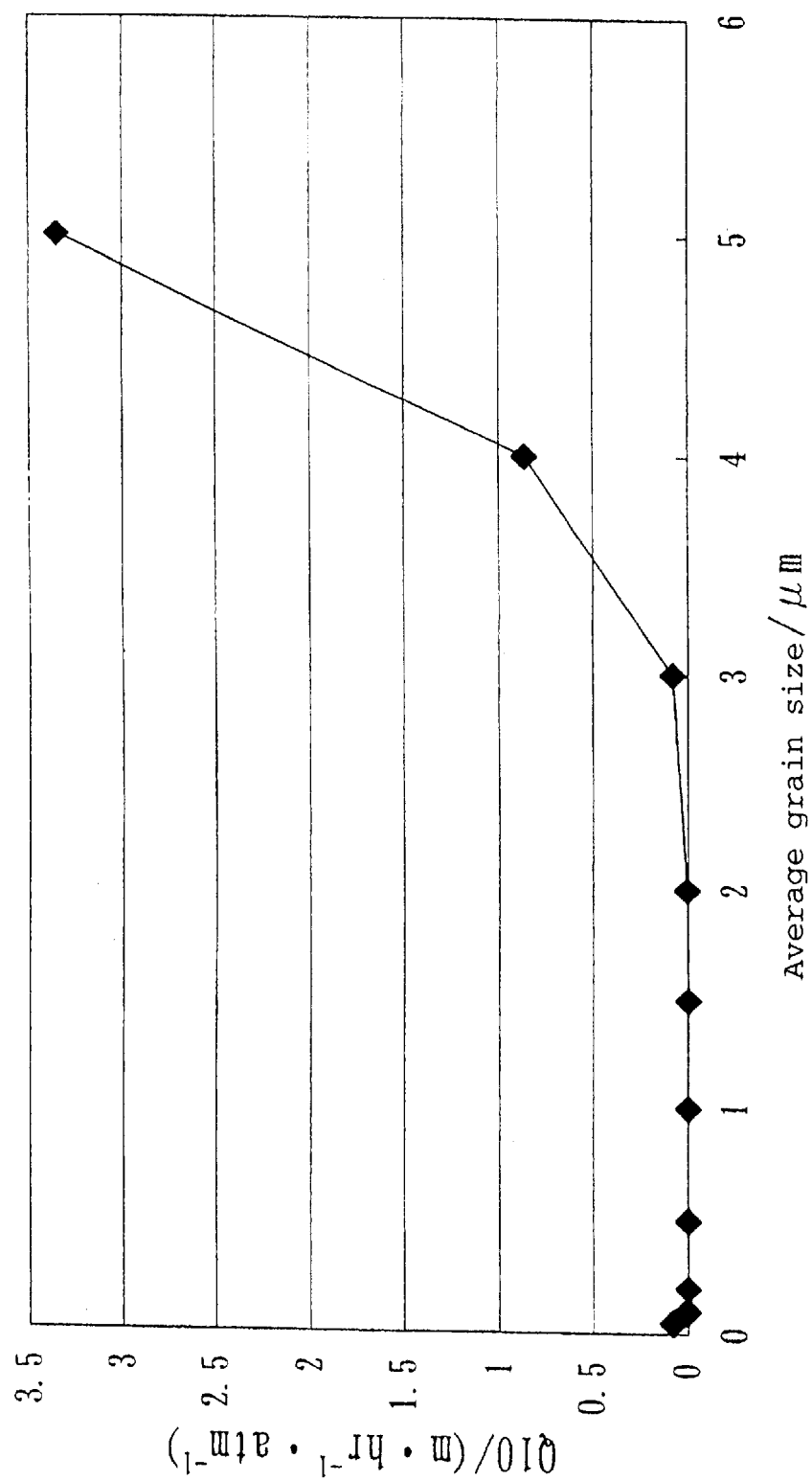
FIG. 25 is a graph showing a relationship between an average grain size and a gas permeation flux of a low sintering property powder of $La_{0.8}Ca_{0.2}CrO_3$ according to the embodiment of the present invention.

Grain Size Effect of Powder A
(Film Formation) Powder A calcinated at 1200° C. was ground and classified to prepare powder having an average grain size (0.05 to 5 μm). With regard to Powder B; it was made powder calcinated at 900° C. and having an average grain size of 0.5 μm. According to the slurry conditions and film forming conditions as in the respective Examples 15 to 17, a $La_{0.8}Ca_{0.2}CrO_3$ tight ceramics film was prepared. From the gas permeation of the $La_{0.8}Ca_{0.2}CrO_3$ film, an effect of the grain size was investigated.
(Gas Permeation Flux of $La_{0.8}Ca_{0.2}CrO_3$ Tight Ceramics Film)
In FIG. 25 and Table 19, the relationship between the average grain size and the gas permeation flux of Powder A is shown.

TABLE 19

Relationship between average grain size and gas permeation flux of Powder A

| Average grain size (μm) | Example 18 Gas permeation flux Q10 (m · hr$^{-1}$ · atm$^{-1}$) |
| --- | --- |
| 0.05 | 0.08 |
| 0.1 | 0.004 |
| 0.2 | 0.0005 |
| 0.5 | 0.00003 |
| 1.0 | 0.0001 |
| 1.5 | 0.001 |
| 2.0 | 0.007 |
| 3.0 | 0.08 |
| 4.0 | 0.86 |
| 5.0 | 3.35 |

When the average grain size is within the range of 0.1 to 2 μm, the gas permeation flux value is smaller than 0.01 so that it can ensure tightness when it is used as an interconnector of SOFC. However, if the average grain size is less than 0.1 μm or larger than 2 μm, the gas permeation flux value exceeds 0.01 so that it is found that it is difficult to ensure tightness as an interconnector of SOFC.

EXAMPLE 19

Figure 26:
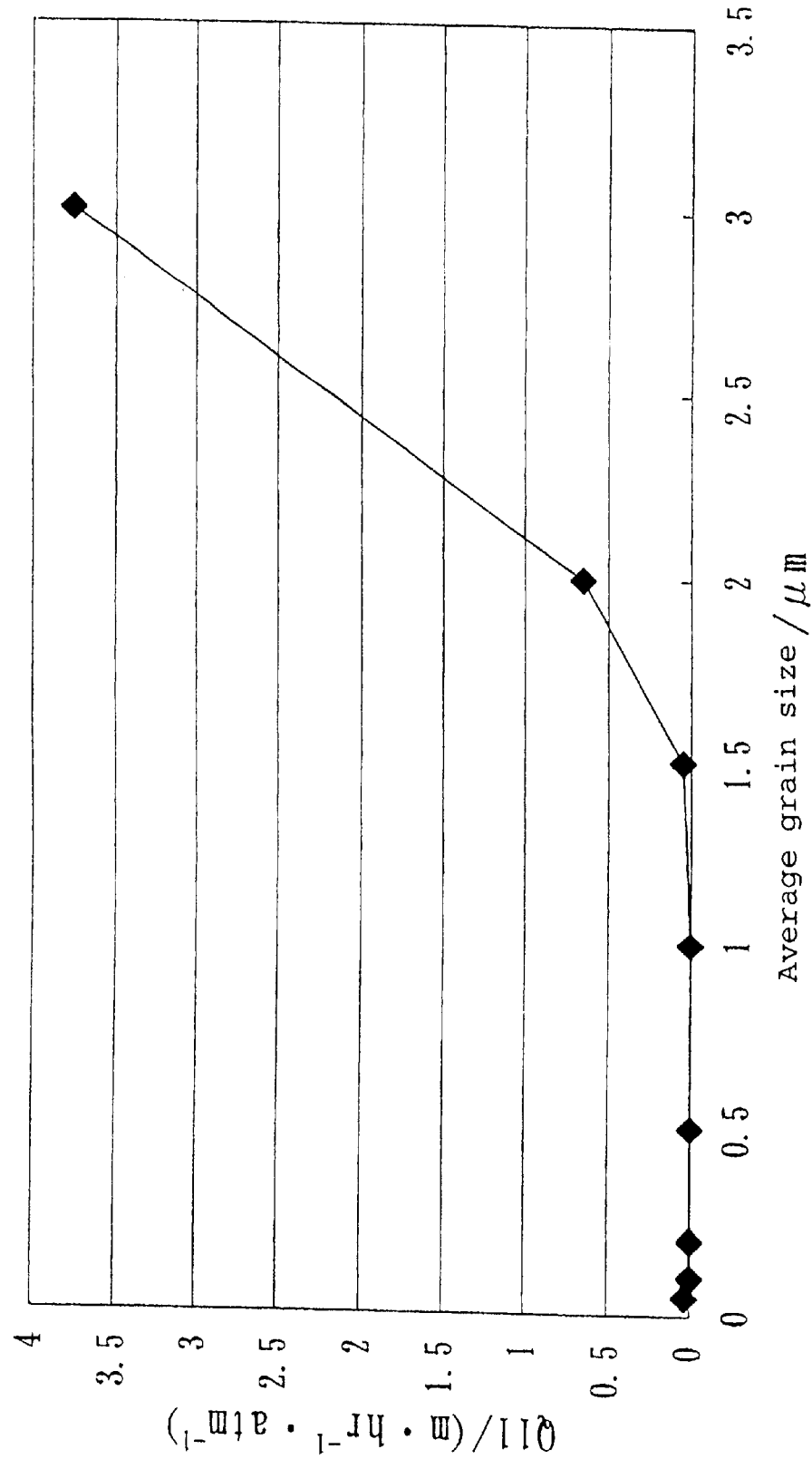
FIG. 26 is a graph showing a relationship between an average grain size and a gas permeation flux of a high sintering property powder of $La_{0.8}Ca_{0.2}CrO_3$ according to the embodiment of the present invention.

Grain Size Effect of Powder B
(Film Formation)
Powder A calcinated at 900° C. was ground and classified to prepare powder having an average grain size (0.05 to 3 μm). With regard to Powder A, it was made powder calcinated at 1200° C. and having an average grain size of 1 μm. According to the slurry conditions and film forming conditions as in the respective Examples 15 to 17, a $La_{0.8}Ca_{0.2}CrO_3$ film was prepared. From the gas permeation of the $La_{0.8}Ca_{0.2}CrO_3$ tight ceramics film, an effect of the grain size was investigated.
(Gas Permeation Flux of $La_{0.8}Ca_{0.2}CrO_3$ Tight Ceramics Film)
In FIG. 26 and Table 20, the relationship between the average grain size and the gas permeation flux of Powder B is shown.

TABLE 20

Relationship between average grain size and gas permeation flux of Powder B

| Average grain size (μm) | Example 19 Gas permeation flux Q11 (m · hr$^{-1}$ · atm$^{-1}$) |
| --- | --- |
| 0.05 | 0.03 |
| 0.1 | 0.00004 |
| 0.2 | 0.0001 |
| 0.5 | 0.0001 |
| 1.0 | 0.003 |
| 1.5 | 0.05 |
| 2.0 | 0.65 |
| 3.0 | 3.75 |

When the average grain size is within the range of 0.1 to 1 μm, the gas permeation flux value is smaller than 0.01 so that it can ensure tightness when it is used as an interconnector of SOFC. However, if the average grain size is less than 0.1 μm or larger than 1 μm, the gas permeation flux value exceeds 0.01 so that it is found that it is difficult to ensure tightness as an interconnector of SOFC.

EXAMPLE 20

Figure 27:
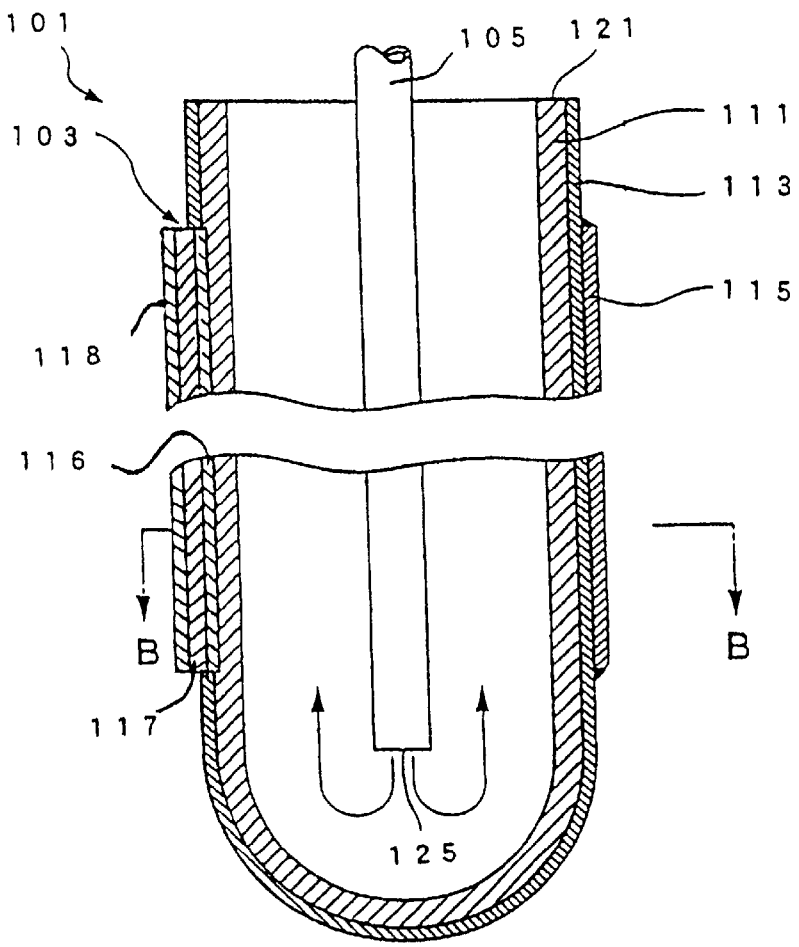
FIG. 27 is a sectional view showing a structure of a cell of a cylindrical cell type solid electrolyte type fuel cell according to the embodiment of the present invention.
Figure 27:
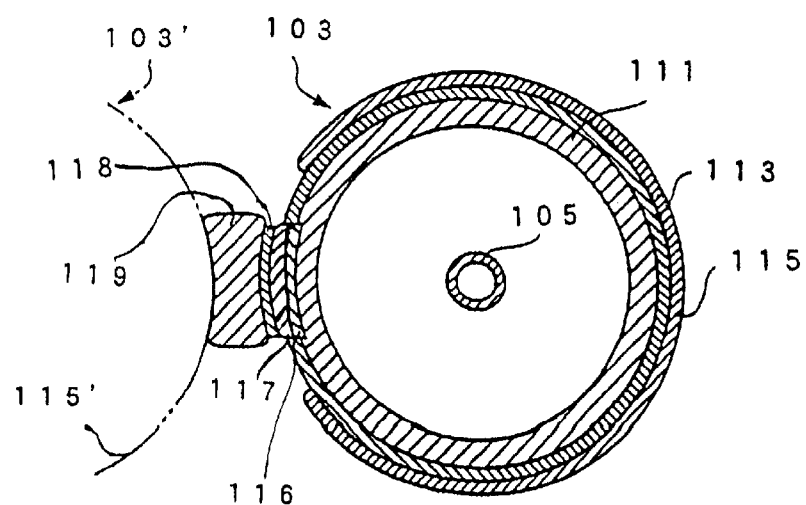

Preparation of SOFC Cell and Investigation of Power Generation Performance
Structure of the SOFC Cell is Specifically Explained.
FIG. 27 is a sectional view showing a structure of a cell of a cylindrical cell type solid electrolyte type fuel cell according to the embodiment of the present invention. FIG. 27A is a lengthwise sectional view of whole shape, and FIG. 27B is a lateral sectional view showing B—B section of FIG. 27A.
A cell assembly body 101 of FIG. 27 comprises a cylindrical cell 103 and an air introducing tube 5. The cylindrical cell 103 is a ceramic tube having a bottom in which the upper end of which is open and the bottom end thereof is sealed, and the sectional view of which is a laminated structure. The air introducing tube 105 is a ceramic tube (for example, a material made of YSZ which has substantially the same linear expansion coefficient with the tubular cell 103 or a material made of $Al_2O_3$ excellent in thermal impact strength) having a simple sectional structure. The air introducing tube 105 is inserted into inner bore of the cylindrical cell 103 from a cell opening end 121, and the top end of the air introducing tube 105 is reached near to the bottom of the cell inner bore. A gap between the bottom of the cell 103 and a bottom end 125 of the air introducing tube 105 is, as an example, 10 mm. From the bottom end 125 of the air introducing tube 105, air (an oxidizing agent) is supplied into the cell 103 as mentioned above. Further, air is electrochemically reacted, while rising up, with a fuel gas existing at the outside of the cell 103 to carry out power generation.

The sectional structure of the cell 103 is explained by referring to FIG. 27B. The cell 103 has a laminated structure of several layers (films). First, an air electrode 111 exists at the innermost side in a ring state. This air electrode 111 also has a role of strengthening member (supporting member) which supports the cell. The air electrode 111 is a porous material of strontium-doped lanthanum manganite (LSM). The air electrode 111 becomes a cathode when air is passed there through.

Next, a solid electrolyte film 113 is present on the surface of the air,electrode 111. In the solid electrolyte film 113, there is a partially discontinued portion (the portions of the interconnectors 117 and 118) at the left side of the drawing. The solid electrolyte film 113 is a tight film of yttria-stabilized zirconia (YSZ). Through the solid electrolyte film 113, an $O^{2-}$ ion passes, and it has a role of a shielding film so that the air in the cell 103 and a fuel gas outside the cell 103 are not directly contacted with each other.

Next, a fuel electrode 115 exists at the outside the solid electrolyte film 113 in a substantially ring state. In the fuel electrode 115, there is a partially discontinued portion (the portions of the interconnectors 117 and 118) at the left side of the drawing. The fuel electrode 115 is a porous film of Ni-YSZ cermets. When a fuel gas passes through the fuel electrode 115, it becomes an anode.

The interconnectors 117 and 118 (left side of FIG. 27A and FIG. 27B) are films extending to an axis direction of the cell 103 with a band shape on the air electrode 111. The interconnector 117 is a calcium-doped lanthanum chromite film and the interconnector 118 is a nickel oxide film and each is a tight film. These interconnectors 117 and 118 are conducted with the air electrode whereby they have a role of exposing the conducting portion with the air electrode to the outside surface of the cell 103 and a role of shielding the outside and inside of the cell 103. These interconnectors 117 and 118 are not contacted with the fuel electrode 115 to avoid conduction therewith.

An intermediate layer 116 of the air electrode and the interconnector existing between, the interconnector 117 and the air electrode 111 is a layer provided to control diffusion of a intering aid into the air electrode at sintering of the interconnector film, and it is preferably provided.

On the interconnector 118, a collecting material.119 made of Ni felt is provided. On the other surface of the collecting material 119, a fuel electrode surface 115' of the left side cell 103' is contacted therewith.

Next, power generation performance test results using test cells are explained.

Test cells were formed by the following conditions.
(Cell Specification)
Type: air electrode self-supporting type, cell outer diameter: 13 mm, cell length: 200 mm
Air electrode: material: $La_{0.75}Sr_{0.25}MnO_3$, outer diameter: 13 mm, thickness: 1.5 mm, conductivity: 100 $S \cdot cm^{-1}$, porosity: 35%, extrusion→sintering
Solid electrolyte film: material: 8 mol % $Y_2O_3$-stabilized $ZrO_2$, thickness: 20 μm, slurry coat→sintering
Interconnector:
Example 21 Material: $La_{0.8}Ca_{0.2}CrO_3$ (thickness: 40 μm, slurry coat→sintering) NiO (thickness: 20 μm, slurry coat→sintering)

This example is to form a lanthanum chromite film at an oxidative atmosphere side and sinter, and to form a nickel oxide film at a reductive atmosphere side and sinter. When a lanthanum chromite film is formed at an oxidative atmosphere side and a nickel oxide film is formed at a reductive atmosphere side and subjecting to co-sintering, it is considered that materials are $La_{0.8}Ca_{0.2}CrO_3$ and NiO, a thickness is 60 μm, conductivity is 40 $S \cdot cm^{-1}$, and slurry coat→sintering, etc.

Comparative Example 3 Material: $La_{0.8}Ca_{0.2}CrO_3$, thickness: 40 μm, conductivity: 30 $S \cdot cm^{-1}$, slurry coat→sintering
Comparative example 4 Material: $La_{0.8}Ca_{0.2}CrO_3$ and Ni, thickness: 45 μm ($La_{0.8}Ca_{0.2}CrO_3$ film: 40 μm, slurry coat method, Ni film: 5 μm, electroless plating method), conductivity: 40 $S \cdot cm^{-1}$ Fuel electrode: Material: YSZNI cermet, thickness: 60 μm, conductivity: 1400 $S \cdot cm^{-1}$, porosity: 40%, slurry coat→sintering (Formation Process)
Air Electrode (Supporting Material):
To the above-mentioned LSM powder were added an organic binder, glycerin and water and the mixture was kneaded. Next, this compound was formed by extrusion. Thereafter, drying and degreasing were carried out, subsequently sintering was carried out at 1350 to 1500° C. for 10 hours.

Interconnector Film Formation:

EXAMPLE 21

A $La_{0.8}Ca_{0.2}MnO_3$ film was formed at the interconnector film formed portion on the above-mentioned air electrode and sintered, then, a $La_{0.8}Ca_{0.2}CrO_3$ film was formed by the slurry coating method and sintered at 1400° C. for 10 hours. A NiO film was formed thereon by the slurry coating method, and sintered at 1400° C. for 10 hours.

When a lanthanum chromite film was formed at the oxidative atmosphere side and a nickel oxide film was formed at the reductive atmosphere side, and co-sintering is to be carried out, it can be considered a method that a $La_{0.8}Ca_{0.2}MnO_3$ film is formed at the interconnector formed portion on the above-mentioned air electrode and sintered, then, a $La_{0.8}Ca_{0.2}CrO_3$ film is formed by the slurry coating method and a NiO film is formed thereon by the slurry coating method, and sintered at 1400° C. for 10 hours and the like.

COMPARATIVE EXAMPLE 3

A $La_{0.08}Ca_{0.2}MnO_3$ film was formed at the interconnector formed portion on the above-mentioned air electrode and sintered, then, a $La_{0.8}Ca_{0.2}CrO_3$ film was formed by the slurry coating method, and sintered at 1400° C. for 10 hours

COMPARATIVE EXAMPLE 4

A $La_{0.8}Ca_{0.2}MnO_3$ film was formed at the interconnector formed portion on the above-mentioned air electrode and sintered, then, a $La_{0.8}Ca_{0.2}CrO_3$ film was formed by-the slurry coating method, and a metal nickel layer was formed by the electroless plating method. (Hereinafter referred to as metallization)

Formation of Solid Electrolyte Film:
The above-mentioned YSZ was formed on the above-mentioned background layer by slurry coating and sintering to form a film.

Formation of Fuel Cell Electrode Film:
The above-mentioned Nik-YSZ cermets were coated on the above-mentioned solid electrolyte layer by the slurry coating and sintering to form a film. Incidentally, the reduction treatment of NiO was carried out under the atmosphere of $(H_2+11\%H_2O):N_2=3:97$ at 1000° C. for 3 hours.

A collecting material made of Ni felt was contacted onto the interconnector film and was adhered to the interconnector film under the same atmosphere (mentioned below) at the time of operating SOFC.

This cell was operated under the following conditions.
(Power Generating Conditions)

Fuel: $(H_2+11\%H_2O)$

Oxidizing agent: Air

Cell temperature: 1000° C.

Fuel utilization ratio: 85%
(Test Results)

Figure 28:
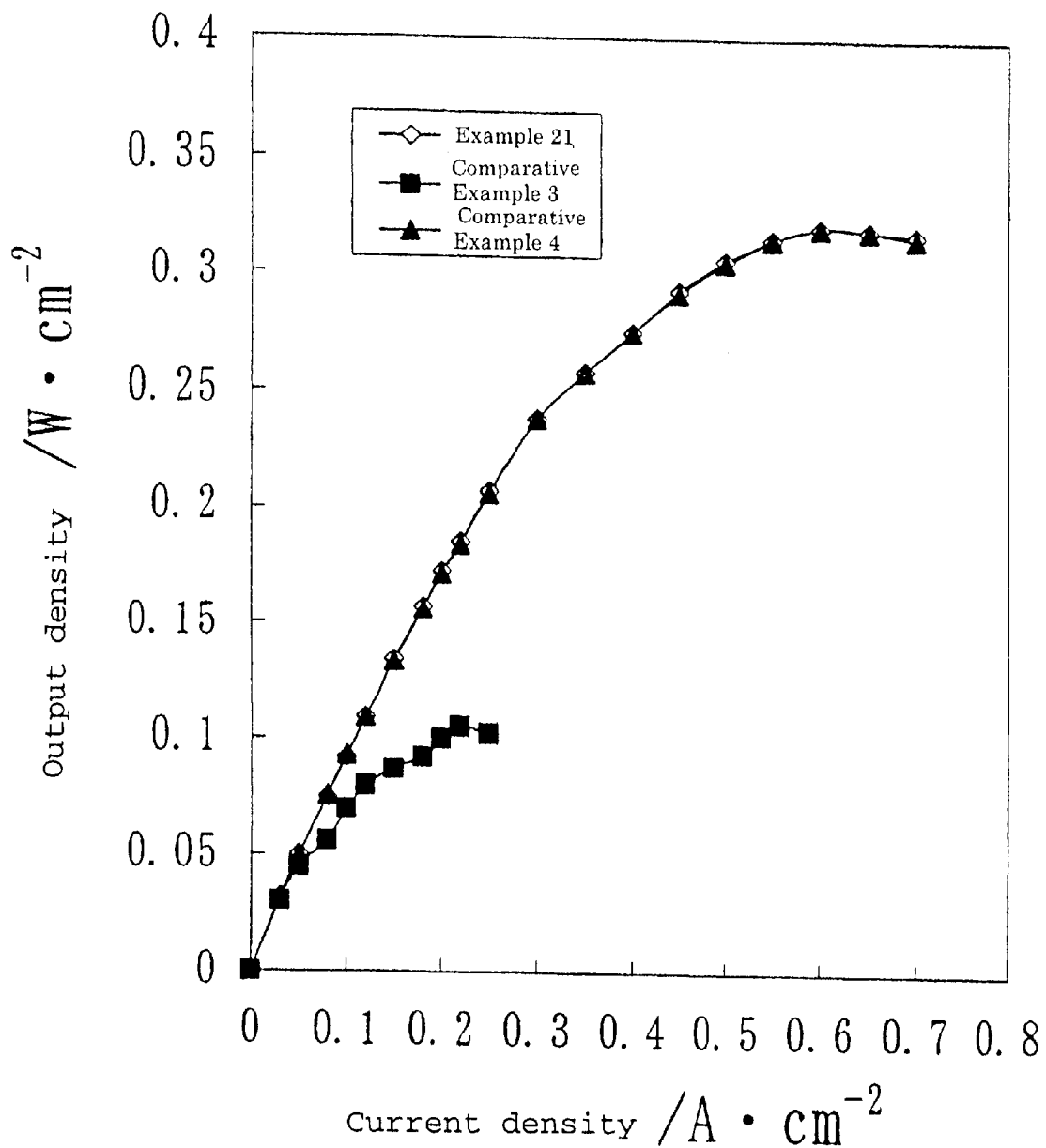
FIG. 28 is a graph showing comparison of power generation performance of a SOFC cell of the present example formed by slurry coating a $La_{0.8}Ca_{0.2}CrO_3$ film of an interconnector and sintering, then, slurry coating a NiO film and sintering according to the embodiment of the present invention, a SOFC cell of Comparative example 3 in which the interconnector is made a $La_{0.8}Ca_{0.2}CrO_3$ film and metallize is not carried out, and a SOFC cell of Comparative example 4 in which the interconnector is made a metal nickel film and metallize is carried out.

FIG. 28 is a graph showing comparison of power generating performance of a SOFC cell of the present example formed by forming a $La_{0.08}Ca_{0.2}CrO_3$ film of an interconnector by slurry coating and sintering, then, by forming a NiO film by slurry coating and sintering, a SOFC cell of Comparative example 3 in which the interconnector is made a $La_{0.8}Ca_{0.2}CrO_3$ film and metallization is not carried out, and a SOFC cell of Comparative example 4 in which the interconnector is made a metal nickel film and metallization is carried out. The lateral axis represents a surface density of current, and the vertical axis represents a surface density of an output. Incidentally, the current density was changed by changing the resistance of a outside circuit.

As shown in FIG. 28, when metallization had been not carried out as in Comparative example 3, a peak of the output density was 0.1 W/cm² or so, but in the cases of Examples and Comparative example 2, the output densities were 0.3 W/cm² or so whereby high outputs of about 3-times were shown. The reason can be considered that in Comparative example 3, with increase of current density, a contact resistance at the interface of the interconnector and the collecting material is markedly increased and jourl loss at the portion is increased, while in Examples and Comparative example 4, the contact resistances are low.

As shown in the present example, it is found that even when an interconnector film formed by forming a lanthanum chromite film at an oxidative atmosphere side and sintering and a nickel oxide film at a reductive atmosphere side and sintering is used, it shows the similar characteristics as those of a metallized interconnector formed by many steps with a high cost.

Utilizability in Industry

According to the present invention, an air electrode, a solid electrolyte film, a fuel cell and an interconnector each having optimum characteristics in a solid electrolyte type fuel cell can be provided.

What is claimed is:

1. A fuel cell comprising:

an air electrode having a side surface;

a solid electrolyte film overlying only a first portion of said side surface;

a fuel electrode overlying said solid electrolyte film; and an intercomnector comprising a ceramics intermediate layer overlying only a second portion of said side surface, and said interconnector further comprising an interconnector film, which is a tight ceramics film, overlying said ceramics intermediate layer;

said ceramics intermediate layer comprising $(La_{1-x}M_x)_y MnO_3$ where $0<X \leq 0.4$, $0.9<Y \leq 1$ and M=Ca or Sr, and having a gas permeation flux $Q \leq 50$ m·hr$^{-1}$·atm$^{-1}$.

2. The fuel cell according to claim 1, wherein said interconnector film is formed by providing a lanthanum chromite film overlying said ceramics intermediate layer, providing a nickel film overlying said lanthanum chromite film, and sintering.

3. The fuel cell according to claim 1, wherein said interconnector film is formed by providing a lanthanum chromite film overlying said ceramics intermediate layer, providing a nickel oxide film overlying said lanthanum chromite film, and co-sintering.

4. The fuel cell according to claim 1, wherein said interconnector film is formed by providing a lanthanum chromite film overlying said ceramics intermediate layer and sintering, and providing a nickel oxide film overlying said lanthanum chromite film and sintering.

5. The fuel cell according to claim 1, wherein said interconnector film is formed by providing a lanthanum chromite film overlying said ceramics intermediate layer, providing a nickel oxide film overlying said lanthanum chromite film, and sintering at 1300–1550° C.

6. The fuel cell according to claim 1, wherein said interconnector film is formed by providing a lanthanum chromite film overlying said ceramics intermediate layer and sintering at 1300–1550° C., and providing a nickel oxide film overlying said lanthanum chromite film and sintering at 1300–1550° C.

7. The fuel cell according to claim 1, wherein the said interconnector film includes a nickel oxide film formed from a nickel oxide powder having an average grain size of 0.1–20 μm.

* * * * *

UNITED STATES PATENT AND TRADEMARK OFFICE
CERTIFICATE OF CORRECTION

PATENT NO. : 6,692,855 B1
DATED : February 17, 2004
INVENTOR(S) : Aizawa et al.

It is certified that error appears in the above-identified patent and that said Letters Patent is hereby corrected as shown below:

Title page,
Item [30], Foreign Application Priority Data, please replace
"June 29, 1998 (JP) 10/196609" with -- June 26, 1998 (JP) 10/196609 --; and please replace "August 15, 1998 (JP) 10/233636" with -- August 5, 1998 (JP) 10/233636 --

Signed and Sealed this

Eleventh Day of May, 2004

JON W. DUDAS
*Acting Director of the United States Patent and Trademark Office*